US007240829B2

(12) United States Patent
Graef et al.

(10) Patent No.: US 7,240,829 B2
(45) Date of Patent: Jul. 10, 2007

(54) ATM WITH STACK TRANSPORTER FOR BULK NOTE DEPOSIT

(75) Inventors: H. Thomas Graef, Bolivar, OH (US); Natarajan Ramachandran, Uniontown, OH (US); Pedro Tula, North Canton, OH (US)

(73) Assignee: Diebold Self-Service Systems, a division of Diebold, Incorporated, North Canton, OH (US)

( * ) Notice: Subject to any disclaimer, the term of this patent is extended or adjusted under 35 U.S.C. 154(b) by 0 days.

(21) Appl. No.: 11/475,615

(22) Filed: Jun. 27, 2006

(65) Prior Publication Data

US 2007/0000993 A1 Jan. 4, 2007

Related U.S. Application Data

(60) Provisional application No. 60/695,990, filed on Jul. 1, 2005.

(51) Int. Cl.
*G06F 19/00* (2006.01)

(52) U.S. Cl. ........................ 235/379; 271/3.14; 902/8; 209/534

(58) Field of Classification Search ................ 235/379; 902/8, 13, 14, 15; 414/792.2; 271/3.01, 271/3.14, 4.08, 3.15, 10.05, 184, 185, 187
See application file for complete search history.

(56) References Cited

U.S. PATENT DOCUMENTS

| | | | | |
|---|---|---|---|---|
| 4,521,008 | A * | 6/1985 | Granzow et al. | 271/3.15 |
| 4,795,889 | A * | 1/1989 | Matuura et al. | 235/379 |
| 5,330,316 | A * | 7/1994 | Buckman et al. | 414/790.2 |
| 5,398,931 | A * | 3/1995 | Tohgoh | 271/126 |
| 5,630,582 | A * | 5/1997 | Peebles et al. | 271/90 |
| 6,302,393 | B1 * | 10/2001 | Beskitt et al. | 271/258.01 |
| 6,334,610 | B1 * | 1/2002 | Minamishin et al. | 271/3.04 |
| 6,378,770 | B1 * | 4/2002 | Clark et al. | 235/379 |

* cited by examiner

*Primary Examiner*—Daniel A. Hess
(74) *Attorney, Agent, or Firm*—Ralph E. Jocke; Daniel D. Wasil; Walker & Jocke

(57) ABSTRACT

An ATM can accept a bulk stack of currency notes for deposit from a customer. The ATM includes a stack transporter (400) that can rotate an accepted stack while relocating it to a predetermined location inside of the machine. The stack transporter includes a rotatable housing (406) in which a stack holder (404) is movable. The stack holder can receive a currency stack (411) deposited in a fascia opening (412) by a customer. The stack holder is retracted to move the stack away from the opening and into the housing to completely move the stack into the machine. The housing, having the bulk stack therein, is then rotated to move the stack away from the opening and toward a stack processing area in the machine. The stack holder is then extended to expose a stack end out of the housing for stack processing.

20 Claims, 30 Drawing Sheets

ATM WITH STACK TRANSPORTER FOR BULK NOTE DEPOSIT

CROSS-REFERENCE TO RELATED APPLICATIONS

This Application claims benefit pursuant to 35 U.S.C. § 119(e) of U.S. Provisional Application No. 60/695,990 filed Jul. 1, 2005, and the disclosure thereof is incorporated herein by reference.

TECHNICAL FIELD

This invention relates to automated banking machines. Specifically this invention relates to automated banking machines that have the capability of receiving financial instrument sheets such as currency notes, checks, and other documents from machine users. This invention also relates to automated banking machines that dispense financial instrument sheets to users of the machines.

BACKGROUND ART

The common type of automated banking machine used by consumers is an automated teller machine ("ATM"). ATMs enable customers to carry out banking transactions. Banking transactions carried out using ATMs may include the dispensing of cash, the making of deposits, the transfer of funds between account, and account balance inquiries. The types of banking transactions a customer can carry out are determined by the capabilities of the particular banking machine and the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin or other transactions required by merchants. Still other types of automated banking machines may be used by service providers in a transaction environment such as at a bank to carry out financial transactions. Such transactions may include for example, the counting and storage of currency notes or other financial instrument sheets, the dispensing of notes or other sheets, the imaging of checks or other financial instruments, and other types of service provider transactions. For purposes of this disclosure an automated banking machine shall be deemed to include any machine that may be used to carry out transactions involving transfers of value.

Many types of automated banking machines are required to handle financial instrument sheets. Such sheets or items may include for example, notes, checks, envelopes, or other documents that are representative of value or contain value. In some cases the financial instrument sheets may have varying properties from sheet to sheet. For example some sheets, such as currency notes, may be new and crisp while others that are equally valid may be used and worn. Alternatively, financial instrument sheets may be of different types which have different properties. These may include for example combinations of documents such as notes and checks which may be comprised of different types of paper or plastic materials. Mechanisms which may separate each individual sheet from a stack rapidly and reliably, particularly in situations where the sheets have diverse properties, present challenges.

Automated banking machines are often positioned in locations that are sometimes unattended by bank officials or representatives of other entities owning the machines. In such cases security features are desirable to make it more difficult for criminals to attack the machine and attain access to the valuable financial instrument sheets that may be housed therein.

Some automated banking machines are operated under conditions where they are exposed to the elements. In such situations rain or snow may enter openings in the machine and cause problems. This may be particularly true of sensitive mechanisms within the machine that handle financial instrument sheets.

Automated banking machines are useful because they perform banking functions in a generally rapid and reliable manner. However there are situations where machines must go out of service for preventive maintenance or remedial service. In such cases it is desirable to enable an unauthorized servicer to complete the maintenance activity as expeditiously as possible. This is desirably done by enabling ready access to the interior of the machine by authorized servicers while minimizing the risk of unauthorized access by criminals.

Thus, there exists a need for automated banking machines with improved properties related to handling financial instrument sheets, weather resistance, security, and service capabilities.

DISCLOSURE OF INVENTION

It is an object of an exemplary embodiment of the present invention to provide an automated banking machine.

It is a further object of an exemplary embodiment of the present invention to provide an automated banking machine that has improved capabilities for handling financial instrument sheets.

It is a further object of an exemplary embodiment of the present invention to provide an automated banking machine which provides enhanced security.

It is a further object of an exemplary embodiment of the present invention to provide an automated banking machine that facilitates user operation.

It is a further object of an exemplary embodiment of the present invention to provide an automated banking machine that has improved weather resistance.

It is a further object of an exemplary embodiment of the present invention to provide an automated banking machine that provides improved service access.

It is a further object of an exemplary embodiment of the present invention to provide a stack transporter device.

It is a further object of an exemplary embodiment of the present invention to provide an automated banking machine that can accept a stack of sheets for deposit and then relocate the sheets inside of the machine while the sheets remain in the stack.

Further objects of exemplary embodiments of the present invention will be made apparent in the following Best Mode For Carrying Out Invention and the appended claims.

Certain of the foregoing objects are accomplished in an exemplary embodiment of the invention by an automated banking machine which is an automated teller machine ("ATM"). The ATM includes a user interface which includes input devices for receiving identifying inputs that identify user accounts, as well as inputs from users that cause the machine to carry out transaction functions. The user interface further includes one or more output devices that output indicia such as instructions for a user in operating the machine.

The exemplary embodiment includes a cash acceptor mechanism that is capable of receiving a stack of documents from a user. In the exemplary embodiment the stack of documents may include a stack of notes of various denominations or a stack comprising mixed types of financial instrument sheets such as notes and checks. In order to identify and process these financial instrument sheets, the exemplary embodiment includes a mechanism which operates to separate each sheet individually from the stack. This is accomplished in the exemplary embodiment through movement of a picking member which includes a plurality of sheet engaging portions which engage a first sheet bounding the stack and urge the sheet to move in a first direction. In the exemplary embodiment the sheet engaging portions are separated by recesses which extend along the first direction. To reduce the risk that any sheets other than the first sheet are separated from the stack, a first stripper portion is generally aligned with at least one recess. The first stripper portion engages the first sheet on a face thereof opposed from the face of the sheet engaged by the sheet engaging portions. This first stripper portion is generally not in a contacting stripping engagement with the picking member, and remains disposed therefrom a sufficient distance to enable the first sheet to pass in intermediate relation between the picking member and the first stripping portion.

In the exemplary embodiment the engagement of the first sheet with the picking member and the first stripper portion is operative to impart a cross-sectional wave configuration to the sheet. Imparting this cross-sectional wave configuration and the forces imparted by the picking member and the first stripper portion generally operate to separate the first sheet bounding the stack from other sheets in the stack.

In the exemplary embodiment a second stripper portion is provided and is engaged by the first sheet as it moves in the first direction after the sheet has been engaged by the first stripper portion. The second stripper portion is generally engaged in contacting stripping engagement with the picking member. The second stripper portion is biased toward the picking member with such force that sheets other than the first sheet moving in the first direction are prevented from moving past the second stripper portion while the first sheet is enabled to pass between the picking member and the second stripper portion. In the exemplary embodiment the relative movement of the picking member in stripping engagement with the second stripper portion is operative in most cases to separate additional sheets from the first sheet that have not been separated by the first stripper portion. For example, financial instrument sheets may have different frictional and rigidity properties from sheet to sheet. For this reason the sheets that are not separated by the action of the picking member and the first stripper portion, will often be separated by the action of the picking member and the second stripper portion.

In the exemplary embodiment the picking member comprises a generally cylindrical member with arcuate high friction segments thereon for engaging the sheet. The high friction segments in the exemplary embodiment are separated by annular recesses. In the exemplary embodiment the first stripper portion includes a surface of a plurality of rollers that are positioned in generally opposed but non-contacting engagement with the annular recesses. The first stripper rollers in the exemplary embodiment are each in operative connection with a one-way clutch which resists movement of the rollers in a rotational direction in which the rollers are urged to move as the first sheet is being separated by the stack. The one-way clutches, however, enable ready movement of the sheet in the opposite direction so as to return a sheet to the stack. This may be done in some embodiments when it is detected that a double sheet has been picked and it is desired to reverse the sheet in an attempt to strip all but a single sheet. In the exemplary embodiment the second stripper portion includes a surface of at least one contacting stripper roll that is biased into stripping engagement with a sheet engaging portion of the picking member. The contacting stripper roll is similarly in operative connection with a one-way clutch so as to resist movement of the sheet being removed from the stack to provide stripping while enabling movement of the sheet to return to the stack. It should be understood, however, that this arrangement is exemplary and in other embodiments other approaches may be used.

The exemplary embodiment of the ATM further includes a housing. The housing includes a fascia which includes elements of the user interface and which extends through an exterior wall of a structure. The ATM housing within the structure includes a secure chest portion in a lower part of the housing. In the exemplary embodiment the chest is a generally L-shaped chest in cross section. In the exemplary embodiment the L-shaped chest has a sheet accepting mechanism such as a cash acceptor device positioned in supporting connection with the chest. The cash accepting mechanism is operative to analyze sheets that have been separated from the stack by operation of the picking member and stripper portions, and to direct sheets that are to be stored in the machine into the chest portion through an opening in an upper surface of the chest. In an exemplary embodiment the cash accepting mechanism is movably mounted in supporting connection with the chest so that when a service door of the housing is opened, the cash acceptor mechanism may be moved rearward for purposes of servicing.

In the exemplary embodiment because the cash accepting mechanism is positioned outside the secure chest and may be moved to expose the opening, provisions are made for minimizing the risk that criminals may access the financial instrument sheets in the chest through the cash accepting opening. This is accomplished in the exemplary embodiment by providing a transport which moves financial instrument sheets transported into the chest from the cash acceptor, in a direction transverse to the cash accepting opening in the chest. After moving transversely relative to the cash accepting opening, the sheets are then transported to a note storage mechanism that may be comprised of storage compartments or other mechanisms for handling the sheets. In an exemplary embodiment a security plate is provided in intermediate relation between the transport which moves the sheets transversely from the opening of the chest, and the note storage mechanisn. The security plate reduces the ability of a criminal to access stored sheets through the cash accepting opening. Further, in the exemplary embodiment the driving force for the transport is provided by engagement of a driving member of the cash acceptor mechanism with a driven member through the cash accepting opening. The presence of these members within the opening further obstructs the opening and reduces the risk that a criminal will be able to access stored financial instrument sheets.

In the exemplary embodiment the cash accepting mechanism is provided with a chute for receiving stacks of documents from the user. In the operative position of the cash acceptor mechanism the opening to the chute is controlled by a gate. However, as can be appreciated, it is necessary for the machine to open the gate to enable a user to place or remove sheets from the chute. In some circumstances rain, snow and moisture may enter the chute when the gate is open. The presence of rain, snow, or moisture in the chute may interfere with the proper operation of the machine. To minimize this risk in the exemplary embodiment, a water capturing opening is provided in a lower surface of the interior of the chute. The water capturing opening is operative to capture moisture that may enter the chute and the collected moisture is routed in an exemplary embodiment to a drain to that is in fluid communication with the outside of the machine housing. In the exemplary embodiment the drain is provided through a lower surface of the fascia. Also in the exemplary embodiment because the cash acceptor mechanism is movable, a resilient gasket is provided in generally surrounding relation with the chute and interiorly of the fascia. In the operative position of the cash acceptor mechanism the resilient gasket provides a generally fluid type seal such that water, snow, or other elements are not enabled to migrate into the interior of the housing through the opening in the fascia through which the chute extends in its operative position.

In the exemplary embodiment the cash acceptor mechanism is operative to store unacceptable sheets such as suspected counterfeit notes in a suspect note storage area outside the secure chest. In the exemplary embodiment authorized servicers who have access to the area of the housing outside the secure chest are enabled to remove these unacceptable sheets. A readily accessible closure device is provided to facilitate the removal of these suspect sheets by authorized persons. Further, in some embodiments locking mechanisms may be provided not only for the housing area outside the secure chest, but also a separate locking mechanism for the particular compartment in which the unacceptable sheets are stored. This assures that the unacceptable sheets are only accessed by authorized persons while still assuring that other authorized persons can access appropriate machine components without accessing the stored unacceptable sheets.

In the exemplary embodiment the cash acceptor mechanism further includes closure panels which generally surround the components within the mechanism. These closure panels when in the operative position reduce the risk of migration of dirt or other contaminants into the mechanism they also reduce the risk of inadvertent damage to the mechanism when other components are being serviced. In the exemplary embodiment these closure panels are made readily openable through hinged or sliding arrangements that enable the panels to be opened when the mechanism is in a servicing position. In exemplary embodiments an approach is used for mounting closure panels to facilitate gaining access to the components of the cash accepting module, while assuring that the panels will be replaced upon completion of any repair activity. This assures that the benefits provided by the closure panels are not inadvertently lost due to the failure to reinstall such panels after the completion of the servicing activity.

In some exemplary embodiments currency sheets accepted by the cash acceptor mechanism are stored in selected compartments. This enables storing of each type of sheet in a particular compartment. In some embodiments mechanisms are provided for re-dispensing such sheets from the compartment so as to enable recycling of valid sheets. In alternative embodiments sheets that have been validated by the cash accepting mechanism are stored in one or more storage containers. In some exemplary embodiments the storage containers include an interior area which is bounded at the lower end by a moveable shaker member. The shaker member supports deposited sheets in the interior area. An actuator is in operative connection with the shaker member so as to impart shaking action to the deposited items within the interior of the container. This facilitates the dispersal and settling of the items so as to facilitate storing the maximum number of items in the container. In some exemplary embodiments the container is removable from the machine. In some further exemplary embodiments the container includes rollable supports and a retractable handle so as to facilitate moving the container out of and away from the machine when it has been filled with deposit items. Although the exemplary embodiment is described with regard to storing sheets, the principles may be applied to the storage of other items such as tickets and deposit envelopes.

In some exemplary embodiments of the machine the user interface includes multicolor light emitting devices so as to facilitate a user's operation of the machine. In some exemplary embodiments the light emitting devices are selectively controlled by at least one controller in the machine to emit light of a selected color responsive to conditions of associated transaction function devices. For example, the controller may operate to guide a user to a location on the user interface where the user is required to perform some activity related to a transaction. In some exemplary embodiments the light emitting devices selectively emit green, yellow and red and may be operated to indicate a status or condition of a particular device. Alternatively, light emitting devices may flash the same or different colors at varying rates so as to convey information or facilitate use of the machine.

In some exemplary embodiments the user interface of the machine is provided with horizontally disposed convex mirrors positioned vertically above the user interface. Such mirrors are positioned so as to facilitate the ability of a user of the machine to view an area behind and otherwise near the user. This reduces the risk of persons in proximity to the user not being observed by the user carrying out transactions at the machine. The exemplary horizontally disposed convex mirrors are further positioned outward relative to a light which illuminates the user interface to facilitate the user's operation. This reduces the risk of glare and facilitates the user's ability to view the area observable in the mirrors.

Further novel aspects of the exemplary embodiment will be made apparent in the following detailed description. It should be understood that the features described are exemplary and in other embodiments other approaches may be used which nonetheless employ the inventions as claimed herein.

BEST MODE FOR CARRYING OUT INVENTION

Figure 1:
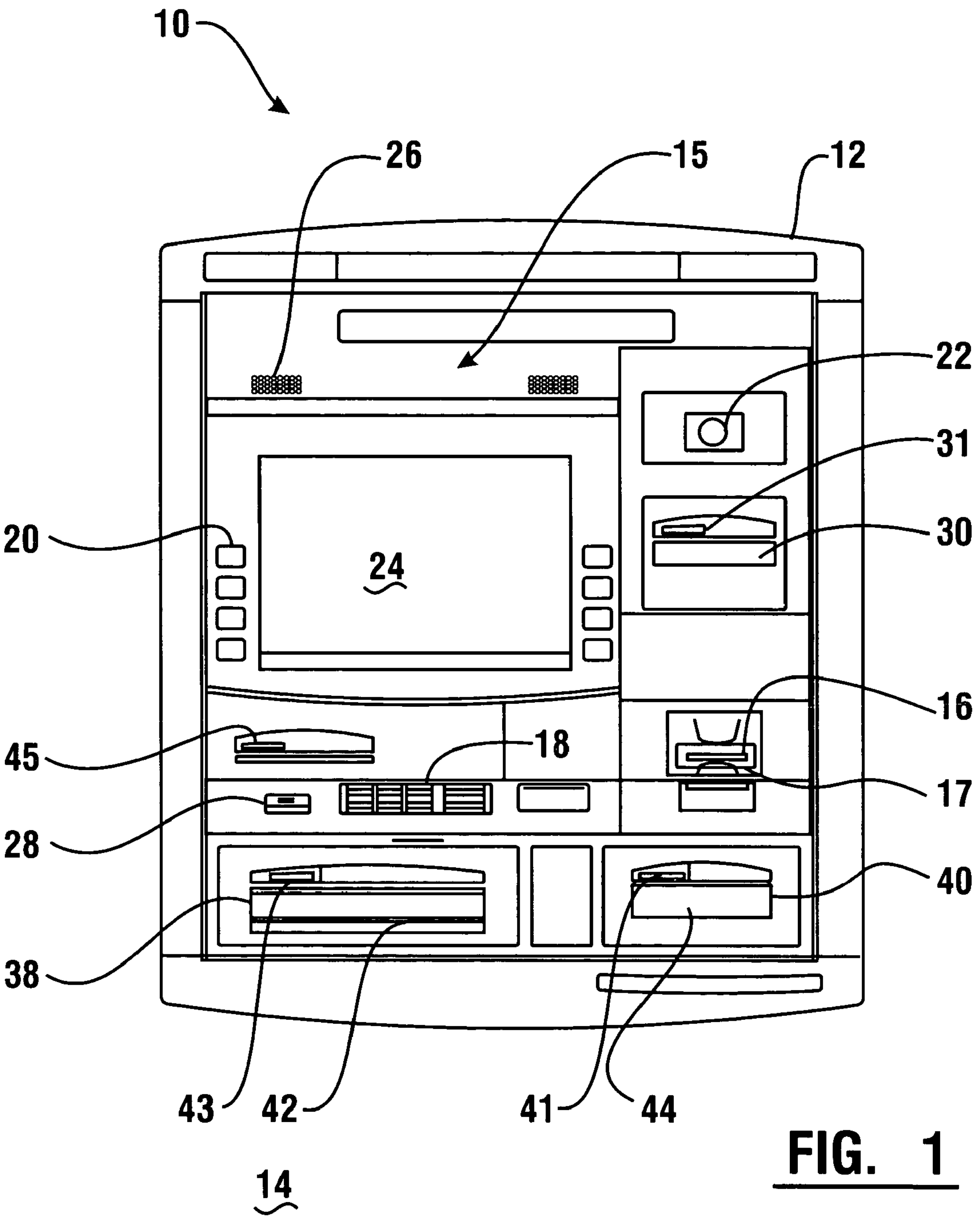
FIG. 1 is a front plan view of an ATM fascia of an automated banking machine of an exemplary embodiment of the present invention.

Referring now to the drawings and particularly to FIG. 1, there is shown therein a front plan view of an automated banking machine which in the exemplary embodiment is an automated teller machine ("ATM") 10. ATM 10 is a through-the-wall type machine which includes a fascia 12. Fascia 12 is accessible to users of the machine who are positioned externally of the wall 14. In some embodiments wall 14 may be an exterior building wall and the ATM 10 may be used in a walk-up or drive-up environment. In other embodiments the ATM may be used in an indoor environment. Of course this configuration is exemplary and in other embodiments, other types of ATM configurations may be used. For example, the ATM may be a stand alone type of self service terminal and located in an outdoor environment.

The exemplary ATM includes a user interface generally indicated 15. The user interface of the exemplary embodiment includes input devices for receiving inputs from users. These input devices include a card reader 16, a keypad 18, function keys 20 and an imaging device 22. In the exemplary embodiment the input devices may be used for providing identifying inputs such as indicia read from cards, numerical data or biometric data which may be used to identify a particular user of the machine and/or their accounts. In addition the exemplary input devices are also operative to receive transaction inputs which cause the ATM to carry out selected transaction functions. It should be understood that these input devices are exemplary and in other embodiments other types of input devices may be used. The exemplary user interface 15 further includes output devices. The output devices of the exemplary embodiment include a display 24, a speaker 26 and a headphone jack 28. The output devices of the exemplary embodiment are operative to output indicia either visual, audible or both, which are usable to operate the ATM. Of course the output devices shown in user interface 15 are exemplary and in other embodiments other or additional output devices may be used.

The exemplary ATM 10 further includes other transaction function devices. These transaction function devices include a receipt printer 30 which is operative to provide receipts to users of the machine. As shown in more detail in the interior view of the machine shown in FIG. 2, the receipt printer includes a paper supply 32 which supplies paper on which receipts are printed by a printer mechanism 34. Printed receipts are then transported to the receipt opening in the fascia 12 by a transport 36. In exemplary embodiments the receipt printer used may be of the type shown in U.S. Pat. No. 5,850,075, the disclosure of which is incorporated herein by reference. Of course in other embodiments other types of receipt printers may be used.

The exemplary ATM 10 includes on the fascia, as shown in FIG. 1, a cash dispensing opening 38 and a cash accepting opening 40. Each of these openings is in operative connection with corresponding transaction function devices as later discussed, and each has an associated gate mechanism which operates to block access through the opening except at appropriate times during transactions by authorized users. In the exemplary embodiment the cash dispensing opening is shown controlled by a gate 42 and the cash accepting opening is controlled by a gate 44. It should be understood that the fascia and devices associated with ATM 10 are exemplary and in other embodiments other or different fascia configurations and devices may be used.

The ATM 10 can be a recycler type of currency dispensing ATM. Currency sheets that the ATM received from a machine user can be stored in the machine for later dispensing to another user. Thus, valid currency notes can be recycled. The currency recycling arrangement reduces the amount of servicing needed to reload the machine. In some exemplary embodiments the currency recycling ATM may be of the type shown in U.S. Pat. No. 6,290,070 or U.S. Pat. No. 6,302,292, the disclosures of which is incorporated herein by reference.

In the exemplary embodiment the user interface of the machine includes a plurality of multicolor light emitting devices 17, 31, 41, 43 and 45. Each of the light emitting devices is positioned at a location adjacent to the location on the user interface which is associated with a particular transaction function device. For example, light emitting device 17 is positioned adjacent to the opening to card reader 16. Likewise, light emitting device 31 is positioned adjacent to the slot for delivery of receipts. Likewise, light emitting device 41 is associated with cash-accepting opening 40, and light emitting device 43 is associated with cash-dispensing opening 38. As later explained, in this exemplary embodiment the multicolor light emitting devices are selectively operated to output light of a particular color responsive to conditions of the associated transaction function device. Such features may be used to guide a user in operation of the machine, provide indications concerning the status of devices, alert a user to particular conditions, or provide improved aesthetics for the machine.

Figure 2:
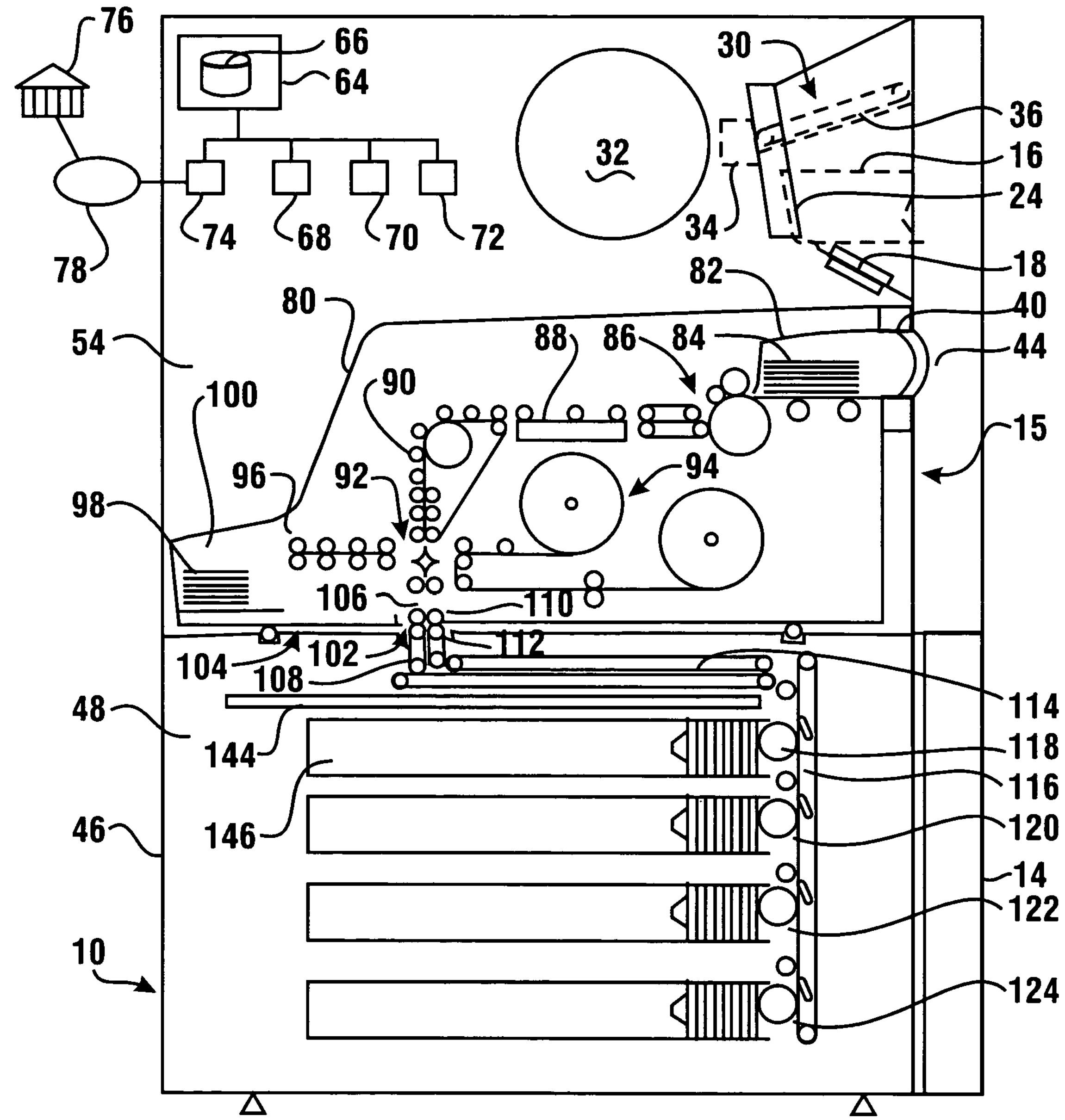
FIG. 2 is a schematic side view of components within a housing of the ATM shown in FIG. 1.
Figure 3:
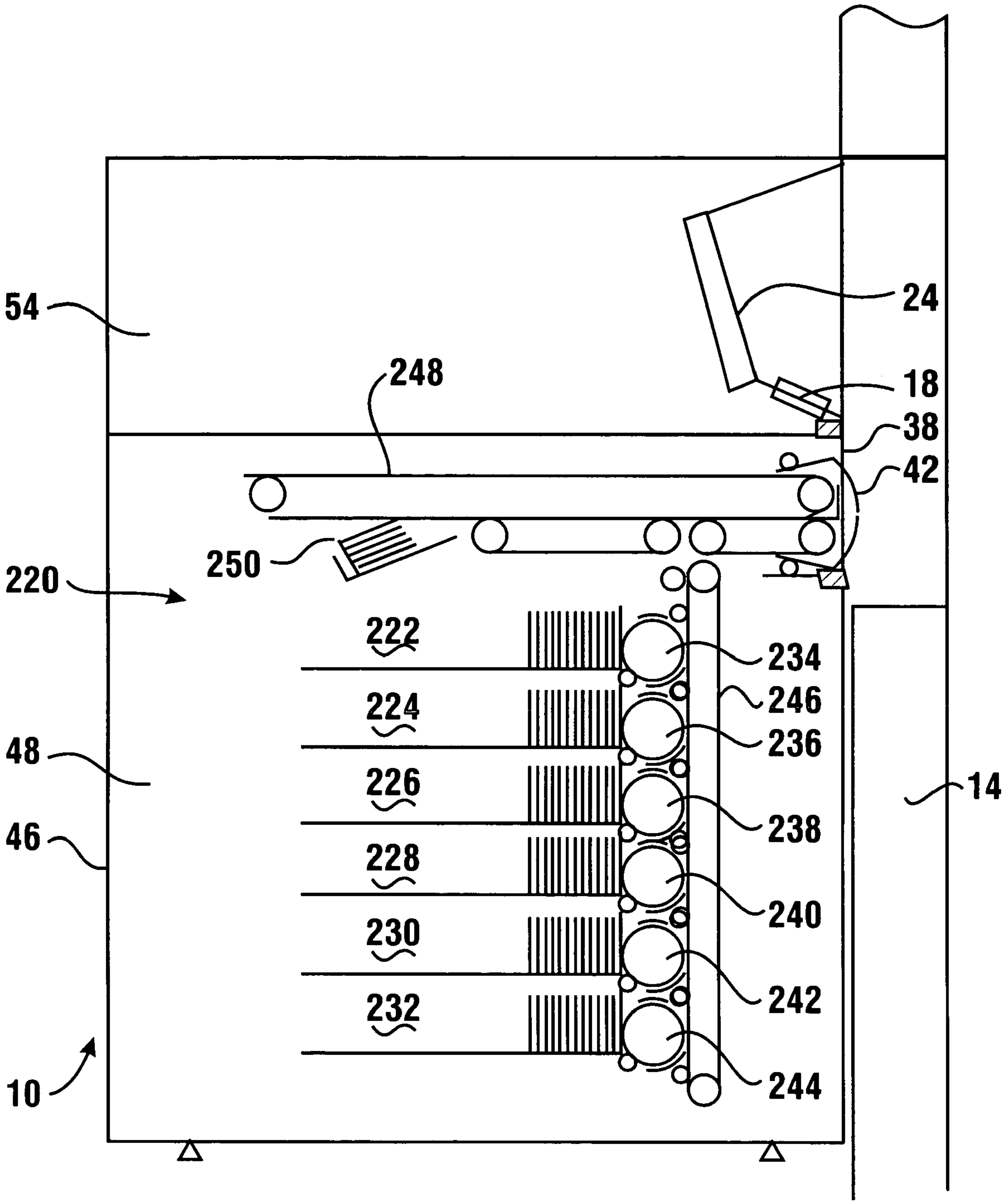
FIG. 3 is a further schematic side view of components within the housing of the ATM shown in FIG. 1.
Figure 6:
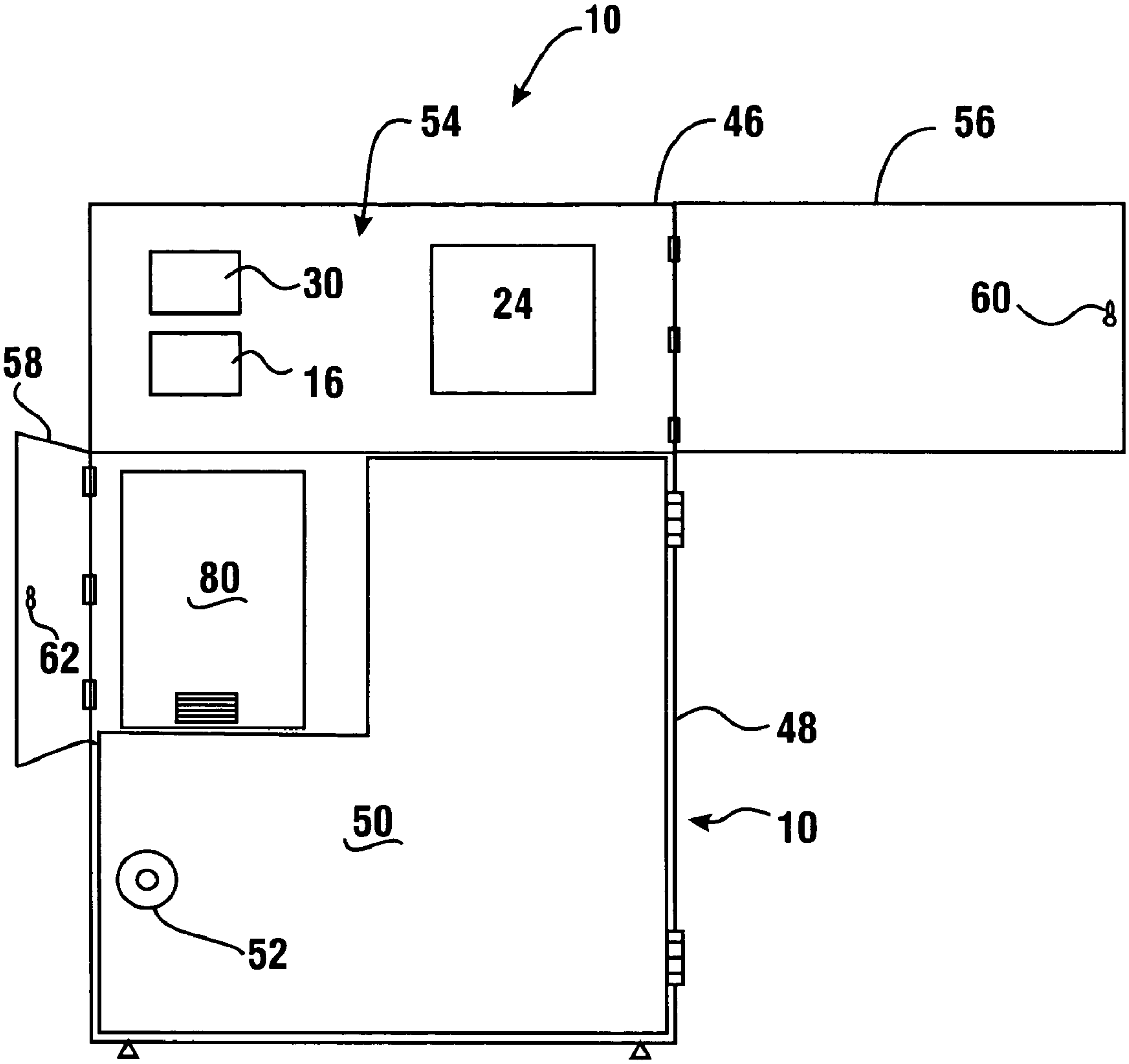
FIG. 6 is a rear view of the housing of the ATM of the exemplary embodiment.
Figure 7:
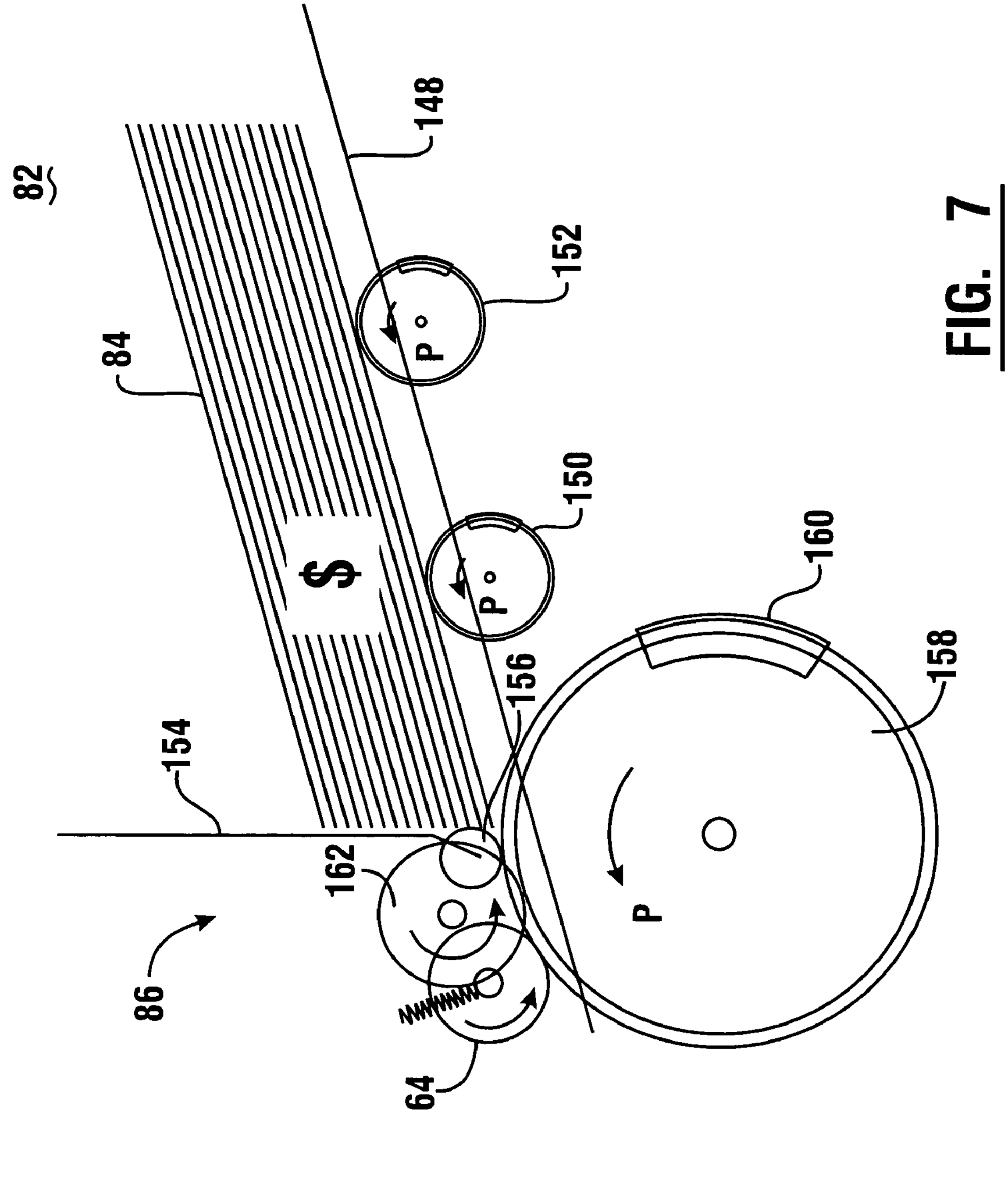
FIG. 7 is a schematic view of an exemplary embodiment of a mechanism for separating sheets from a stack of financial instrument sheets placed within the ATM.

As shown in FIGS. 2, 3 and 6, ATM 10 includes a housing 46 which extends generally on an interior side of wall 14. Housing 46 includes a chest portion 48. In the exemplary embodiment chest portion 48 is a generally secure chest which has a safe-like access door 50. Access to the interior of the chest portion is limited to authorized personnel through a suitable locking mechanism schematically indicated 52 (see FIG. 3). In the exemplary embodiment the chest is generally L-shaped in cross section.

Housing 46 further includes an upper portion 54. Upper housing portion 54 which is in connection with the fascia, is in supporting connection with the chest portion 48. In the exemplary embodiment upper housing portion 54 has in association therewith, access doors 56 and 58. Access to the upper housing portion is controlled by one or more locking mechanisms in operative connection with access doors 56 and 58 as represented by key locks 60 and 62. In the exemplary embodiment the secure chest portion 48 is used to house financial instrument sheets such as currency notes, checks and other valuable sheets. The upper housing portion 54 is generally used to house components of the machine that do not hold on an extended basis notes or other financial instrument documents which can be redeemed for value. Of course it should be understood that the construction of ATM 10 is exemplary and in other embodiments other approaches may be used.

As schematically shown in FIG. 2, ATM 10 includes at least one controller schematically indicated 64. In the exemplary embodiment controller 64 includes at least one processor and is in operative connection with at least one data store schematically indicated 66. In the exemplary embodiment the data store is operative to hold data representative of instructions such as computer programs, configuration parameters, data about transactions conducted and other information that may be usable in the operation of the ATM 10.

Controller 64 is in operative connection with numerous transaction function devices within the ATM, and is operative to control the operation thereof in accordance with its programming. Controller 64 is shown schematically in operative connection with devices 68, 70 and 72. It should be understood that this representation is schematic only and is intended merely to represent numerous components within the machine which are in operative connection with the controller. For example the transaction function devices may include moving devices such as motors, solenoids and other devices that are operative to impart motion to components. Likewise transaction function devices may include sensors such as radiation sensors, proximity sensors, switches and other types of sensors that are operative to sense items, conditions, properties, characteristics, or components within the ATM and to enable a controller to perform functions in accordance with its programming. Transaction function devices include output devices such as sound emitters and light emitting devices. For example and without limitation, transaction function devices may include the card reader, display, keyboard, function keys, printer, cash dispenser, cash acceptor, storage mechanisms and other devices previously discussed as well as other devices within the machine which are operative in response to the controller.

In the exemplary embodiment the controller is also in operative connection with a communications device schematically indicated 74. The communications device is operative to communicate messages electronically between the ATM 10 and other computers in financial transaction processing systems. These may include for example communications with systems operated by banks, credit card networks, automated clearinghouses and other entities. In FIG. 2 the communications device 74 in the ATM 10 is schematically shown as providing communication with a financial institution 76 through a network 78. It should be understood that this communication configuration is exemplary and in other embodiments other communication arrangements may be used.

As represented in FIGS. 2 and 6, in the operative position of ATM 10 the housing 46 houses a sheet acceptor mechanism 80 which is also referred to herein as a cash acceptor mechanism. In the exemplary embodiment the mechanism 80 is operative to accept sheets from a machine user through the opening 40, to analyze each sheet for at least one property or characteristic, and to route the sheets selectively for storage within the housing of the machine based on the characteristics analyzed. It should be understood that in various embodiments these sheets may include currency notes, checks, envelopes, or other financial instrument sheets. It should further be understood that in exemplary embodiments the financial instrument sheets may be sheets comprised of different types of material such as paper, plastic, or combinations thereof. It should further be understood that references herein to a cash acceptor mechanism shall be deemed to encompass mechanisms which handle not only currency notes, but also other financial instrument sheets such as checks, money orders, gift certificates, vouchers, envelopes, etc.

As represented in FIG. 2, sheet acceptor mechanism 80 includes a chute 82 which extends through opening 40 in fascia 15 in its operative condition. As previously discussed, the user accessible opening to chute 82 is controlled by a movable gate 44. Gate 44 moves responsive to the controller 64 and enables authorized users to access the chute at appropriate times during transaction sequences.

In operation of the machine, users are enabled to insert a stack of financial instrument sheets schematically indicated 84, into the chute 82. The stack 84 of sheets may comprise currency notes, checks, or other forms of financial instrument sheets. The sheet acceptor mechanism 80 may also be referred to herein as a bulk sheet acceptor device.

In operation of the stack acceptor mechanism 80, sheets are individually separated or picked from the stack by a picker mechanism 86, an exemplary embodiment of which is later discussed in detail. Each picked sheet is transported individually from the picker mechanism past the validator device schematically indicated 88. The validator device 88 of the exemplary embodiment is operative to determine at least one characteristic of each sheet. This may include for example a determination as to whether the sheet is a note or check and if a note, the denomination and whether it is valid. If the document is a check, a determination may be made as to whether the check is genuine as well as the indicia associated with the maker of the check and the amount thereof. For example in some exemplary embodiments the validating device may be of the type shown in U.S. Pat. No. 5,923,415, the disclosure of which is incorporated herein by reference. Alternatively or additionally, a validating device having features disclosed in U.S. Pat. No. 6,554,185, the disclosure of which is incorporated herein by reference, may be used. Of course in other embodiments other types of validating devices such as imagers, readers, sensors and combinations thereof may be used. For example, in some embodiments the sheet accepting device may be operative to image instruments such as checks and provide data which can be stored and transmitted as an electronic reproduction of that check. In such circumstances an electronic reproduction of the check may be transmitted to remote locations so as to facilitate review and validation of the check. Alternatively or in addition, the electronic representation of the check may serve as a substitute for the physical paper check which thereafter enables the paper check to be cancelled and subsequently destroyed.

In the exemplary embodiment of the acceptor mechanism 80, sheets which have been analyzed through operation of the validator device 88 are moved through a transport 90 to a routing device 92. The routing device is operative responsive to the controller 64 to route sheets selectively to either an escrow device 94 or to a transport 96. Escrow device 94 generally operates to hold sheets in storage on a temporary basis. Such an escrow device may be of the type shown in U.S. Pat. No. 6,371,368, the disclosure of which is incorporated by reference herein. Escrow device 94 may be operative to accept sheets and store them. Thereafter responsive to operation of the controller 64 the escrow device may deliver those sheets to the routing device 92 which directs them along sheet paths in the machine to carry out transactions. Of course it should be understood that the escrow device shown is exemplary and in other embodiments other types of escrow devices may be used.

In the exemplary embodiment transport 96 is used to receive unacceptable sheets which have characteristics that do not satisfy certain parameters set by the machine. These may include for example, notes which have one or more characteristics which suggest that they are counterfeit. In other embodiments such sheets may include checks which have properties which suggest that they are reproductions or-forged or otherwise unacceptable. Of course in other embodiments other sheets may be deemed unacceptable. As schematically represented in FIG. 2, sheet acceptor mechanism 80 is operated to cause transport 96 to deposit suspect sheets schematically indicated 98 in a storage area 100. In the exemplary embodiment the suspect sheets are stored within the acceptor mechanism and outside of the secure chest so that they may be recovered by servicing personnel in a manner that is later discussed. Of course this approach is exemplary and in other embodiments other approaches may be used.

In the exemplary embodiment the acceptor mechanism 80 is operative responsive to signals from the controller 64 to cause financial instrument sheets that are determined to be valid or otherwise acceptable, to be directed through a sheet accepting opening 102 that extends in an upper surface 104 of the chest. In the operative position of the sheet acceptor mechanism 80 shown in FIG. 2, the transport 90 in the acceptor mechanism is aligned with the accepting opening 102 and a transport 108 that extends into the secure chest. As schematically represented in FIG. 2, in the operative position of the sheet acceptor mechanism 80 at least one driving member 110 of the transport 106 is in operative connection with a driven member 112 of the transport 108. In the exemplary embodiment this enables the acceptor mechanism 80 to transmit movement to sheet handling mechanisms within the secure chest and to assure coordinated movement of processed sheets therein. Further in the exemplary embodiment the driving and driven members extend in the sheet accepting opening 102 so as to block access therethrough by unauthorized persons as later discussed.

Figure 12:
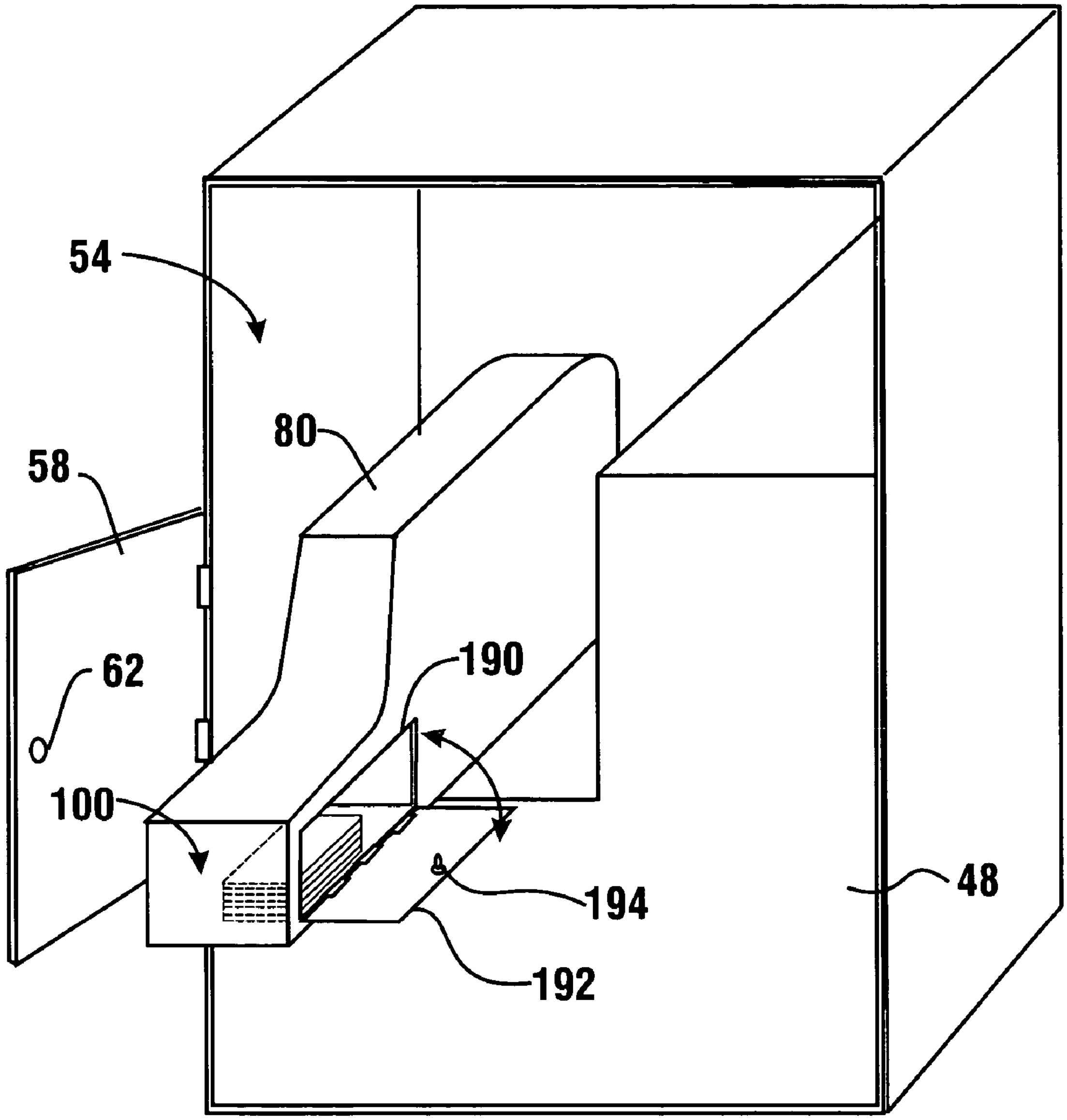
FIG. 12 is a schematic view of the cash acceptor mechanism withdrawn for servicing similar to FIG. 11 and with a first embodiment of an access door in an open position for purposes of accessing unacceptable sheets which have been identified through operation of the cash acceptor mechanism.
Figure 13:
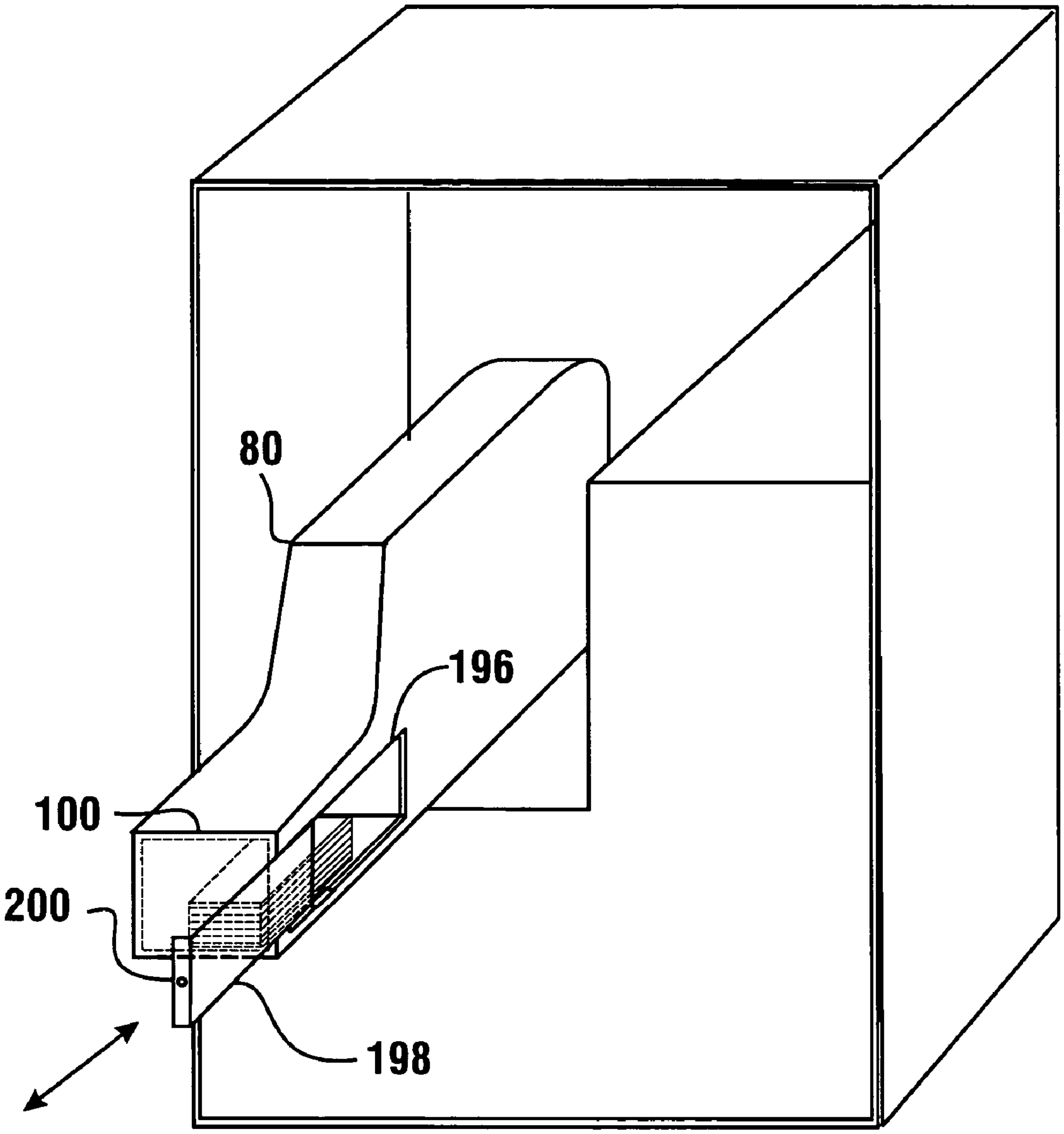
FIG. 13 is a view of the ATM similar to FIG. 12 but with an alternative access mechanism for accessing unacceptable sheets.
Figure 14:
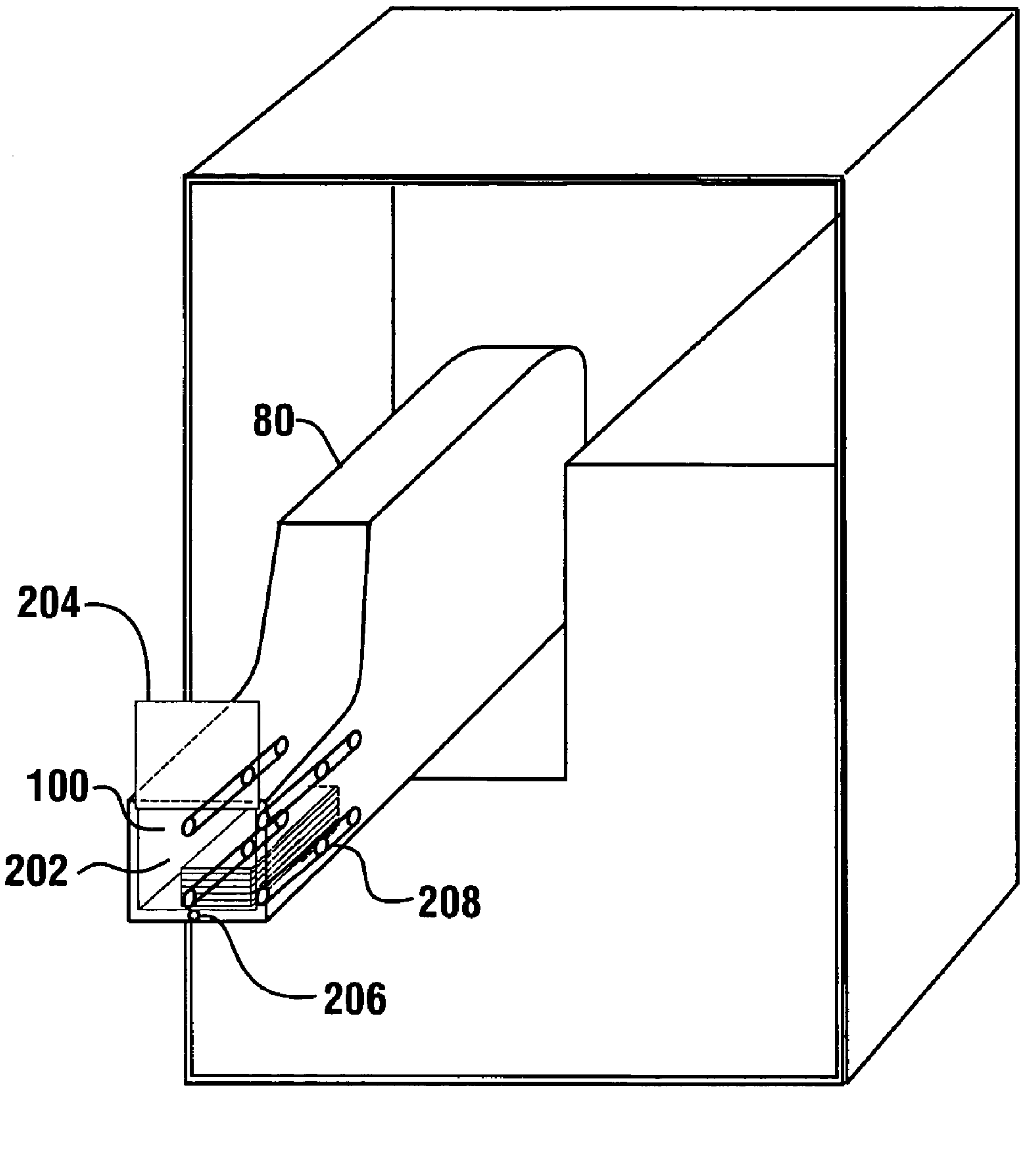
FIG. 14 is yet another view of the ATM similar to FIG. 12 showing a further alternative mechanism for accessing unacceptable sheets.

In the exemplary embodiment, when the acceptor mechanism 80 is moved from the operative position shown in FIG. 2 to a servicing position such as shown in FIGS. 12, 13 and 14, the driving member 110 and the driven member 112 disengage. In some exemplary embodiments the movement of the sheet acceptor mechanism 80 from the operative position to a servicing position may include movably mounting the acceptor mechanism such that the mechanism moves both upward away from the secure chest so as to disengage the driving and driven members as well as outward for purposes of servicing. Of course to return the acceptor mechanism to the operative position, movement thereof is made both inward and downward so as to reengage the driving and driven members. This may be accomplished by a combination of slides, rollers, or other suitable mechanisms. Of course the approach described of providing for engagement between the acceptor mechanism and a mechanism for handling sheets within a chest portion is exemplary and in other embodiments other approaches may be used, or the transport within the chest portion may have a separate motor or other moving device.

As shown in FIG. 2, transport 108 which moves sheets generally in a vertical direction through the accepting opening 102 is in operative connection with a horizontal transport schematically indicated 114. The horizontal transport is operative to engage sheets moved into the chest portion and to move them transversely away from the accepting opening 102. The horizontally extending transport 114 is in operative connection with a vertically extending transport 116 which is transversely disposed from the accepting opening 102 in the secure chest.

Vertical transport 116 is operative to move sheets selectively into engagement with sheet handling mechanisms 118, 120, 122 and 124. In some exemplary embodiments sheet handling mechanisms 118, 120, 122 and 124 may be sheet stacking mechanisms such as those shown schematically in FIGS. 5 and 6. Alternatively or in addition, in other embodiments one or more of the sheet handling mechanisms may include sheet receiving and dispensing mechanisms which are operative to selectively accept sheets for storage as well as to dispense sheets therefrom. Examples of sheet accepting mechanisms, sheet stacking mechanisms, unstacking mechanisms, and sheet dispensing mechanisms which may be used in some exemplary embodiments are described in detail in U.S. Pat. Nos. 6,302,393 and 6,290,070, the disclosures of each of which are incorporated by reference.

Figure 4:
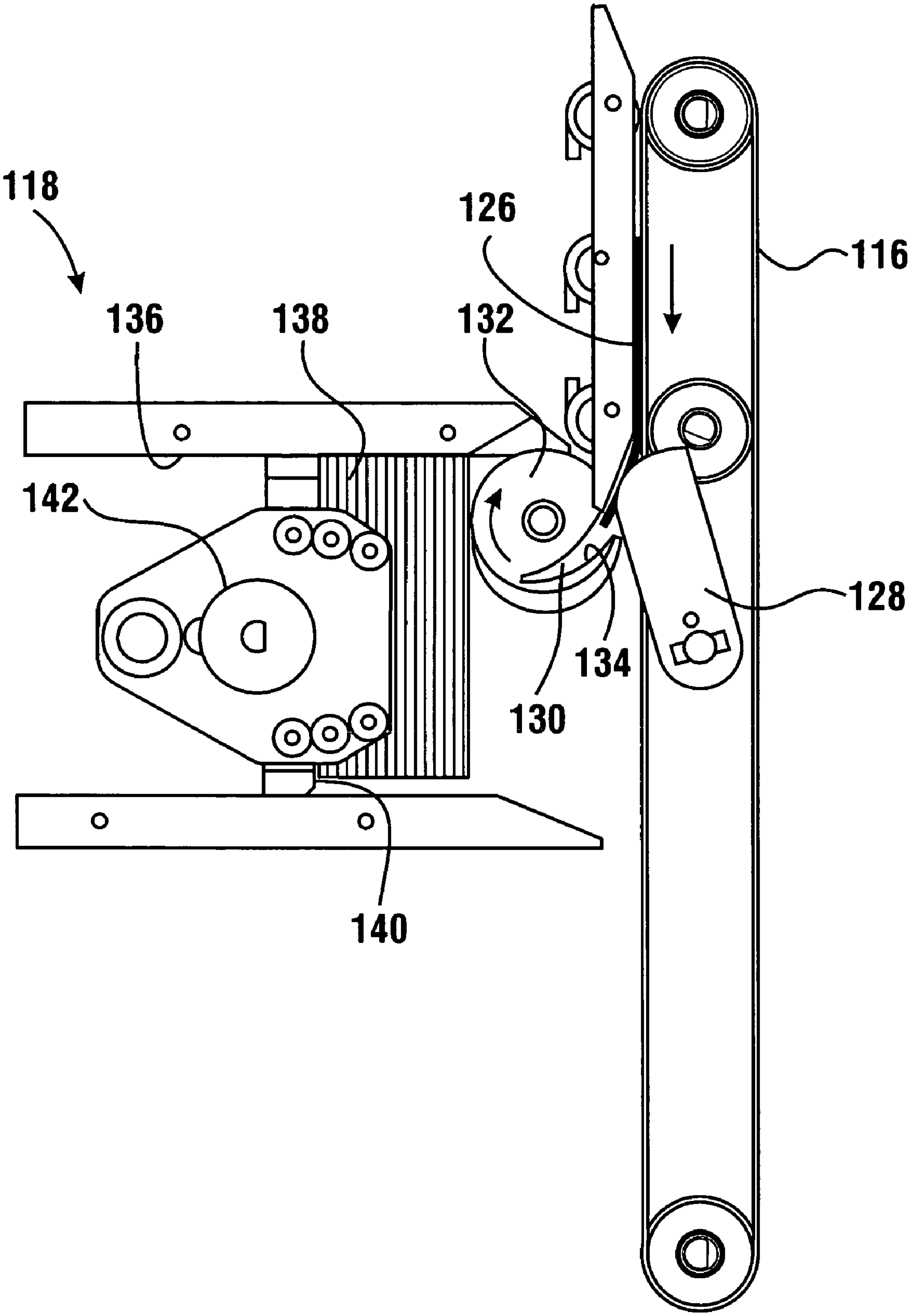
FIG. 4 is a view of a sheet stacking mechanism which may be employed in an exemplary embodiment of the ATM.

As shown schematically in FIG. 4, the exemplary sheet accepting and stacking mechanism 118 is selectively operative to accept a sheet 126 moving in the vertical transport 116. Sheet 126 is guided to engage the sheet handling mechanism 118 through movement of a gate member 128. The gate member moves responsive to the controller 64 to direct the leading edge of the sheet into a recess 130 of a rotatable member 132. As the leading edge of the sheet 126 enters the recess 130 the rotatable member 132 rotates in the direction of Arrow R. This causes the gripper portion bounding the recess 130 to move inwardly capturing the sheet 126 therein. The rotatable member 132 rotates until the leading edge of the sheet 126 engages a stop surface 136 at which time the gripper portion 134 has moved radially outward such that the sheet disengages from the rotatable member 132 and is integrated into a sheet stack 138. Stack 138 may be for example a stack of currency notes all of which are of the same denomination. Of course in other embodiments the stack 138 may be a collection of other types of sheets.

In the exemplary embodiment the stack is maintained in abutting relation with the rotatable member by a biasing plate 140 which acts against the back of the stack. The biasing plate 140 is movable responsive to a biasing mechanism 142 which is operative to enable the stack to increase or decrease while maintaining the sheets in an appropriately aligned position. Further details related to an exemplary embodiment of the sheet handling mechanism are described in the incorporated disclosure of U.S. Pat. No. 6,302,393.

Figure 5:
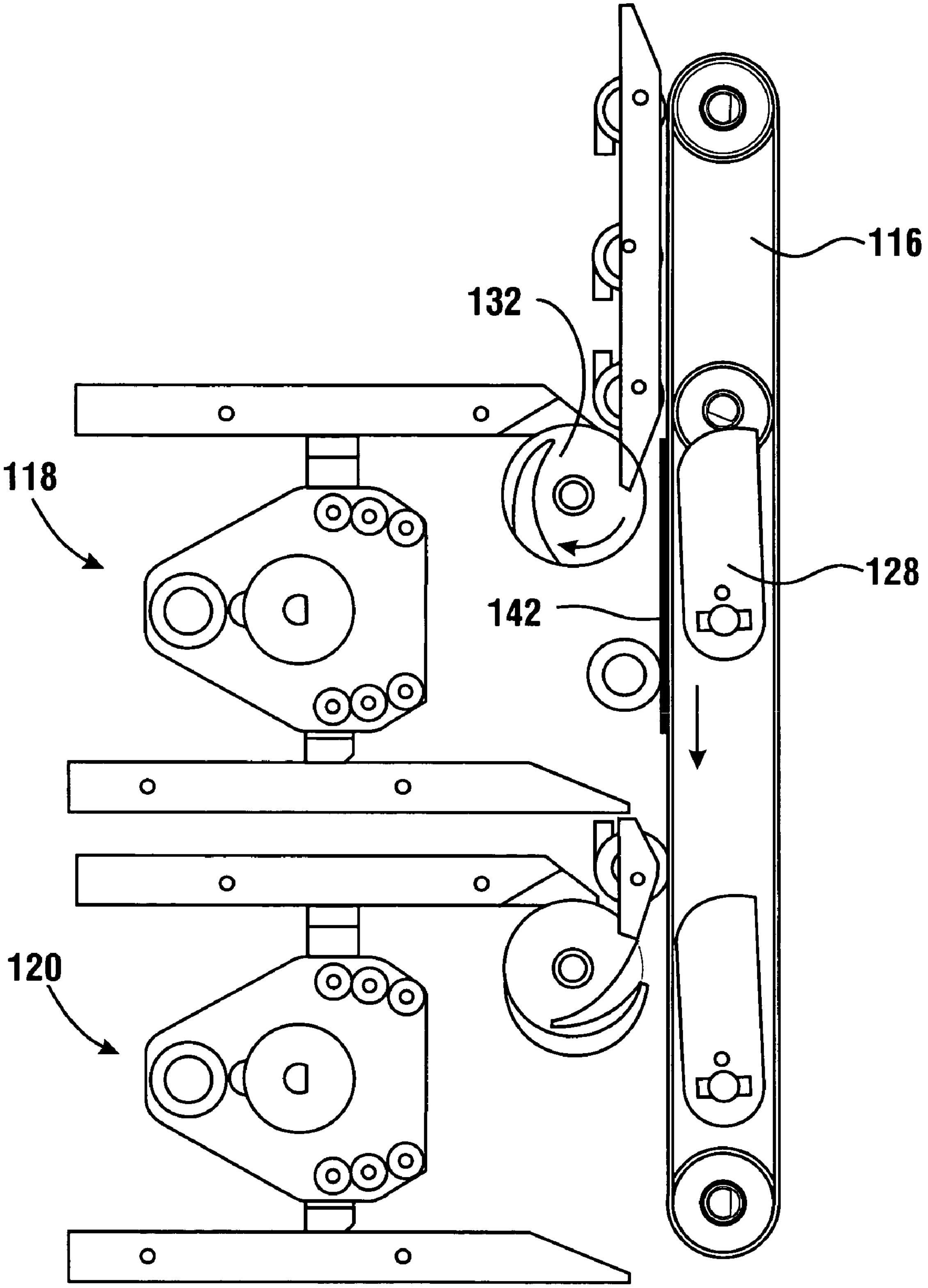
FIG. 5 is a further view of the exemplary sheet stacking mechanism which may be used to hold multiple types of sheets.

FIG. 5 further shows the exemplary operation of exemplary sheet handling mechanisms 118 and 120. In this case a sheet 142 moving in transport 116 is enabled to pass the rotatable member 132 when the gate member 128 remains retracted as the sheet passes. This enables the sheet to move to other sheet handling mechanisms such as sheet handling mechanism 120. This arrangement enables sheets having particular characteristics to be stored together, for example, valid currency notes of different denominations to be collected in stacked relation in selected sheet storage areas. Alternatively in other embodiments sheets of similar types such as checks may be segregated from other financial instrument sheets such as notes or travelers checks. In still other embodiments sheets which are to be recycled such as suitable fit currency notes can be segregated from valid yet worn or soiled currency notes which are not suitable for providing to customers. It should be understood that these approaches are exemplary and in other embodiments other approaches may be used.

Figure 11:
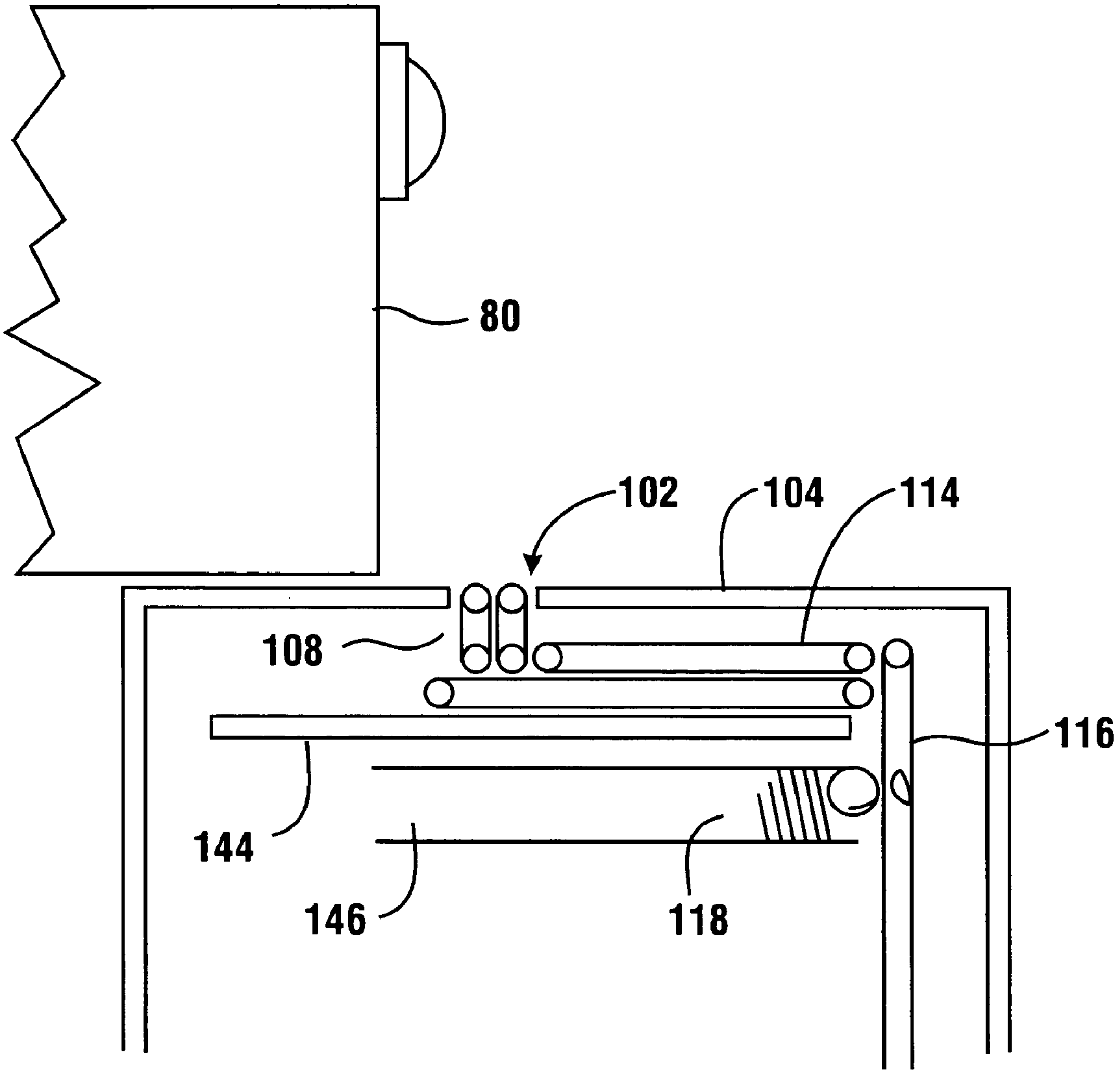
FIG. 11 is a schematic view showing a cash acceptor mechanism moved to a servicing position and exposing the cash accepting opening in an upper portion of the chest of the ATM.

In the exemplary embodiment shown in FIG. 2, a security plate 144 extends within the secure chest in intermediate relation between the horizontal transport 114 and the note storage mechanism such as the storage area 146 associated with sheet handling mechanism 118. The security plate 144 in the exemplary embodiment is secured within the interior of the secure chest and is adapted to prevent unauthorized access through the sheet accepting opening 102 in the chest. This may be accomplished by securing the security plate 144 to the walls bounding the interior of the secure chest or other suitable structures. As can be appreciated because in the exemplary embodiment the upper housing portion 54 houses the sheet acceptor mechanism 80, it is generally easier to access the area housing the sheet acceptor mechanism than the secure chest. In cases where criminals may attack ATM 10 and attempt to remove the sheet accepting mechanism, ready access through the accepting opening 102 is first blocked by the driving and driven members and other components of the transports 106 and 108. However, in the event that criminals attempt to clear away the transport mechanism components, access to the stored sheets in the note storage mechanisms is still blocked by the security plate. FIG. 11 shows greater detail of the sheet acceptor mechanism 80 retracted to a servicing position so as to expose the sheet accepting opening 102. In the exemplary embodiment the acceptor mechanism 80 is movably mounted in supporting connection with the chest portion on suitable slides or other members. As can be appreciated in this exemplary embodiment the security plate 144 operates to separate the sheet accepting opening 102 from the notes or other valuable financial instrument sheets which are stored below the security plate within the secure chest. Of course the security plate is exemplary and other forms of security plates or other structures may be used.

Figure 20:
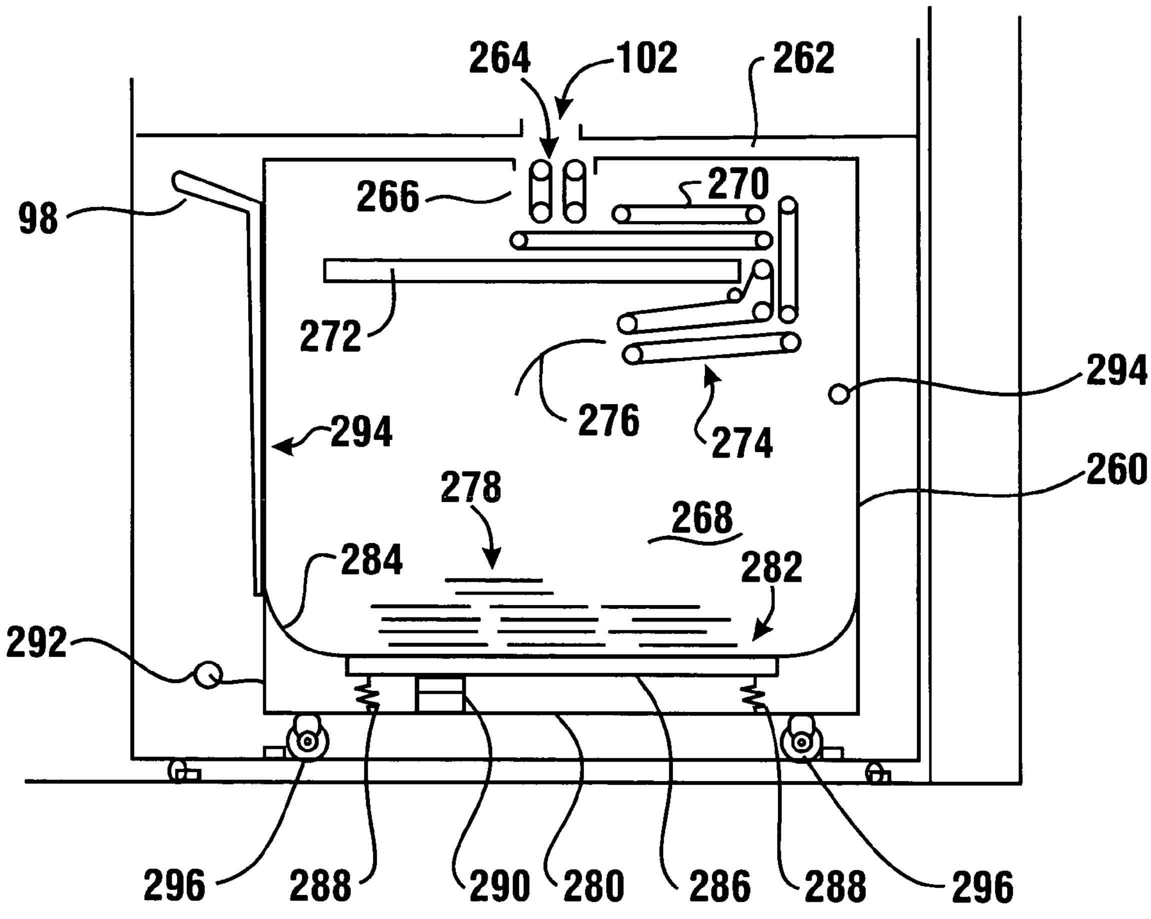
FIG. 20 is a transparent side view of an alternative form of a mechanism for accepting and storing financial instrument sheets that have been processed by the cash acceptor mechanism.

In an alternative embodiment the ATM includes a bulk storage container 260 shown in FIG. 20 for holding currency bills, notes, checks, or other items that have been deposited into the machine. The container 260 includes a top wall 262 with an opening 264 which corresponds to opening 102 in the chest when the container 260 is in the operative position. Container 260 includes a transport 266 which transports items that pass through the opening 264 into an interior area 268 of the container. A horizontal transport 270 is operative to move deposited items transversely away from the opening 264. A security plate 272 is positioned to reduce the risk of unauthorized access to the interior area 268. A further transport 274 is operative to move deposit items such as currency sheet 276 to a suitable location for being dispatched into the interior area 268 below the security plate. Deposited items schematically represented 278 are held within the interior area of the container 260.

In the exemplary embodiment the container 260 includes a bottom wall 280. The interior area 268 is bounded by a shaker member 282 that is disposed vertically above the bottom wall. In the exemplary embodiment the shaker member comprises a resilient flexible membrane 284. A rigid plate 286 extends in underlying relation of a central portion of the membrane. Flexible supports 288 support the rigid plate 286 above the bottom wall 280. The flexible supports further enable movement of the rigid plate and membrane relative to the bottom wall. In exemplary embodiments the rigid supports 288 may include springs or other members which enable relative vertical and/or horizontal movement of the bottom wall and the rigid plate.

In the exemplary embodiment an actuator 290 extends in intermediate relation between the bottom wall and the rigid plate. In exemplary embodiment the actuator is an electrical vibrating device which is operative to shake the rigid plate and overlying membrane. The shaking action of the actuator 290 is operative to impart shaking motion to the deposited items 278 that are in supporting connection with the membrane. This facilitates the dispersal and settling of deposited items and enables a relatively larger quantity of such items to be collected within the interior area 268 before such items need to be removed. In exemplary embodiment the actuator 290 is electrically connected to the circuitry within the machine through a releasable connector 292. This facilitates removal of the exemplary container as hereafter discussed. In addition, in some embodiments the moving devices for transports within the container may be supplied with signals and/or electrical power through the releasable connector.

In operation of the machine, the interior area 268 of the container 260 is in operative connection with the opening 38 in the housing of the machine through which deposited items are accepted. The deposited items are passed through the sheet accepting mechanism 80 or other mechanisms for processing such items. Items appropriate for deposit in the container are passed through the opening 102 in the top of the chest. Such items are transported by the transports 266, 270 and 274 to the area below the secure plate 272 and accumulate within the interior area 268. Periodically responsive to the controller, the actuator 290 operates to impart shaking motion to the deposited items 278 within the interior area. This facilitates settling of the items so as to densely pack the items therein. Sensors 294 may be included within the interior area so as to sense the deposited items. The controller may be operative to cause the actuator to shake deposited items responsive to the sensing the level of such items by the sensors. Alternatively the controller may be operative to shake deposited items based on elapsed time, number of items deposited, or other programmable bases. In the exemplary embodiment the sensors 294 may be in operative connection with the controller through the releasable connector 292.

The exemplary container 260 is removably mounted within the secure chest 48. The exemplary container is supported on rollable supports 296. The rollable supports 296 may be castors, wheels, ball rollers, or other type items that enable more ready movement of the container in a loaded condition. In the exemplary embodiment upon opening of the secure chest the container 260 is enabled to moved outward from the chest. This is facilitated by a servicer grasping a handle 298 which is attached to the container. The releasable connector 292 is enabled to be disconnected so that the container 260 can be pulled outward from the secure chest. As shown in greater detail in FIG. 21, in the exemplary embodiment the handle 298 is a telescoping handle that is enabled to be moved upward once the handle has cleared the secure chest. This facilitates moving the container outside of the ATM. Thereafter the container may be moved to a suitable location by the handle away from the ATM for purposes of removing the contents. This may be, for example, an area within a vault or other secure room in which the items within the container may be processed.

Figure 21:
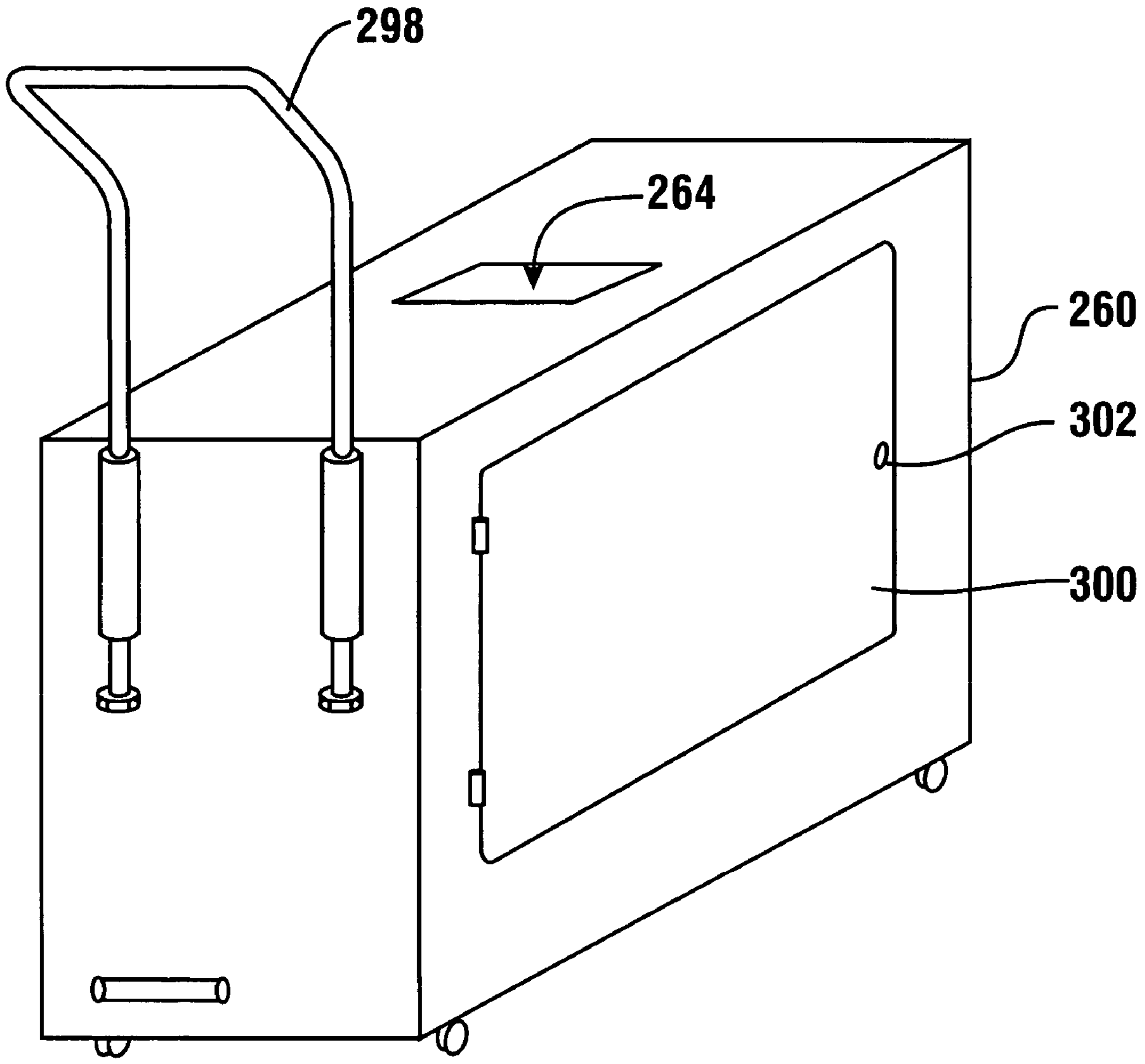
FIG. 21 is an isometric view of the financial instrument holding container shown in FIG. 20, moved outside the machine.

As represented in FIG. 21, the container 260 in the exemplary embodiment includes a door 300. Access to door 300 is controlled by one or more locks represented 302. In the exemplary embodiment door 300 is shown hinged at a side toward the chest door so as to reduce the risk of persons obtaining unauthorized access to the interior of the container when the container is within the machine. Once the container has been moved to a suitable location, the lock 302 may be unlocked, the door opened, and deposited items removed. After the items have been removed, the door 300 may be returned to the closed position. Thereafter the container may be reinstalled in the machine with the handle 298 being retracted so as to enable the container to again be aligned with opening 102. Further, the releasable connector 292 may be reconnected so as to again enable operation of the container within the machine.

As can be appreciated, the exemplary container 260 is enabled to hold a substantial quantity of deposited items. Further, the construction including the rollable supports and telescoping handle facilitates movement of the loaded container out of the ATM and the container into the ATM. It should be understood that the container is exemplary and in other embodiments other approaches may be used. These may include, for example and without limitation, containers which include multiple interior areas in which deposited items are supported on shaking members. Such embodiments may achieve, for example, a separation of deposited notes, checks and/or envelopes by denomination or deposit type, and achieve more densely packed storage within a particular interior compartment within the container. In addition or in the alternative, in other embodiments shaking members may be provided on side walls or on top walls bounding the container so as to facilitate the shaking of deposited items and the packing and storage thereof. In addition or in the alternative, containers may be used in some embodiments in conjunction with sheet handling mechanisms such that certain sheets are stored precisely positioned in containers for purposes of stacking and/or recycling while other sheets are stored in bulk within a container or compartment within a container. These alternatives are encompassed within the teachings of the present invention.

FIGS. 7 through 10 schematically describe an exemplary embodiment of the picker mechanism 86 used in the sheet accepting mechanism 80. In this exemplary embodiment the stack of sheets 84 is positioned in the chute 82 and is in supporting connection with a generally angled lower surface 148. Moving members 150 and 152 are operative to engage the stack and selectively rotate responsive to a motor or other mechanism in the direction of Arrow P so as to move the stack into generally abutting relation with an engaging surface 154. Positioned adjacent to the engaging surface 154 in proximity to the lower surface 158 is an idler roll 156 which is a generally free wheeling roll. The engagement of the stack 84 of the engaging surface 154 and the face of the roll 156 is operative to splay the sheets as shown.

The picker mechanism 86 further includes a generally cylindrical picking member 158. Picking member 158 is rotatable selectively by a motor or other driving member responsive to the controller 64. The picking member during picking operation rotates in the direction of Arrow P as shown. Picking member 158 further includes high friction arcuate segments 160 which in the exemplary embodiment serve as sheet engaging portions and which extend about a portion of the circumference of the picking member.

Picker mechanism 86 of the exemplary embodiment further includes a plurality of rolls 162 that serve as non-contact stripper rolls in a manner later discussed. The picking mechanism further includes a contact stripper roll 164 which biasingly engages the high friction segments 160 of the picking member.

Figure 8:
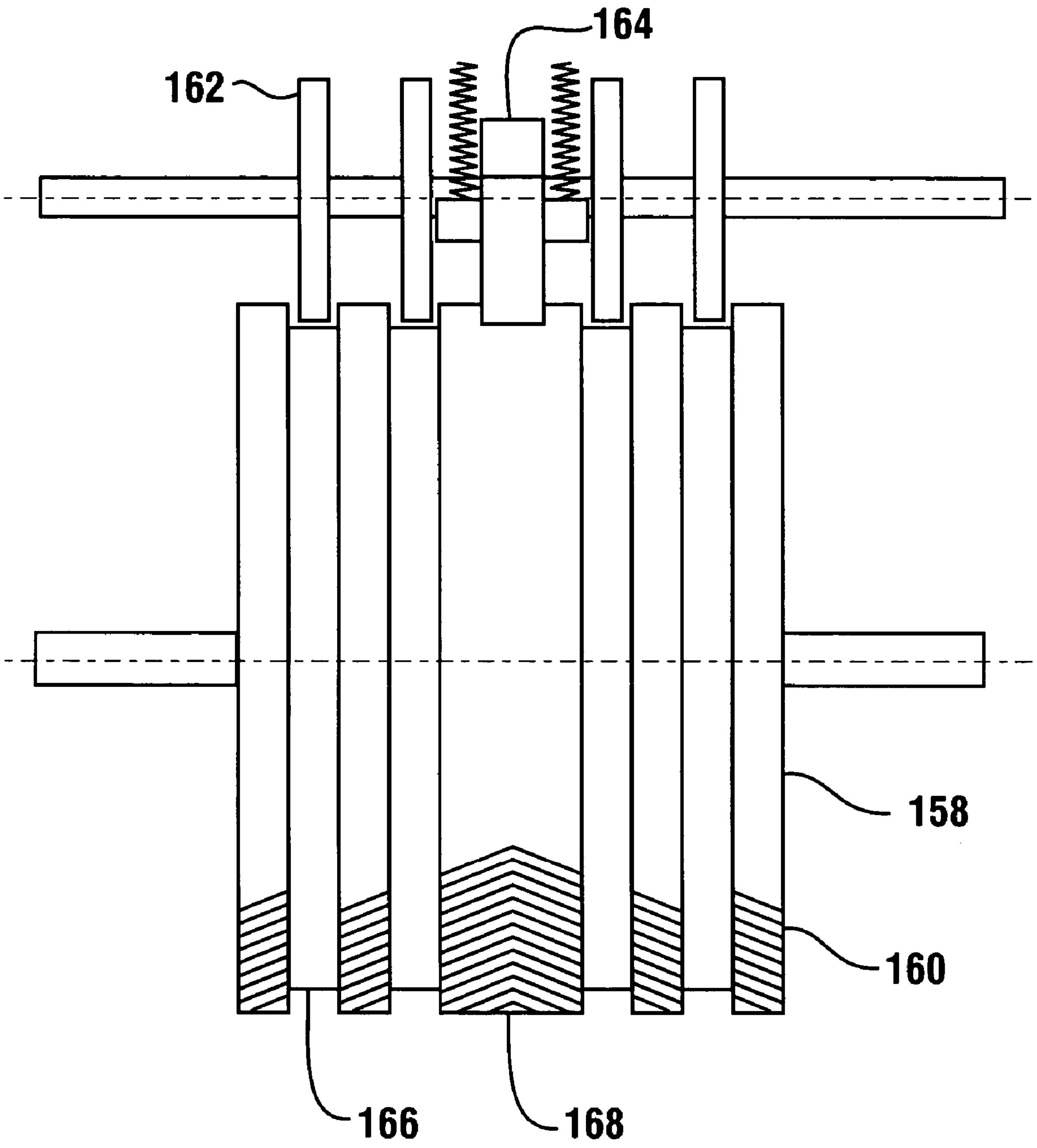
FIG. 8 is a front plan view of an exemplary picking member in combination with a plurality of non-contacting stripper rolls and a contacting stripper roll used for separating individual sheets from the stack.

As represented in FIG. 8, the picking member is a generally cylindrical member that includes a plurality of annular recesses 166. The outer surface of the non-contact stripper rolls 162 extend into a corresponding annular recess 166, but are generally not in stripping engagement therewith. As represented in the exemplary embodiment of FIG. 8, the outer surface of the non-contact stripper rolls 162 are disposed slightly away from the base of the annular recess. As a consequence the outer surface of the non-contact stripper rolls which serve as a first stripper portion are not positioned to be in direct contact stripping engagement with the picking member. However, because the surface of such rolls is disposed in close proximity thereto and generally enables only a single sheet to pass between the picking member and the non-contact stripper rolls, the separation of a single sheet from other sheets is generally achieved. It should be understood however that while in the exemplary embodiment the non-contact stripper rolls are disposed slightly from the picking member, in other embodiments such rolls or other stripper members may operate to actually contact the picking member but may be of such resilient consistency or other properties that the rolls are not in a biased contact stripping engagement as is the case with the contact stripper roll 164.

As shown in FIG. 8 the contact stripper roll is biased to engage a central sheet engaging portion 168 of the picking member. This central sheet engaging portion is generally centered with regard to sheets that are moved by the picker mechanism 86. This reduces the tendency of sheets to twist or skew as they are being moved in the picker mechanism. Of course it should be understood that this arrangement is exemplary and in other embodiments other approaches may be used.

Figure 9:
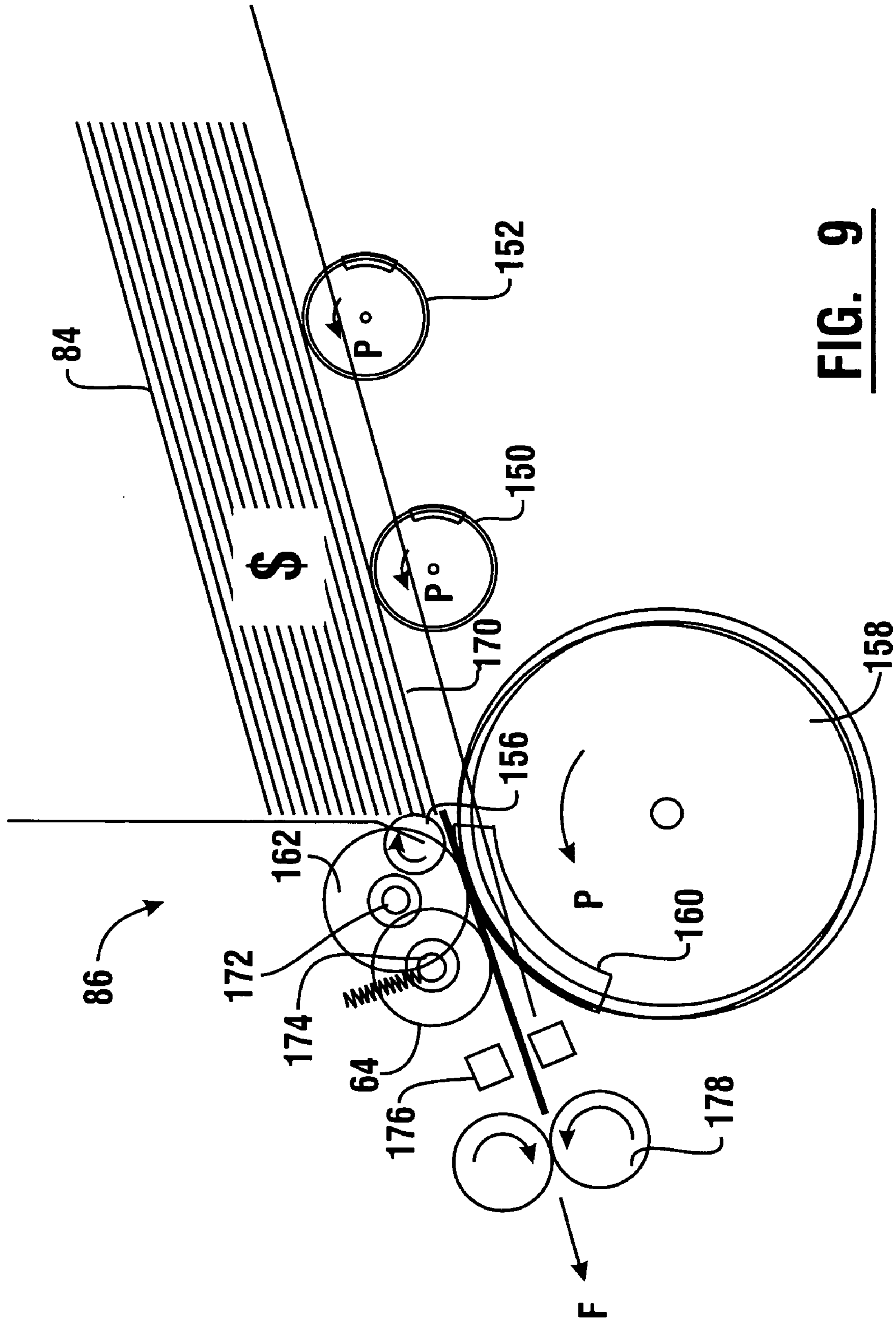
FIG. 9 is a schematic view showing separation of a first sheet from a sheet stack through operation of the mechanism shown in FIG. 7.
Figure 10:
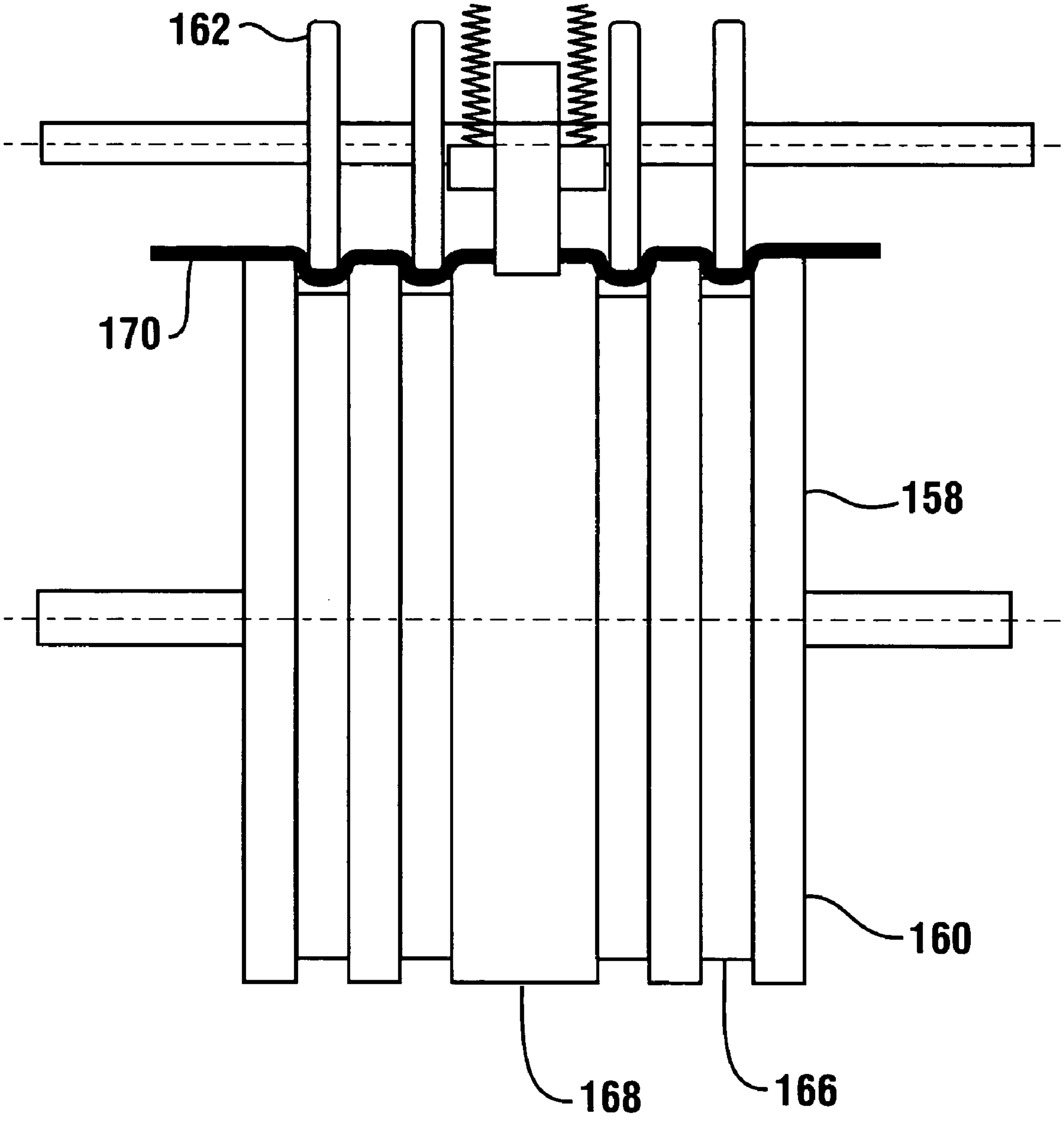
FIG. 10 is a view showing a cross-sectional wave configuration imparted to a sheet through action of the picking member and the non-contacting stripper rolls.

The operation of the exemplary picker mechanism 86 is represented in FIGS. 9 and 10. The picker mechanism is operative to separate sheets individually from the stack 84. This is done by sequentially picking a first sheet 170 which bounds the lower end of the stack while moving the first sheet in a first direction generally indicated by Arrow F so as to move the sheet away from the stack. To accomplish this the controller 64 operates motors or other moving mechanisms to cause the moving members 150 and 152 to rotate as the picker mechanism 168 similarly rotates in a counterclockwise direction as shown. The rotation of the picking member causes the high friction arcuate segments 160 which serve as sheet engaging portions to engage a lower face of the first sheet and pull the sheet in intermediate relation between the picking member and the non-contact stripper rolls 162. As the first sheet is moved the idler roll 156 rotates to facilitate the movement of the first sheet between the picking member and the non-contact stripper rolls.

The non-contact stripper rolls 162 are in operative connection with a one-way clutch 172 such that the first stripper rolls remain stationary when the first sheet is engaged therewith and moving in the direction of Arrow F. Because the resistance force provided by the non-contact stripper rolls against the face of the sheet engaged therewith is less than the moving force imparted to the opposed face of the sheet, the first sheet 170 is moved into intermediate relation between the picking member and the non-contact stripper rolls. This causes the sheet to assume the cross-sectional wave configuration shown in FIG. 10. This is caused by the sheet being deformed by the non-contact stripper rolls into the annular recesses 166 of the picker member. This cross-sectional wave configuration is generally operative in combination with the opposing force applied by the non-contact stripper rolls, to separate the first sheet from other sheets that may be moving therewith from the stack.

As the first sheet 170 moves further in the direction of Arrow F as shown in FIG. 9, the leading edge of the sheet then engages the contact stripper roll 164 which is biased to engage the sheet engaging portions of the picking member. The contact stripper roll is also in operative connection with a one-way clutch 174 such that in the exemplary embodiment the contact stripper roll remains stationary as the first sheet moves in the direction of Arrow F. The engagement of the contact stripper roll and the first sheet operates to displace the contact stripper roll so as to enable the sheet 170 to move in intermediate relation between the contact stripper roll and the central sheet engaging portion 168. The resistance force of the non-contact stripper roll is generally operative to separate any sheets other than the first sheet 170 from moving in the direction of Arrow F.

As shown in FIG. 9 the sensor 176 is positioned adjacent to the contact stripper roll in the exemplary embodiment. Sensor 176 is operative to sense the presence of double sheets which may have been able to pass the non-contact and contact stripper rolls. Suitable sensors in some embodiments may be those shown in U.S. Pat. Nos. 6,241,244 and 6,242,733, the disclosures of which are incorporated herein by reference. Upon sensing a double sheet the controller of the machine is enabled to make additional attempts to strip the sheet as later discussed. However, in the event that only a single sheet is sensed the picker member 158 continues moving in the counterclockwise direction until the leading edge of the sheet reaches takeaway rolls 178. In the exemplary embodiment, takeaway rolls 178 are operative to engage the sheet and to move the sheet in the accepting mechanism 80 toward the validator device 88. In the exemplary embodiment one rotation of the picking member is operative to separate one sheet from the stack.

In the event that the sensor 176 senses that a double sheet or other multiple sheet has been able to pass the contact and non-contact stripper rolls, the controller of this exemplary embodiment is operative to stop the movement of the picker member 158 in the counterclockwise direction as shown prior to the first sheet 170 being disengaged therefrom. Thereafter the controller is operative to reverse the direction of the picker member 158 and the moving members 150 and 152 so as to move the first sheet back toward the stack. Through the operation of one-way clutches 172 and 174 the contact stripper roll 164 and the non-contact stripper rolls 162 are enabled to rotate in a counterclockwise direction as shown so as to facilitate the return of the sheets to the stack. Thereafter the controller may operate the picker mechanism 86 to again pick a single bill. Repeated attempts may be made until a single sheet is separated from the stack so that it may be processed by the sheet acceptor mechanism.

It has been found that the exemplary embodiment of the picker mechanism 86 is well adapted for separating various types of financial instrument sheets having different properties. In general, sheets such as currency notes that are new or other types of sheets which have generally consistent properties of rigidity and friction from sheet to sheet are separated through the operation of the picker mechanism and the non-contact stripper rolls. However, in situations where rigidity and frictional properties vary substantially from sheet to sheet, the contacting stripper roll which subsequently engages the sheets after they have engaged the non-contact stripper rolls is effective in separating sheets that would not otherwise be separated. This may be particularly helpful for example in processing sheets that may include plastic and paper currency notes, checks, or other documents that have significantly variable properties and which are mixed together in a stack from which the sheets must be individually picked.

It should be understood that while picking rolls and cylindrical members are used in the exemplary embodiment, in other embodiments other picking and stripping structures such as belts, pads, fingers and other members may be used.

The exemplary embodiment of ATM 10 comprises a through-the-wall type machine in which the fascia is exposed to the elements. As a result, rain and snow may impact on the fascia and in the absence of suitable measures may enter the machine. As can be appreciated the sheet accepting opening 40 in the fascia must be sufficiently large to accept the chute 82 which holds a stack of documents 84 as previously discussed. During transactions when an authorized user indicates that they wish to insert the stack of sheets into the chute, the gate 44 must be opened which results in exposure of the chute to the elements.

Figure 17:
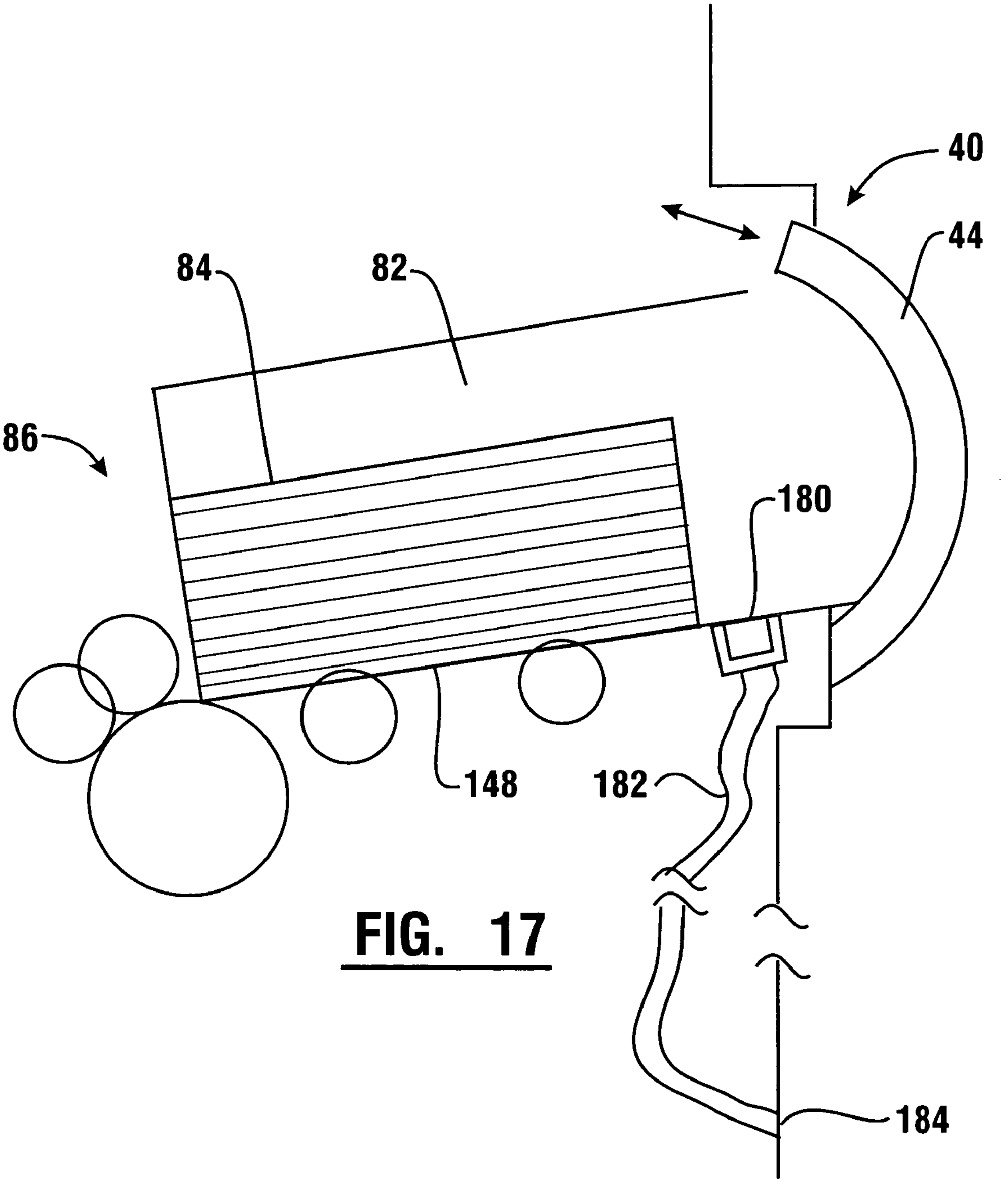
FIG. 17 is a schematic cross-sectional view of a chute to and from which stacks of sheets are received and removed through the fascia of the machine, and including devices for capturing and draining water which may enter the chute.
Figure 18:
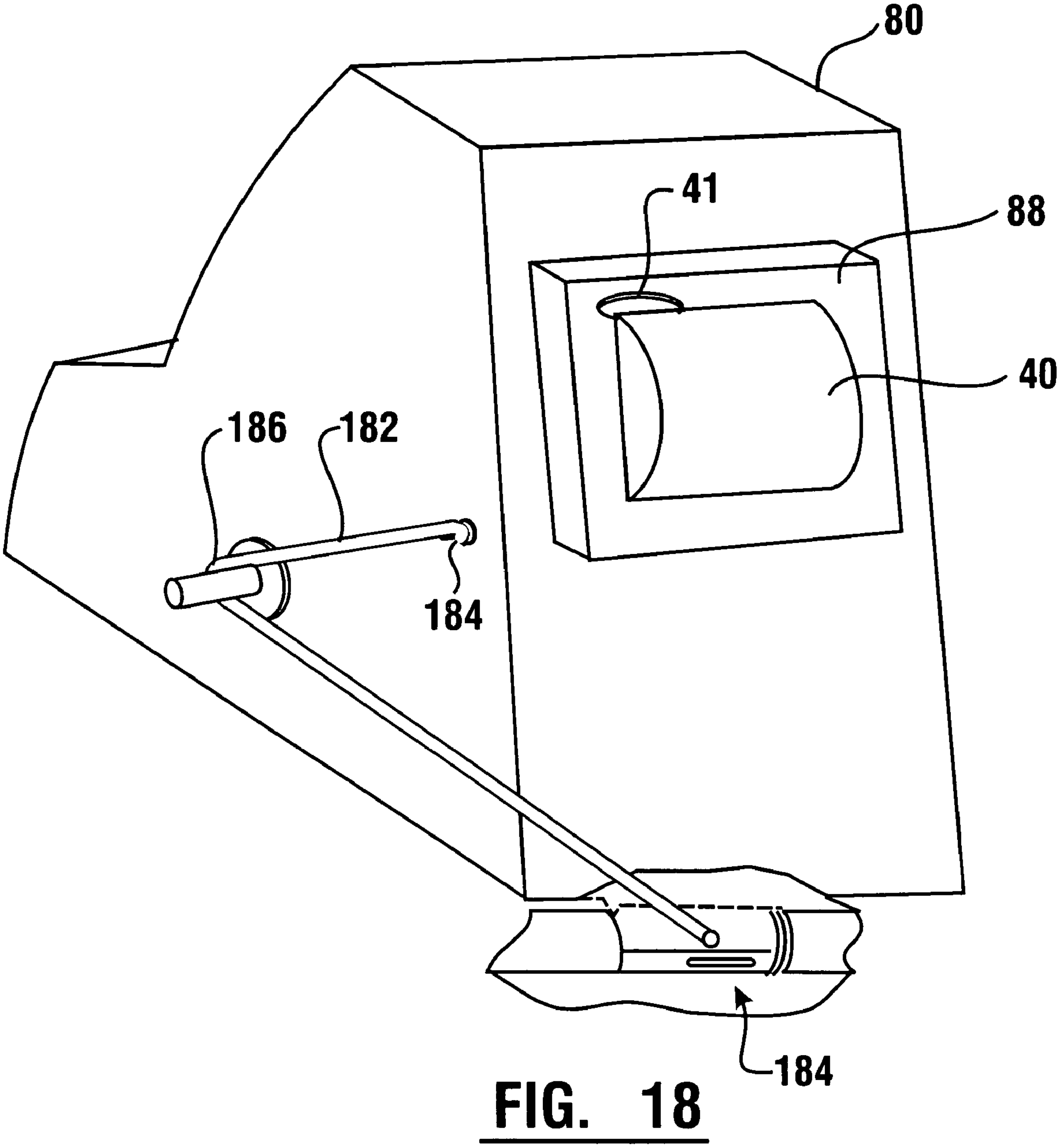
FIG. 18 is an external isometric view of the cash acceptor mechanism represented in FIG. 17 and including a schematic representation of the drain used for passing water collected in the chute to the outside of the machine.
Figure 19:
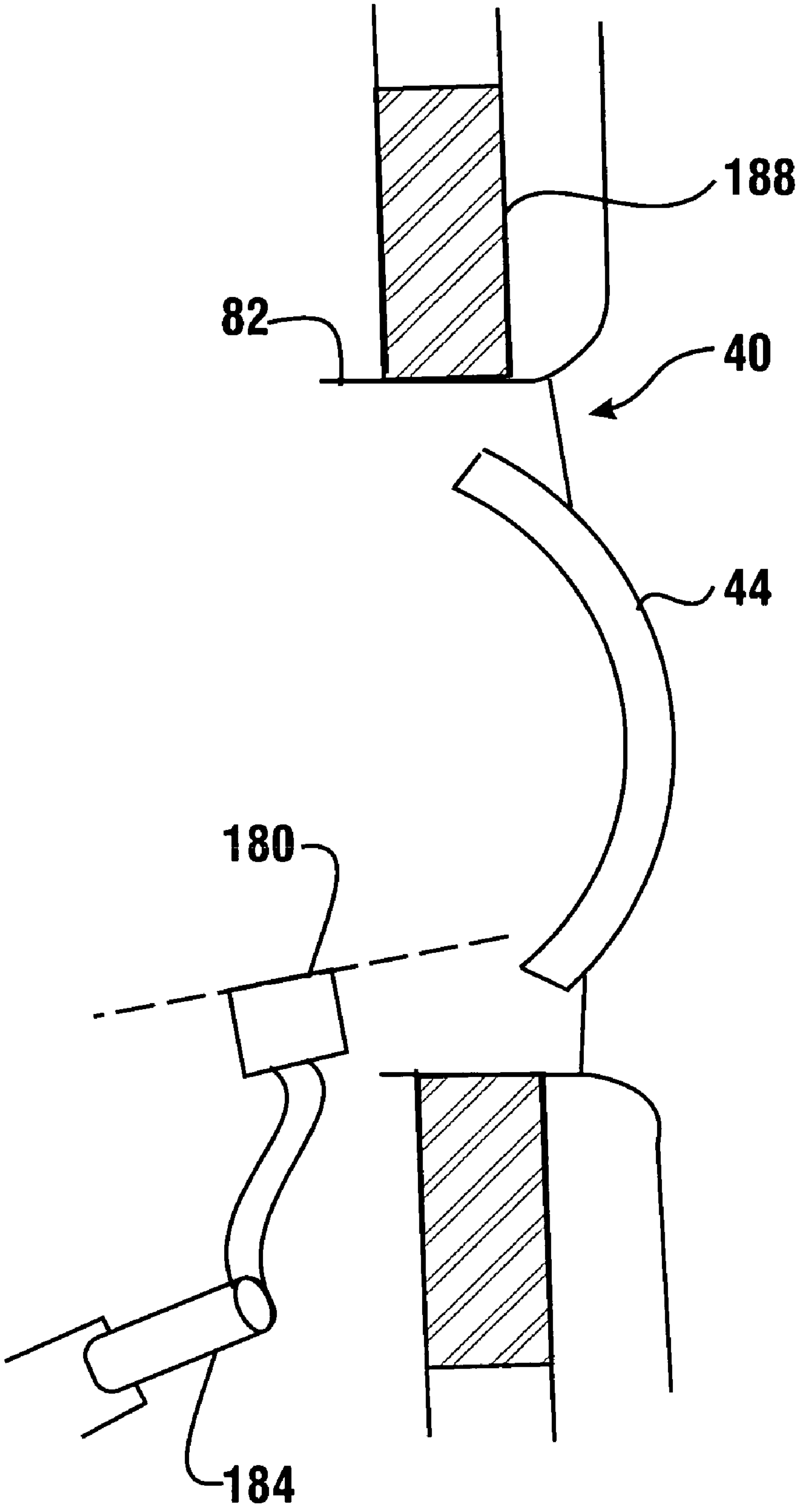
FIG. 19 is a schematic view representative of a sealing system used in an exemplary embodiment to minimize the risk of contaminants entering the machine through the opening in the machine fascia through which the chute extends in an operative position of the cash acceptor mechanism.

To minimize the risk posed by rain and snow to the currency acceptor mechanism 80, the exemplary embodiment includes the capability to capture and direct from the machine moisture which may enter the chute. The approach used in the exemplary embodiment is represented in FIGS. 17 through 19. As shown in FIG. 17, the lower surface of the chute 148 includes at least one water accepting opening 180 therein. In the exemplary embodiment the water accepting opening comprises one or more troughs which extend transversely across the lower surface of the sheet. Of course in other embodiments other approaches may be used. The fluid accepting openings are in fluid connection with a conduit schematically represented 182 which is in fluid connection with a drain 184 which delivers the water outside the ATM. As represented in FIGS. 18 and 19 the trough 180 is in operative connection with a fluid fitting 184 which connects to a generally flexible fluid conduit 182 such as a tube. The conduit 182 connects to the drain 184 which in the exemplary embodiment includes a cavity at a lower side of the fascia and which includes openings through which the water may drain to the outside of the machine housing.

In the exemplary embodiment a tube support 186 is positioned to control the direction of the tube and assure drainage when the sheet acceptor mechanism is in the operative position as well as when the sheet acceptor mechanism is in a service position such as is shown in FIG. 12. In the exemplary embodiment the tube support minimizes the risk of the fluid conduit being crimped or otherwise assuming a position which prevents the drainage of water from the interior of the chute to the outside of the machine. It should be understood, however, that the approach shown is exemplary and in other embodiments other approaches may be used.

In the exemplary embodiment, provision is made to minimize the risk of moisture entering the ATM in the area of the sheet accepting opening 40 through which the chute 82 extends in the operative position of the sheet acceptor mechanism 80. As shown in FIGS. 18 and 19, in the exemplary embodiment a resilient gasket 188 extends in surrounding relation of the chute 82 in the area adjacent to the fascia. The resilient gasket is supported on a front face of the sheet acceptor mechanism. As shown in FIG. 19, when the sheet acceptor mechanism 80 is positioned such that the chute extends through the sheet acceptor opening 40 in the fascia, the resilient gasket is positioned in sandwiched fluid tight relation between the front face of the sheet acceptor mechanism and the interior face of the fascia. As the seal provided by the gasket extends in surrounding relation of the chute, the risk of moisture or other contaminants entering the ATM through the sheet acceptor opening is minimized. Of course it should be understood that this approach is exemplary and in other embodiments other approaches may be used.

As discussed in connection with FIG. 2, the sheet acceptor mechanism 80 in response to operation of the validator device 88 and the controller 64 determines at least one characteristic indicative of whether financial instrument sheets are acceptable to the machine. In the exemplary embodiment, unacceptable sheets may be suspect sheets such as potentially counterfeit notes, invalid checks, or other unacceptable documents. When such documents are detected, they are directed to a storage area 100 which in the exemplary embodiment is within the sheet acceptor mechanism and outside the chest portion. Periodically these unacceptable sheets must be recovered by servicing personnel for purposes of either verifying the invalidity of the sheets or for purposes of tracing the sheets to the user who placed them in the machine. In the exemplary embodiment such sheets are recoverable by authorized persons who have access to the upper housing portion 54 but who may be prevented from having access to the chest 48 where documents determined to be valid are stored.

In the exemplary embodiment access to the storage area 100 is controlled by a suitable access device. In one form of such an access device shown in FIG. 12, an opening 190 is provided to the storage area 100. Access to the opening is controlled by a flip-down access door 192. In some embodiments, the flip-down access door 192 may be opened only when the sheet acceptor mechanism 80 has been moved rearward to extend outside of the housing subsequent to opening access door 58. In some embodiments the flip-down access door may be provided with a locking mechanism 194 such as a key lock or other suitable locking mechanism. As a result in this exemplary embodiment in order to access the sheets in the storage area 100, the user could be required to have the necessary capabilities through keys, combinations or otherwise to unlock both lock 62 on access door 58 as well as lock 194 and flip-down door 192 in order to access the sheets. It should be understood, however, that although in the embodiment shown the sheet acceptor mechanism 180 is shown retracted out of the machine to facilitate opening the flip-down door and extracting the sheets, in other embodiments the flip-down door may be sized, segmented or otherwise adapted such that the sheet acceptor mechanism may not need to be retracted from its operative position in order to access sheets in the storage area 100.

FIG. 13 shows yet a further alternative for accessing sheets in the storage area 100. In this exemplary embodiment an opening 196 is provided through the storage area so as to enable access to the sheets therein. Access through opening 196 is provided to a sliding door 198. Door 198 is operative to slide along the direction of Arrow S in opposed tracks, slots, or other suitable mechanisms for holding and guiding the door in supporting connection with the sheet acceptor mechanism. In some embodiments door 198 may include a locking mechanism 200. Locking mechanism 200 may be a suitable key, combination, or other locking mechanism for assuring that only authorized personnel are enabled to access the documents in the storage area. As can be appreciated from FIG. 13, door 198 may be both unlocked and opened without having to retract the sheet accepting mechanism rearward. In some embodiments this may serve to speed servicing and the removal of invalid sheets from the machine.

FIG. 14 shows yet another exemplary embodiment for accessing sheets in the storage area 100. In this embodiment an opening 202 is provided in a rear face of the sheet accepting mechanism 80. Access to opening 202 is controlled by a door 204. In the exemplary embodiment door 204 is a sliding door adapted to be selectively moved in tracks, slots, or similar devices. In some embodiments a suitable locking mechanism schematically indicated 206 is used to assure that only authorized personnel have access to the door. In the embodiment shown in FIG. 14, a transport 208 is provided for moving the sheets in the storage area 100 to the service personnel through the opening 202. A transport 208 may be operative in response to provided to input devices by the servicing personnel or may be automatic responsive to the opening of the door 204. Of course it should be understood that all of the approaches shown are exemplary and in other embodiments other approaches may be used.

In some exemplary embodiments suspect notes or other documents are correlated with particular transactions conducted at the machine and/or with particular users of the machine. This may be accomplished through operation of the validator and the controller. In some exemplary embodiments the suspect documents in storage may be arranged in a particular order and the controller is operative to provide one or more outputs such as through a screen or a printer indicating the transactions and/or users which correspond to the suspect sheets. Alternatively or in addition, provisions may be made for the sheet acceptor mechanism to be in operative connection with a printer which prints transaction and/or user identifying information on each of the suspect sheets. This may include for example, visible or non-visible indicia. In some embodiments the indicia may be removable such as removable labels or indicia that can be washed off or otherwise removed or neutralized. In other embodiment the characteristics determined by the validator may be such that the data is sufficiently detailed and of types that create a unique electronic profile of each suspect sheet. This data can be stored at the machine in a data store through operation of the controller or elsewhere in a connected data store. This sheet identifying data may then later be used by a servicer or other persons recovering or analyzing the suspect sheets to correlate each sheet with the transaction and/or user that provided the sheet to the machine. This may be done in some embodiments by putting the machine controller in a mode for such analysis and feeding each suspect sheet through the sheet acceptor mechanism. The controller may then operate to correlate the stored data related to the transaction and/or user with the stored data that uniquely identifies the sheet. Such information is then provided to a user of the machine recovering the sheets. Alternatively, such analysis may be conducted by transferring data away from the machine along with the suspect sheets, and conducting the analysis at another validator. Of course these approaches are exemplary of approaches that may be used to uniquely identify a suspect sheet and associate it with a user and/or a transaction.

In the exemplary embodiment of the sheet acceptor mechanism 80, it is desirable to maintain the interior components of the sheet acceptor mechanism isolated and in sealed relation except when access is required for servicing. As can be appreciated, while the exemplary embodiment positions the sheet acceptor mechanism in intermediate relation between a vertically extending wall of the generally L-shaped chest and the wall of the housing to provide enhanced security, it also presents challenges for servicing. While the ability of the exemplary embodiment to move the sheet acceptor mechanism rearward through a service opening of the ATM facilitates servicing, problems are still potentially presented by the need to have to remove cover panels and the like. Further, there is always a risk that cover panels, once removed, will not be replaced resulting in infiltration of contaminants to the sheet acceptor mechanism and causing malfunctions or failures.

Figure 15:
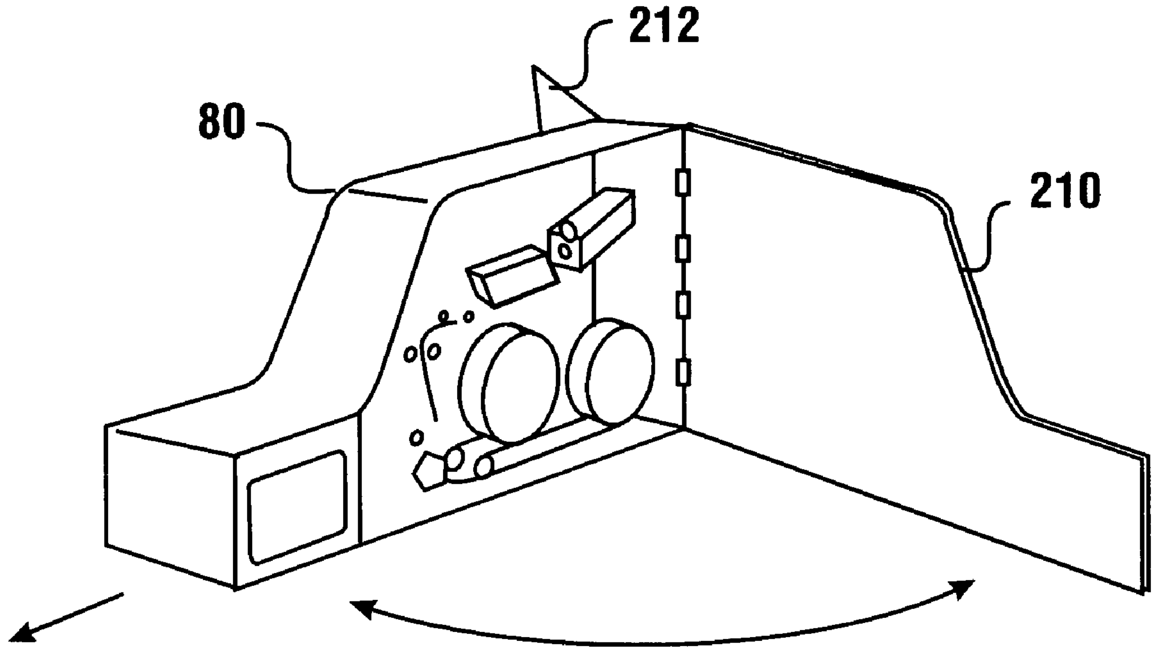
FIG. 15 is a schematic view of the cash acceptor mechanism with a first form of service panel shown in an open position for purposes of servicing.

To reduce the risk of service persons not replacing service panels, the exemplary embodiments of the invention are made to minimize the risk that service panels will be removed and not replaced. As shown in FIG. 15, in one exemplary embodiment a side service panel 210 is mounted in hinged relation in supporting connection with the sheet acceptor mechanism. This enables the service panel 210 to be opened once the sheet acceptor mechanism has been moved rearward from the machine. This enables ready access to the components within the machine. In addition in this exemplary embodiment, the front service panel 212 is mounted in hinged relation adjacent the front of the sheet acceptor mechanism. This front service panel enables access to components accessible through a front opening of the sheet accepting mechanism.

As can be appreciated because of the hinged character of service panels 210 and 212, the panels may be readily opened. However, the hinged mounting makes it difficult for a technician to entirely remove the panels from the machine. Further the sheet acceptor mechanism cannot be returned to service without closing the service panels. Of course as can be appreciated, suitable latching mechanisms or other holding devices may be used so as to assure that once the service panels are returned to their closed position, they remain therein until such time as the service panels need to be opened again for servicing.

Figure 16:
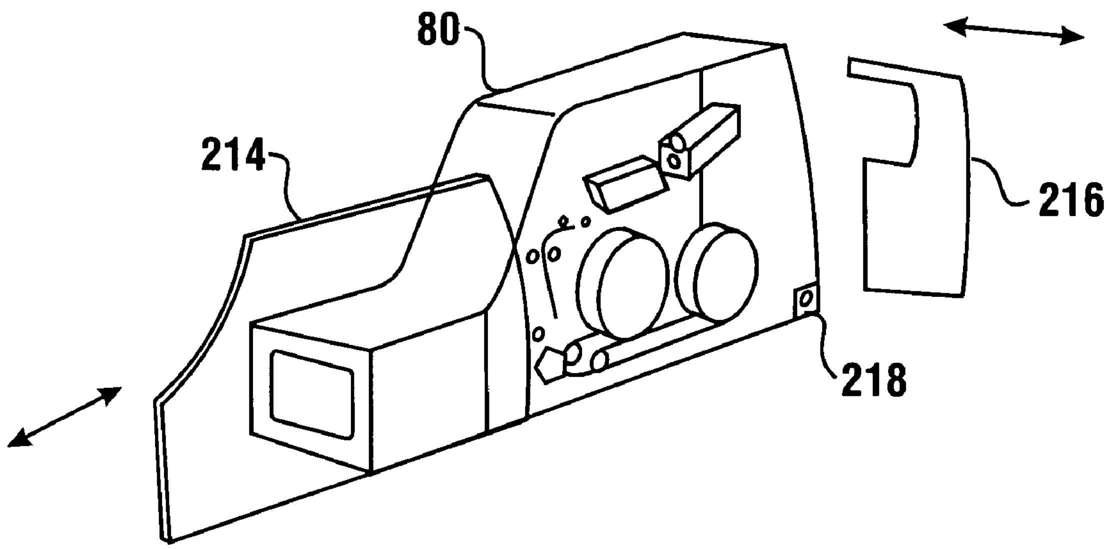
FIG. 16 is a view of the cash acceptor mechanism similar to FIG. 15 but with an alternative form of service panels shown in an accessible position.

FIG. 16 shows yet a further schematic view of an alternative approach to providing service panels on the sheet acceptor mechanism 80 that provide protection for internal components and yet can be readily removed for servicing. In the embodiment shown in FIG. 16, service panels 214 and 216 are provided such that they can move in the direction indicated by the adjacent arrows. Service panels 214 and 216 in the exemplary embodiment are mounted in channels, slots, or other suitable devices on the sheet acceptor mechanism for guiding and holding the panels in position. The useful aspect of the service panels shown in FIG. 16 is that the sheet acceptor mechanism 80 need not be removed from the operative position in order to open the interior of the mechanism by moving the service panel. Indeed in the exemplary embodiment, service panel 214 may be entirely removed exposing the components of the sheet acceptor mechanism without moving the sheet acceptor mechanism from the operative position. Service panel 216 which may include the front face supporting the resilient gasket, may be made more readily removable by moving the gasket relative to the chute. The ability to remove service panels may be particularly useful in situations where a service person needs to observe the sheet acceptor mechanism in operation in order to diagnose and remedy certain problems.

In some embodiments it may be desirable to include devices to assure that the service panels 214 and 216 are reinstalled on the sheet acceptor mechanism after servicing procedures are completed. This may be accomplished by including contact switches such as the contact switch schematically represented as 218 to sense when the service panels have been placed back in position. Such contact switches may limit the operation of the sheet acceptor mechanism until such panels are replaced. Alternatively the circuitry within the ATM may cause an alarm or other indication to be given or may disable operation of the currency acceptor mechanism if the access doors to the upper housing are closed and the service panels have not been returned to their operative position. Of course other approaches may be used.

As can be appreciated, the arrangements of service panels shown in FIGS. 15 and 16 for the sheet acceptor mechanism are exemplary and in other embodiments other approaches may be used.

In the exemplary ATM 10 there is also included a mechanism for dispensing cash through the cash dispensing opening 38 in the fascia. This cash dispensing mechanism generally indicated 220 is schematically represented in FIG. 3. In the exemplary embodiment the cash dispensing mechanism is positioned in the higher side of the generally L-shaped chest and includes a plurality of note storage areas 222, 224, 226, 228, 230 and 232. In some exemplary embodiments the note storage areas may be housed within removable currency cassettes which are suitable for holding notes and which may be readily removed from the machine.

In the exemplary embodiment each of the note storage areas is in operative connection with a picker mechanism 234, 236, 238, 240, 242 and 244. Each of these picker mechanisms are selectively operative responsive to controller 64 to selectively dispense notes or other sheets from the corresponding storage area responsive to appropriate inputs to input devices of the user interface. In some exemplary embodiments the picker mechanisms used may be similar to the picker mechanism 86 used to separate sheets from a stack in the sheet acceptor mechanism 80.

In the exemplary embodiment a vertically extending transport 246 is in operative connection with the picker mechanisms and a presenter mechanism 248. In operation of the machine the presenter mechanism is operative to receive sheets dispensed by the picker mechanisms and to move the sheets upward through the transport 246 to accumulate the sheets into a stack schematically indicated 250. After the desired sheets have been accumulated, the presenter mechanism is operative to move the stack toward the sheet dispensing opening 38 while the controller is operative to open the sheet dispensing gate 42. This enables the stack of sheets to be dispensed to a user of the machine.

It should be understood that while in the exemplary embodiment the cash dispensing mechanism 220 has been described as dispensing various denominations of currency notes, in other embodiments the cash dispensing mechanism may dispense other types of sheets. These may include, for example, travelers checks, stamps, vouchers, scrip, gift certificates, envelopes, or other documents. Further, in some embodiments the ATM may be operative to dispense combinations of both notes and other documents as may be requested by the user. Of course the mechanisms shown are exemplary and in other embodiments other approaches may be used.

In operation of the exemplary ATM 10, a user operating the machine provides inputs sufficient to identify the user's account through the input devices of the machine. This may include, for example, providing a card and/or alpha-numeric data through the input devices which can be correlated through operation of the controller in the machine and/or by interaction with a remote computer to determine a financial account of the user. The controller thereafter operates the output devices of the machine so as to prompt the user to provide inputs and to select a particular type of transaction or provide other inputs. In situations where the user wishes to conduct a cash accepting transaction, the ATM operates responsive to the controller 64 to open the gate 44 to the chute 82 which enables the user to provide a stack of currency sheets or other documents into the machine.

In response to the user providing the stack of documents 84 and/or in response to inputs from the user, the cash acceptor mechanism 80 operates to unstack the documents through operation of the picker mechanism 86 and to determine at least one of the characteristics of each document through operation of the validator device 88. The determined characteristics of the documents may cause valid or acceptable documents to be routed through operation of the routing device 92 into the escrow device 94 where they may be temporarily stored. Also, the controller may operate the routing device 92 to direct suspect documents such as invalid documents or probable counterfeit notes to the transport 86 and the storage area 100.

In the exemplary embodiment once the documents have been moved past the validator, the controller may operate to advise the user of the machine's determination with regard to the documents through outputs through one or more output devices. In some exemplary embodiments the user may be offered the option to recover the valid or invalid documents or both. This may be accomplished by the escrow device delivering the documents to the same or different transports such that the documents may be returned to the chute or other area of the machine that is accessible to the user. Likewise if the option is offered, invalid documents may likewise be routed back to the user. Of course various approaches may be used depending on the particular machine configuration and the programming associated with the controller.

In the exemplary transaction, if the documents determined to be valid are to be stored within the machine, the controller operates responsive to inputs from the user and/or its programming to cause the escrow device 94 to deliver the documents. The documents are directed by the routing device 92 through the cash accepting opening 102 in the chest in which they are transported and stored in the appropriate sheet handling mechanisms or in an appropriate bulk storage container. In the exemplary embodiment the user's account is credited for valid sheets deposited. Information is collected concerning any invalid sheets provided by the user so that if the sheets are later determined to be valid, the user may be credited or alternatively the user may be contacted to determine the source of the invalid sheets. Of course as can be appreciated, this transaction is exemplary and in other embodiments other approaches may be used.

Using the exemplary ATM 10 a user may also conduct cash dispensing transactions. This may be done either during the same session as a cash accepting transaction or as part of a separate session. In such a transaction the user of the ATM provides inputs to the input devices that are sufficient to identify one or more accounts of the user and/or other identifying inputs. Responsive to prompts through the output devices, the user provides inputs indicating that they wish to conduct a transaction involving the dispense of notes or other types of sheets, and the amount, nature or character of the sheets that the user has requested.

Responsive to the inputs from the user the controller 64 is operative to cause the cash dispenser mechanism 220 and the picker mechanisms located therein to deliver the requested sheets to the presenter mechanism 248, which is operative to accumulate the requested sheets into a stack 250. Once the sheets are accumulated, the sheets are moved outward to the user as the gate mechanism is opened. Hereafter the controller operates to cause the value of the dispensed cash or other sheets to be charged to the user's account.

It should be understood that the transactions described are exemplary and additional types of transactions may be carried out through operation of various embodiments. In addition as previously discussed, mechanisms that are operative to both accept and dispense cash such as those described in the incorporated disclosures may be utilized as substitutes for, or in addition to, the mechanisms described herein so as to transport sheets and/or carry out transactions. Alternative stack transport devices are described in more detail later.

It should be understood that other types of transaction function devices may be included in some embodiments. For example as previously discussed, embodiments of the invention may be operative to image and validate checks. In such cases it may be desirable for the machine to have the capability to cancel the check or destroy the check so there is no risk that the check may be later be stolen and used fraudulently. In some embodiments suitable mechanisms may be provided for carrying out such functions. In addition it may be desirable in some embodiments to have the machine produce bank checks, travelers checks, tickets, or other documents and suitable mechanisms may be provided for producing such documents in the selected amounts. Further, in alternative embodiments features used by merchants such as devices for accepting deposit bags, dispensing rolled coin and other devices may be incorporated into an ATM or other automated banking machine having features described herein. As can also be appreciated, features of the exemplary ATM may also be used in numerous other types of automated banking machines.

Exemplary embodiments of the invention include light emitting devices 17, 31, 41, 43 and 45. In the exemplary embodiment the light emitting devices are positioned in areas on the user interface at locations associated with particular transaction function devices. For example, light emitting device 31 is associated with the receipt printer 30 and light emitting device 17 is associated with the card reader 16. In the exemplary embodiment the light emitting devices are in operative connection with the one or more controllers in the machine. In addition, such devices are capable of emitting light of selected colors at particular times during the transaction responsive to the operative condition of the transaction function device of the ATM with which the light emitting device is associated.

Figure 22:
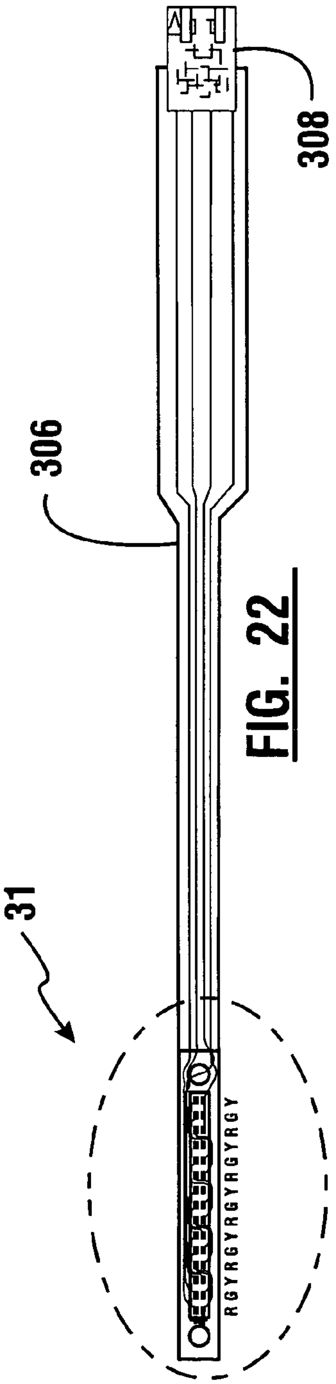
FIG. 22 is a schematic view of a light emitting device which is operated to facilitate use of the machine by users.

In the exemplary embodiment the light emitting devices include an array of LEDs of different colors embedded on a flexible circuit. For example, FIG. 22 represents light emitting device 31. However, it should be understood that in the exemplary embodiment all the light emitting devices are generally similar. Light emitting device 31 includes an array of LEDs 304 connected through a circuit on a flexible substrate such as a polymide film, for example, DuPont Kapton® material, and includes a flexible connector portion 306. The flexible connector terminates in an electrical connector 308. Electrical connector 308 is releasably connectable to a driving circuit or other electrical circuit in the machine which operably connects to one or more controllers for purposes of controlling the illumination of the light emitting device.

Figure 23:
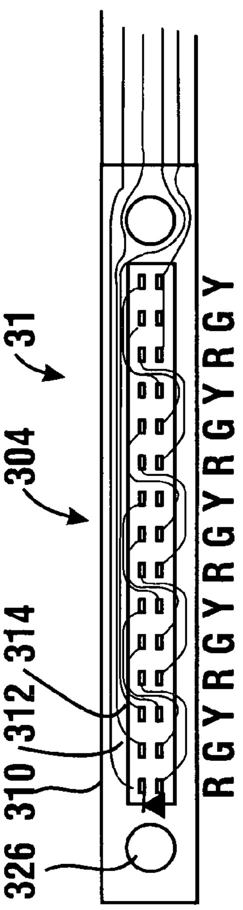
FIG. 23 is an enlarged view of the light emitting device shown in FIG. 22.
Figure 24:
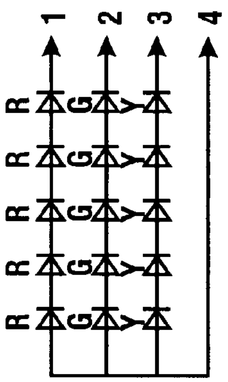
FIG. 24 is a schematic view of the light emitting diodes included in the light emitting device.

As shown in FIG. 23, in the exemplary embodiment the light emitting device includes three different color LEDs. These LEDs are red, green and yellow, which are represented by "R," "G," and "Y" in the figures as shown. As represented in FIG. 23, in the exemplary embodiment the LEDs are in an array such that LEDs of only one color are vertically aligned along a single line of the light emitting device. For example, as shown in FIG. 23, a line 310 comprises a line of vertically aligned red LEDs. As shown in FIG. 23, a line 312 is a line of only green LEDs, and a line 314 of only yellow LEDs. As shown in FIG. 23, in the exemplary embodiment the lines repeat so that there are five vertical lines of each color LED. It should be understood that while in the exemplary embodiment the LEDs of each color are arranged in vertically aligned 5 relation, in other embodiments other arrangements such as horizontal alignment or other matrices of LEDs may be used. It should also be appreciated that although the LEDs are connected electrically in series as shown in FIG. 24, the electrical connections on the flexible circuit provide for spaced vertically aligned pairs of LEDs of only one color.

Figure 25:
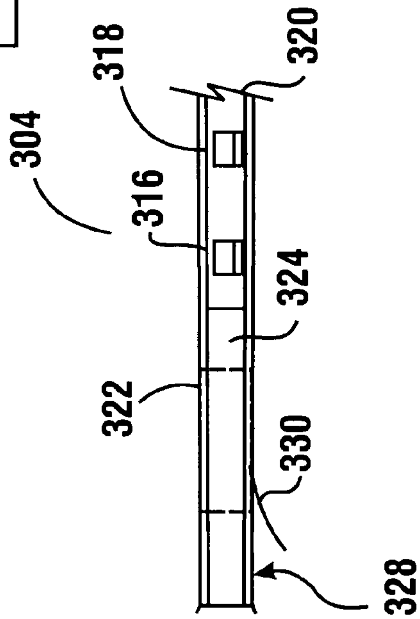
FIG. 25 is a cross-sectional view of the flexible web which includes the diodes in the light emitting device.

As shown in FIG. 25, in the exemplary embodiment the light emitting devices are 10 supported in a flexible web. The web is thin in the preferred embodiment, having a thickness of approximately 1.20 millimeters. This facilitates the positioning of the light emitting devices on the user interface. In the exemplary embodiment, LEDs which are represented 316 and 318 are mounted on a base layer 320 including the circuit on a flexible substrate. An outer layer 322 which in the exemplary embodiment comprises a polyester layer overlies the LEDs. A spacer 1 5 324 extends between the base layer and the outer layer. As best shown in FIG. 23 multiple spacers may be used. In the exemplary embodiment the spacers are positioned outboard of the LEDs and include openings 326 to facilitate positioning the light emitting devices on the machine. This may include, for example, extending pins, studs, or fastening devices through the openings so as to secure the light emitting devices in the proper position. Further, in the 20 exemplary embodiment the release layer includes an underlying adhesive layer 328. The adhesive layer enables attaching of a light emitting device to a selected area within the machine. The adhesive layer is initially exposed for purposes of attaching the light emitting device by removal of an adhesive release layer 330 as shown in FIG. 25.

In an exemplary embodiment the light emitting devices are attached to components of the 25 machine with which they are associated. This may be done, for example, by using modular construction for the transaction function devices within the machine and attaching the particular light emitting device to the associated module. For example, FIG. 18 shows the cash accepting device 80 which is arranged as a modular device for purposes of processing sheets that may be received in the machine. In the exemplary embodiment the associated light emitting device 41 is mounted in supporting connection with the module. The adjacent fascia area of the machine provides an opening through which the light emitting device may be viewed when it is in the operative position. In some embodiments the fascia of the machine may include a transparent or translucent material separating the light emitting device from the exterior of the machine. However in other embodiments the light emitting devices may be exposed on the exterior of the machine. The attachment of the light emitting devices directly to the modular components of the machine may facilitate assembly and service of the machine. Placing the light emitting device directly on the module of the transaction function device with which it is associated, may reduce the amount of wiring and connectors needed for purposes of assembly and service.

In the exemplary embodiment the multicolor light emitting devices are operated under the control of one or more controllers in the machine. Each light emitting device is operated to emit light of a selected color and/or in a selected manner responsive to the operative condition of an associated transaction function device. For example, exemplary machines may be selectively programmable to emit a particular color light responsive to a given operative condition. For example, the light emitting device adjacent to the card reader may emit green light when it is ready to receive the card of a user, and then change to a yellow light after the card has been received therein. Alternatively or in addition, lights of a different color may flash or alternate to reflect conditions of a particular device. Further, for example, in the event of an improper action such as a user attempting to insert a card into the card reader incorrectly, the controller may be programmed to have the associated light emitting device emit red light or otherwise flash a color of light so as to indicate to the user that they have done something improper. Similarly, if a particular transaction function device is malfunctioning or not available, red light may be output.

In some exemplary embodiments the controller may be programmed so as to illuminate the light emitting devices to guide a user in operation of the machine. This may include, for example, illuminating or flashing a particular colored light to indicate a required user activity at a particular location on the machine. For example, at a particular time in the transaction the controller may cause to be output on the display an indication to the customer that they are to take their receipt. When the machine has delivered the receipt, the controller may operate to cause the light emitting device 31 associated with the receipt delivery to illuminate, flash or otherwise indicate to the user that activity is required by the user in the area of the receipt delivery slot.

In some exemplary embodiments the controller may be programmed to cause the light emitting devices to selectively illuminate intermittently and for a different duration depending on the operative condition of an associated device. For example, if a user provides inputs so as to request a cash-dispensing transaction, the light emitting device 43 adjacent to the cash dispensing opening may illuminate in a yellow condition as the machine operates internally to move bills toward the cash dispensing opening. Thereafter as the bills are pushed through the opening and presented to the user, the controller may cause the color of the light emitting device to change to green. In addition, the controller may cause the green light to flash so as to draw the user's attention to the fact that the money is ready to be taken. Further, in an exemplary embodiment, if the user has not taken their cash after a certain time and the machine is programmed to retract it, the controller may cause the light emitting device to flash or may operate so as to flash different colors in an alternating fashion so as to capture the attention of the user prior to the money being retracted.

In other embodiments, the colors emitted by the light emitting devices may be selectively programmed based on aesthetic reasons. For example, if the entity which operates the machine has particular trade dress involving certain colors the controller may be programmed to have the light emitting devices correspond with that trade dress. Thus, for example, if the particular entity's trade dress color is green, the machine may be programmed to utilize the green LEDs as lead-through indicators in prompting the user in how to operate the machine. Likewise if a different operating entity with a similar machine utilizes yellow as part of their trade dress scheme, the controller may be programmed to illuminate the yellow LEDs in the light emitting devices as the lead-through indicators.

It should further be understood that although the use of three color of light emitting devices is shown, this is exemplary and in other embodiments additional types of light emitting devices may be provided. In addition it should be understood that although light emitting devices in the exemplary embodiment are arranged so that only one color may be output from a given light emitting device at a given time, in other embodiments provision may be made to illuminate multiple color LEDs simultaneously. In such arrangements, LEDs in primary colors may be included so as to achieve ranges of hue through color combinations. This may be done by illuminating multiple light emitting sources simultaneously and/or varying the intensity of such sources through operation of a controller so as to achieve various colors. This may include, for example, providing for a gradual change in the hue of the light emitting device in accordance with the status of the associated transaction function device. This may include, for example, providing an indication to the user of the status of the completion of a particular task. It should also be understood that although LEDs are used as the light source in the exemplary embodiment, in other embodiments of the invention other approaches may be used. It should be understood that the structures and operations described are exemplary and numerous other structures and methods may be encompassed within the scope of the present invention.

Figure 26:
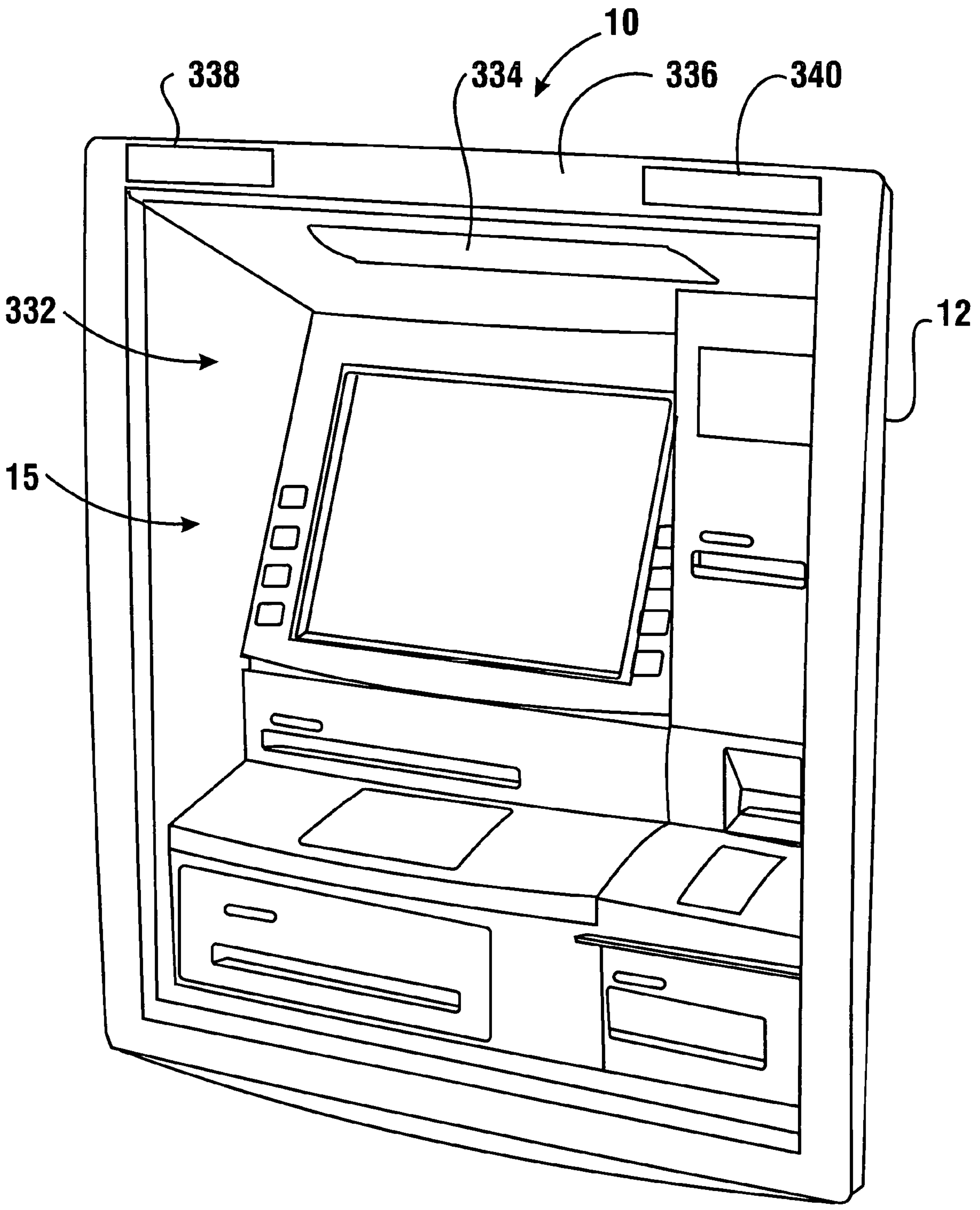
FIG. 26 is an isometric view of the fascia shown in FIG. 1 and particularly the mirrors thereon which facilitate a user viewing the area adjacent to them when operating the machine.

In the exemplary embodiment of ATM 10, provision is made to facilitate a user's operation of the machine and to minimize the risk of persons improperly observing a user or their activities. Such undesirable activities may include, for example, unauthorized persons observing the user's input of their PIN number or other data. As shown in FIG. 26, fascia 12 of the exemplary embodiment includes a recessed area 332 in which the display, function keys, card reader and receipt outlet are positioned. This recessed area 332 is illuminated by a light source 334. Light source 334 provides illumination generally in the downward direction so as to enable the user to more readily view the locations of the input and output devices on the fascia of the machine.

In the exemplary embodiment the fascia 12 includes a top panel portion 336 which is positioned generally above the light source 334 and the user interface of the machine. As represented in FIG. 26, the top panel portion includes a pair of convex mirrors 338, 340. The convex mirrors 338, 340 are generally horizontally disposed and are positioned at opposed sides of the user interface.

Figure 27:
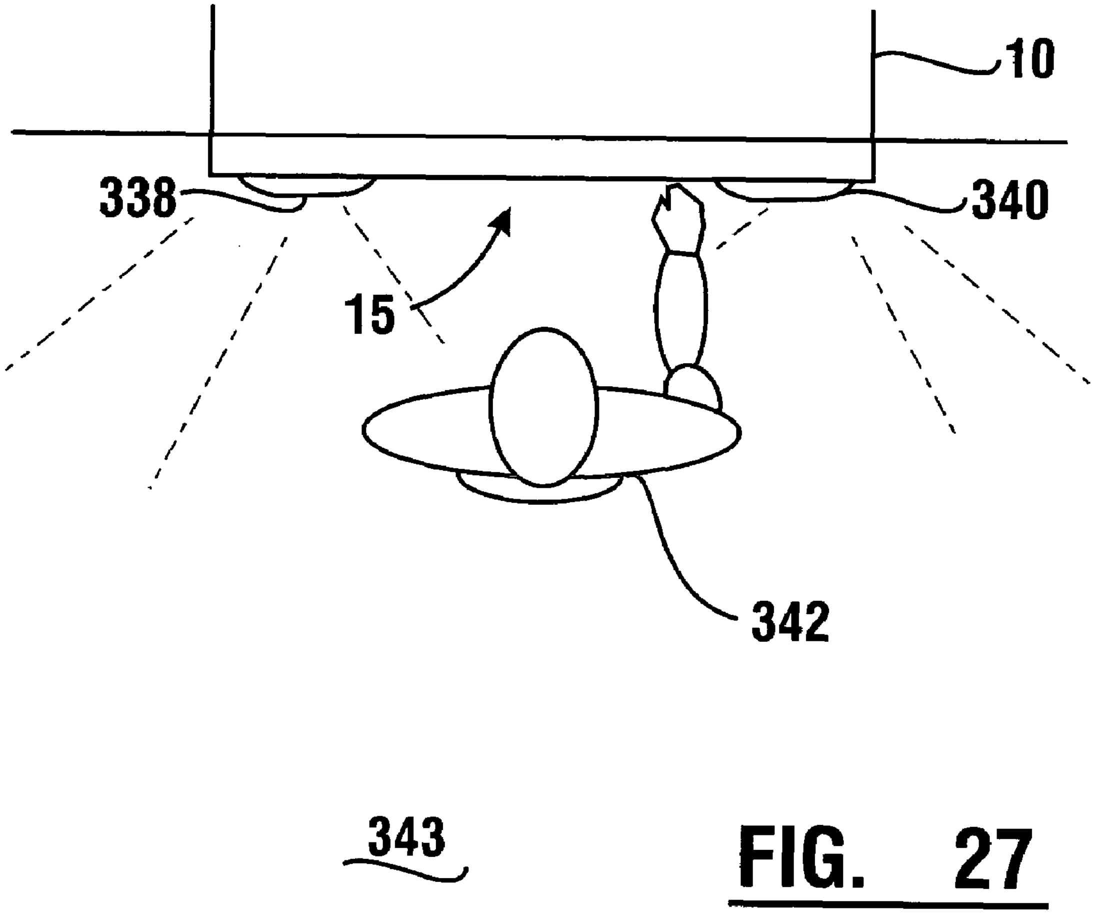
FIG. 27 is a schematic top view indicating the area viewable by a user operating the machine.

As represented in FIG. 27, a user 342 operating the ATM 10 will generally have their body aligned with the user interface 15 of the machine. As a result, the user is generally enabled to view in the convex mirrors an area behind the user generally indicated 343. The user is enabled to do this by looking in the mirrors 338 and 340 to the user's left and right, respectively. By looking in these convex mirrors, the user is enabled to generally see what is going on behind them as well as in a transverse direction from the area directly behind the user. The convex mirror arrangement enables a user to determine if one or more persons are in their proximity as well as whether such persons may be attempting to observe the user or their inputs to the ATM. In some embodiments where the ATM is operated in an external environment, lighting sources may be provided in the area 343 to facilitate the user's observation of persons who may be present therein. The light sources can be used to light the areas viewable in the convex mirrors.

It should be understood that the arrangement shown is exemplary and in other embodiments other mirror or observation arrangements may be used. In addition, in some embodiments provision may be made to maintain the cleanliness of the mirrors so as to reduce the risk that the user's ability to observe surrounding activities is impaired. These provisions may include, for example, automated devices which wipe the surface of the mirrors periodically. These may be external wiping devices or in some embodiments internal wiping devices. This may be accomplished, for example, by having the convex mirrors be part of a rotatable member that may be periodically rotated within the fascia so as to expose a new external surface. Cleaning devices on the interior of the fascia may operate to wipe contaminants from the surface of the mirror as it passes internally such that further rotation exposes a clean mirror surface to the user. Of course these approaches are exemplary and in other embodiments other approaches may be used. Further, the principles discussed may be used with other types of automated banking machines and in other circumstances other than those described in connection with the exemplary embodiment.

Alternative sheet transport devices may be used in an exemplary automated banking machine (e.g., ATM). In an exemplary embodiment a transport device can be used to move a bulk stack of financial instrument sheets accepted at a sheet acceptor opening 40 to a location away from the sheet acceptor opening (e.g., interior of the machine). The ability to promptly relocate accepted sheets while they still remain in a stack reduces the ability of a criminal to access the sheets. Later, after the stack is securely transported away from the sheet acceptor opening, the sheets can be individually removed from the stack. After being moved relative to the cash accepting opening, the sheets can then be transported to a note storage mechanism that may be comprised of storage compartments or to other mechanisms that further handling the sheets. In an exemplary embodiment, the stack transport device itself can be an intermediate structure or shield between the acceptor opening and the relocated stack.

Figure 28:
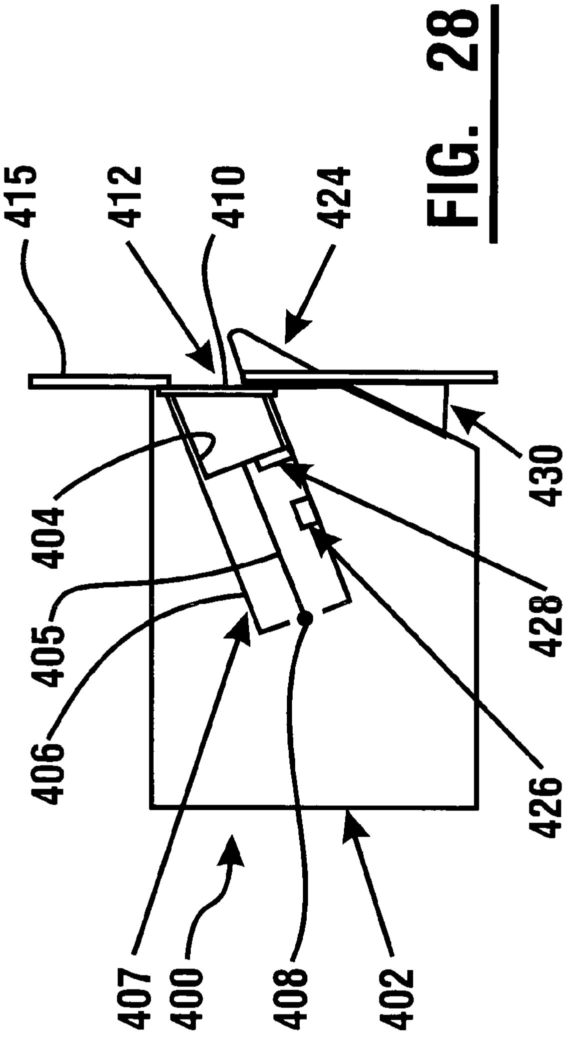
FIG. 28 shows a stack transport device.

FIG. 28 shows an exemplary embodiment of a stack transport device 400. Operational positions of transport device 400 components adjacent to an automated banking machine housing are shown in FIGS. 29–34. The stack transport device 400 includes a transport housing, carrier, or frame 402. As discussed in more detail later, the carrier 402 is portable as a single integral unit. A stack holder 404 is supported by the frame 402. The stack holder 404 is sized to surround and hold a stack of sheets in an interior storage area thereof. As previously discussed, these sheets may comprise any combination of currency notes, checks, money orders, gift certificates, vouchers, envelopes, etc. For brevity, description will be made with regard to currency notes although it should be understood that the other types of sheets are also applicable.

The carrier 402 also includes a holder housing or stack housing 406. In an exemplary embodiment the stack holder 404 is telescopically movable within the holder housing 406 via a telescoping arm or member 405 (e.g., tube or shaft). The holder housing 406 acts to guide the stack holder 404. The telescoping member 405 can have sequential portions of decreasing diameter. Inner portions (of smaller diameter) can respectively nest in one or more outer portions (of larger diameter). A closed end of the holder 404 is connected to the telescoping member 405. A drive motor causes the telescoping member 405 to extend or retract.

The holder housing 406 (or holder guide) is mounted to and supported by the frame 402. The holder housing 406 (and the holder 404 therein) can rotate or pivot about an axis 408. The stack holder 404 can move radially relative to the axis 408 along the longitudinal axis of the telescoping member 405. Another drive can be used to pivot either the telescoping member 405 or the holder housing 406 about the axis 408. This pivoting action causes the arrangement of the holder 404, holder housing 406, and member 405 to rotate together. For brevity, the combination of the holder 404, holder housing 406, and member 405 may collectively be referred to herein as a telescopic stack holder 407. After the carrier 402 is properly positioned for available operation in an automated banking machine, the movements of the components thereof are under the control of a machine controller.

It should be understood that alternative drive arrangements can be used to cause the stack holder 404 to telescopingly move within the holder housing 406, yet allow the holder housing 406 to rotate about the axis 408. For example, instead of using a telescoping member 405 in the drive, the stack holder 404 can have a drive motor and drive wheels (or belts or pulleys) associated therewith or connected thereto. The drive wheels can engage a portion (e.g., wall or track) of the holder housing 406. The drive motor can cause the drive wheels to telescopingly move (extend or retract) the stack holder 404 within the holder housing 406.

In other drive arrangements instead of the member 405 telescoping, the member can be a fixed member. The stack holder 404 would be driven along the fixed member. In such an arrangement the fixed member acts as a guide for the stack holder 404. During retraction of the stack holder the fixed member would protrude through a closed end of the stack holder and into the stack. Entry of a portion of the fixed member into the stack also assists in holding (e.g., preventing removal therefrom) the stack in the stack holder 404.

It should also be understood that in certain embodiments the telescopic stack holder 407 can have associated therewith devices that act upon the stack. For example, the holder housing 406 can comprise a sheet picker mechanism. In other embodiments the telescopic stack holder 407 can include a stack grasping, grabbing, pinching, or compressing device to contain the sheets in the telescopic stack holder and/or ensure that the sheets in the stack stay aligned during stack transport. Furthermore, as explained in more detail later, the telescopic stack holder 407 can comprise sensors that can detect non depositable items or foreign objects (non sheet items) in a sheet stack.

Figure 30:
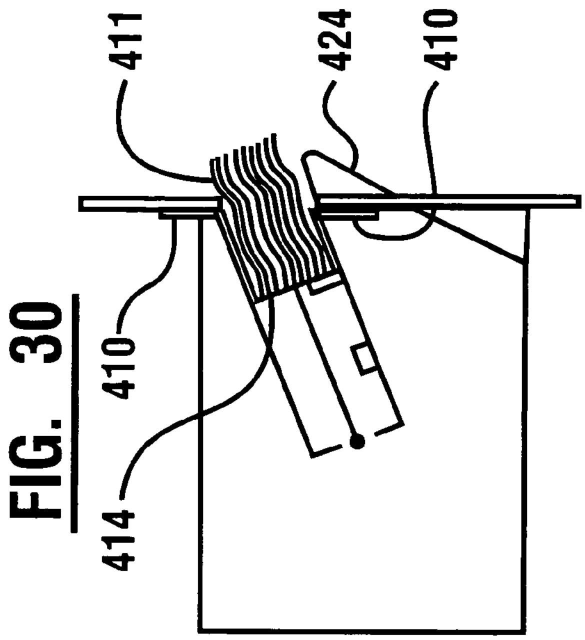
FIG. 30 shows a stack holder supporting a sheet stack.
Figure 29:
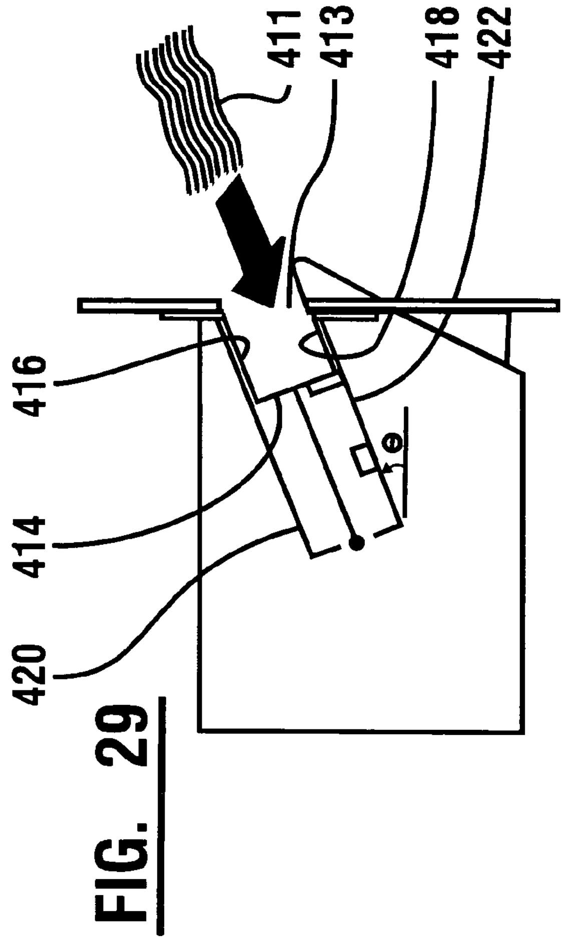
FIG. 29 shows a stack holder oriented for receiving a sheet stack.

Returning to the FIGS. 28–34, the transport housing 402 also includes a gate 410. The carrier housing 402 is movable in and out of an automated banking machine as a portable unit. The transport carrier 402 is positionable in an automated banking machine so that the gate 410 can be located adjacent a stack acceptor opening 412 in a fascia 415, such as previously discussed acceptor opening 40. The gate 410 is movable between an open position and a closed position. While in the open position the gate 410 enables the holder 404 to receive a stack 411 of currency notes from a machine user. While in the closed position the gate blocks the fascia opening 412. The gate 410 can be of a single movable gate component or it can comprise more than one movable gate component. For example, the gate 410 can be a split gate. FIGS. 29 and 30 shows a split gate 410 in an open (split) position. FIG. 30 shows the split gate 410 in a closed position.

Figure 32:
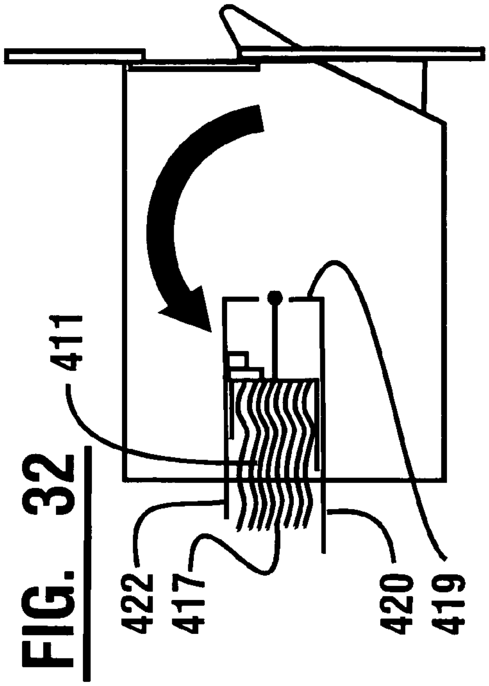
FIG. 32 shows the loaded stack holder rotated to an unloading orientation.

The stack holder 404 has an open end 413 and a closed end 414. The open end 413 is sized to receive an end of a stack of sheets therethrough. The closed end 414 acts as a stop for the stack end. The holder 404 includes a first side 416 extending a first radial length, and an opposite second side 418 extending a second radial length. The first side is generally parallel to the second side. However, the length of the first side 416 is greater than the length of the second side 418. Similarly, the holder housing 406 has a first side 420 of greater length than a second side 422. The holder housing 406 also has an open end 417 and a substantially closed end 419 (FIG. 32). Because of the length difference in sides, both the stack holder 404 and the holder housing 406 have angled openings 413, 417.

The angled opening 417 enables the holder housing 406 (with the holder 404 therein) to be oriented to receive a stack while at a non parallel angle (e.g., acute angle or offset angle) relative to the fascia opening 412. That is, the telescopic stack holder 407 can be compliantly oriented to the fascia to self locate to the fascia. The angled openings 413, 417 also allow the ends of the stack holder 404 and the holder housing 406 to rest against the split gate 410. This resting ability enables the stack holder 404 and the holder housing 406 to be properly positioned rotationally to receive a stack through the fascia opening 412. Because the stack is received in the holder 404 at a downward angle the sheets are allowed to self straighten against the insertion stop 414. In an exemplary embodiment the angle of stack input is approximately 15–45 degrees, with a preferred angle θ (FIG. 29) of stack input being about 20 degrees. It should be understood that greater and lesser angles for receiving a stack may also be used.

The size of the holder 404 relative to the holder housing 406 can be arranged so that the trailing end of the stack protrudes from the fascia. This arrangement permits a customer to straighten an inserted stack against the stop 414. To provide support to the trailing stack portion remaining outside the fascia, a stack support member 424 can be situated on the fascia at a location adjacent to and below the opening 412. The sides 420, 422 of the holder housing can help support the trailing end of the stack 411 while the stack is within the holder housing 406.

The holder 404 and holder housing 406 can be equipped with various sensors. Sensors on one of (or both of) the holder 404 and holder housing 406 can be used to determine the position of the holder 404 relative to the housing 406. For example, a size sensor 426 can be used to detect when the stack holder 404 is fully retracted into its housing 406. Other sensors can be used to determine whether any items in a stack are unacceptable for deposit. For example, sensors can detect unsuitable, suspect, or invalid items. For example, a magnetic sensor 428 can be used to detect coins, paper-clips, staples, etc. which may cause harm to the automated banking machine. One of the holder 404 and holder housing 406 can comprise a currency note validation device that can check the validity of notes during the stack transport. Detection of items determined as suspect can cause the machine to return the entire stack (or a portion thereof) to the customer or have the entire stack contents (or a portion thereof) dumped (e.g., stored) into a rejection bin (for later retrieval).

Figure 34:
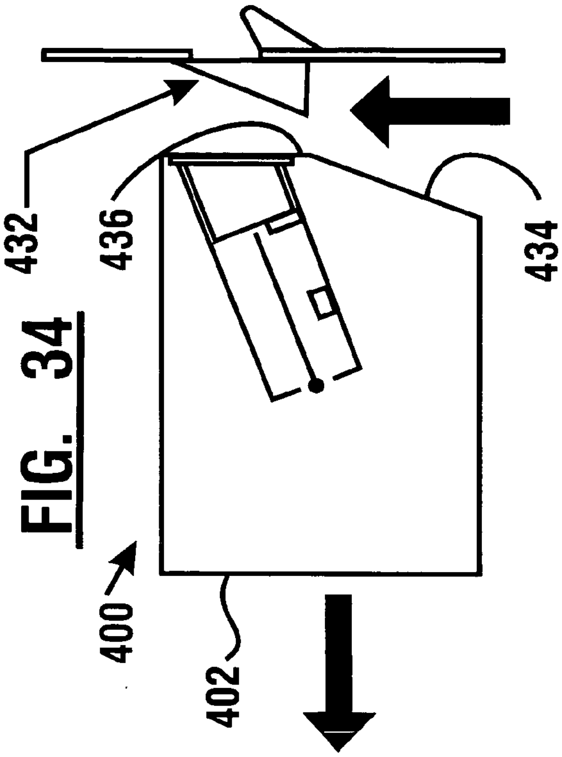
FIG. 34 shows the fascia opening closed with the portable carrier spaced therefrom.

The automated banking machine includes a safety gate 430 that is movable between an open position and a closed position. While in the open position the safety gate 430 enables the transport device 400 to receive a stack of currency notes from a machine user. While in the closed position the safety gate 430 blocks the fascia opening 412. The safety gate 430 can be resiliently (e.g., spring) loaded in a direction that attempts to maintain the safety gate 430 in its closed position. The ability of the safety gate 430 to move to the closed position can be based on the position of the portable frame unit 402. This relationship enables the safety gate 430 to be self closing when the frame unit 402 is not operatively positioned in the machine. The safety gate 430 includes an angled portion 432 (FIG. 34). The frame unit 402 includes a similarly angled portion 434 and a generally straight portion 436 (FIG. 34). When the frame unit 402 is laterally inserted into its operating position the straight portion 436 abuts the angled portion 432 to cause the safety gate 430 to move (lower) to an open position where the angled portions 432, 434 are adjacent each other. Removing the frame unit 402 away from the safety gate 430 causes the safety gate 430 to automatically move to block the fascia opening 412.

An exemplary operation of the transport device 400 to transport a currency stack 411 will now be discussed with regard to FIGS. 29–34. The open end of the stack holder 404 is located in a fully extended operating position adjacent to the fascia opening 412 (FIG. 29). The position of the safety gate 430, being dependent on the position of the carrier structure 402, is thus is open. The carrier gate 410 is caused to be opened by a machine controller in response to determining that an authorized machine user desires to deposit money into the machine. Such determination can be made via user inputs to the machine.

Next the machine user (i.e., customer) inserts in the direction of the arrow at least a portion of their currency stack 411 into the holder 404 (FIG. 29). An end of the stack abuts the stop 414 (FIG. 30). The fascia member 424 can support any remaining portion of the stack 411 that extends outside of the fascia opening 412. At this time the depositor can straighten the currency bills in the stack. The customer may be requested to perform such straightening act via an output device (e.g., display screen) of the machine.

Figure 31:
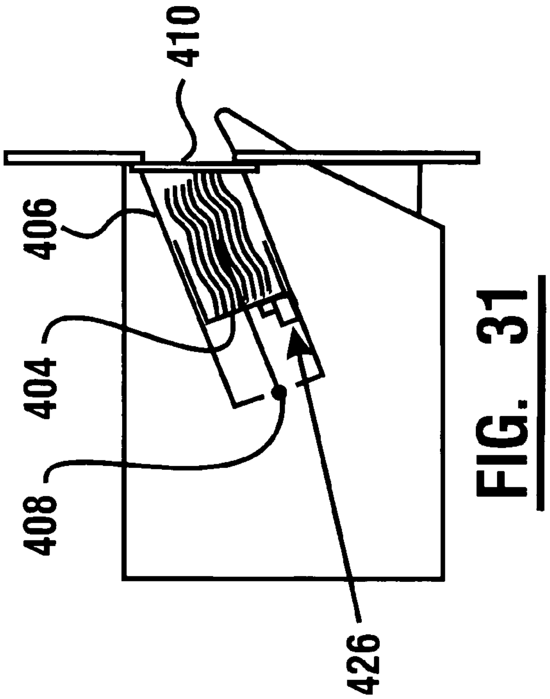
FIG. 31 shows the loaded stack holder retracted within its housing.

The stack holder 404 is radially retracted relative to the holder housing 406 to cause the stack to be moved into the holder housing 406. The size sensor 426 can be used in determining when the stack holder 404 is fully retracted. While the stack holder 404 is fully retracted other sensors can be used to determine whether the stack 411 is clear of the fascia opening 412. If clear, then the stack is fully loaded in the holder housing 406 and the carrier gate 410 is closed (FIG. 31). The drive for closure of the carrier gate 410 can be under the control of a machine controller.

The holder housing 406, with the stack 411 therein, is then rotated in the direction of the curved arrow about the pivot axis 408 (FIG. 32). The rotational drive can be under the control of a machine controller. During this rotational movement the stack 411 is flipped (e.g., inverted or turned over). As previously discussed, analysis of the contents of the stack can be carried out once the stack is fully loaded in the holder housing 406. The analysis can continue even during stack rotation.

It is noted that the stack rotation causes the closed ends 414, 419 of both the holder 404 and the housing 406 to be positioned between the stack and the fascia opening 412. Thus, even with the gates 410, 430 open, a direct line of open access to the currency in the stack by a person adjacent the fascia opening 412 is prevented. In an exemplary embodiment, an ATM is able to promptly rotate a deposited stack before any notes are removed therefrom (such as by a machine picker mechanism) to reduce opportunity for criminal activity and thus enhance theft prevention.

Figure 33:
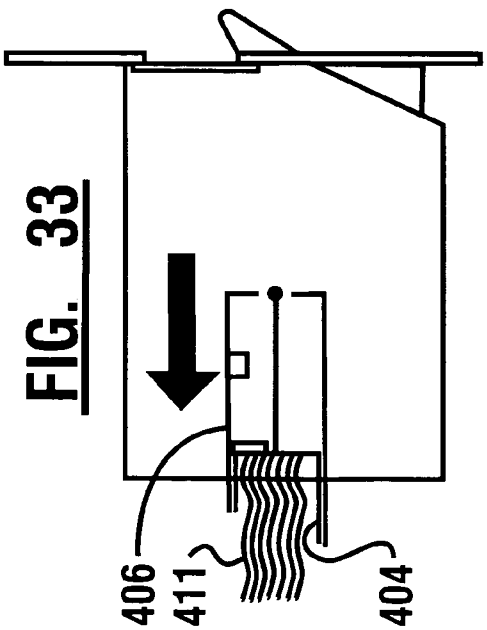
FIG. 33 shows the loaded stack holder extended to expose the stack.

Following stack rotation, the stack holder 404 is radially extended in the direction of the arrow relative to the holder housing 406 (FIG. 33). This movement causes at least a portion of the stack 411 to be exposed outside of the holder housing 406 (FIG. 33). Thus, the exemplary transport device 400 can be used to transport bulk deposits of stacked sheets to different machine locations for different types of automated banking machines.

The final position of a flipped stack is such that a further note handling device can be operatively positioned adjacent to the extended stack. In the position of FIG. 33 the currency notes can be removed from the stack holder 404 and handled according to the layout of the particular machine. For example, the stack 411 can be grabbed by another stack handling device and further moved as a single integral stack to another location in the machine.

Alternatively, instead of removing an entire note stack from the stack holder 404, the notes may be individually removed from the stack holder 404 by a note unstack device, such as a note picker mechanism similar to previously discussed picker mechanism 86. The final position of a flipped stack being such that a picker mechanism is operatively positioned adjacent the stack. Picked notes can be further processed and/or transferred to appropriate storage locations for later retrieval in cash dispensing operations of a currency recycling type automated banking machine.

In an exemplary embodiment, because of the angled insertion of a stack deposited into the stack holder, the stack is rotated less than 180 degrees about the axis 408. However, this angle is exemplary, and a stack can be rotated at an angle from >0 to <360 degrees. The ability to rotate a stack over such a wide range also enables the stack to be unloaded (e.g., via a grasp device or picker device) at different angular locations during a cash deposit transaction. For example, a first stack can be discharged at a first angular location, a second stack discharged at a second angular location, and a third stack discharged at a third angular location. Alternatively, sheets from the same stack can be unloaded at different angular locations. The ability of the telescopic stack holder 407 to rotate to different unloading stations can enhance the segregation and sorting of different sheets from the same stack. For example, notes and checks in the same stack (or different denominations of currency notes in the same stack) can be respectively removed at different unloading stations. In other arrangements the customer can perform a deposit which includes sequential insertions of different denominations of currency. The machine can rotate each specifically inserted denomination to its corresponding specific picker station. Of course the transport device 400 can also be used in a stack dispense process, via reverse operation. For example, different denominations of currency can be added to the stack holder at different note loading stations to form a completed stack. The completed stack can then be presented to a customer during a cash withdrawal transaction.

A note stack deposit operation will now be described. The stack input (deposit) sequence can comprise (if necessary) initially positioning the telescopic stack holder 407 adjacent the machine's user fascia. The openings of both the stack holder 404 and holder housing 406 being oriented with the fascia opening 412. Next the split gate 410 can be opened so the telescopic stack holder 407 can receive a stack 411 from a customer through the fascia opening 412. The customer inserts money against the stop 414. The notes can be received singularly into the stack holder 404, as portions of a stack, or as an entire stack. Portions of money still extending outside the fascia opening 412 can be supported by the fascia support member 424. The stack holder 404 telescopically retracts within the holder housing 406 to move the money stack into the holder housing 406 (i.e., also interior of the fascia opening and the machine housing). The split gate 410 can then be closed and the stack rotated within the machine (e.g., recycling ATM). The housing 406, with the stack holder 404 and the stack 411 therein, is rotated. The rotation of the stack 411 can occur after the split gate 410 is closed, before the gate is closed, or simultaneously with the gate closure. With the stack rotated, the stack holder 404 can be telescopically extended within the holder housing 406 to extend the note stack outward from both the stack holder 404 and the holder housing 406. This outwardly extending stack portion enables the machine to perform another operation on the notes. For example, the entire stack can be grasped and removed as a single unit from the telescopic stack holder 407, or the notes may be individually removed from the stack by a sheet picker mechanism (e.g., similar to the type of picker mechanism 86), or some other note handling operation.

A note stack dispense operation will now be described. A stack output (dispense) sequence can comprise (if necessary) initially positioning the telescopic stack holder 407 in a position to receive notes taken from a storage area in the machine. The openings of both the stack holder 404 and holder housing 406 being oriented to receive money therein. Notes can be received singularly into the stack holder 404, as portions of a stack, or as an entire stack. After money is received therein, the stack holder 404 telescopically retracts within the holder housing 406 to move the money stack into the holder housing 406. Next the housing 406 with the stack therein is rotated to position the telescopic stack holder 407 adjacent the machine's user fascia. The rotation causes the opening of the holder housing 406 be oriented with the fascia opening 412. Rotating the stack can occur before the gate is opened, after the split gate 410 is opened, or simultaneously with the gate opening. With the split gate 410 open, the stack holder 404 can be telescopically extended within the holder housing 406 to present a note stack to a customer. The note stack extends through the fascia opening 412 and can be supported (if necessary) by the stack support member 424. The customer has access to at least the portion of the stack extending outside the fascia. This outwardly extending stack portion enables the customer to grasp the entire stack and remove it from the machine (e.g., recycling ATM).

Some automated banking machines could not previously be modified to accept a sheet stack for deposit due to the compact spacing configuration of internal components. For example, some machines could not be structurally or economically reconfigured to both receive a note stack at the fascia opening and pick notes from the received stack while the stack is still situated adjacent the fascia opening. An exemplary embodiment of the invention now enables a machine to be modified to include this ability. The exemplary embodiment of the invention enables a note stack to be both received at the fascia opening and then relocated to a note processing mechanism (e.g., a note picker mechanism) disposed from the fascia opening. Thus, an exemplary embodiment not only provides a machine with the new ability to receive a note stack, but also the ability to move the received note stack to the current location of a picker mechanism (e.g., a device which can remove notes individually from the stack, such as a type similar to picker mechanism 86). That is, the note stack receiving feature can be added to a machine without the need to relocate the picker mechanism. Since the picker mechanism does not need to be repositioned in the machine (which repositioning may be impractical), the exemplary embodiment of the invention also permits the picker mechanism to be a shared picker mechanism which can pick notes from different originating stacks. The shared picker mechanism can continue its initial picking duties and additionally pick notes from a stack received at a distant fascia opening.

FIG. 34 shows the transporter device 400 being moved away (in the direction of the horizontal arrow) from its operating position in the machine. Such repositioning or removal of the portable carrier 402 may occur during a time of machine servicing. Because of the angled relationship between the portable carrier 402 and the safety gate 430, the carrier's removal causes the safety gate 430 to automatically move (in the direction of the vertical arrow) to close the fascia opening 412. In other embodiments the closure may not be automatic but instead driven under the control of a machine computer. Sensors on the machine housing can be used detect absence of the carrier. Sensors on the machine housing can also be used to sense whether any foreign objects or devices are adjacent to or in the fascia opening 412 prior to commencing gate closure.

Figure 35:
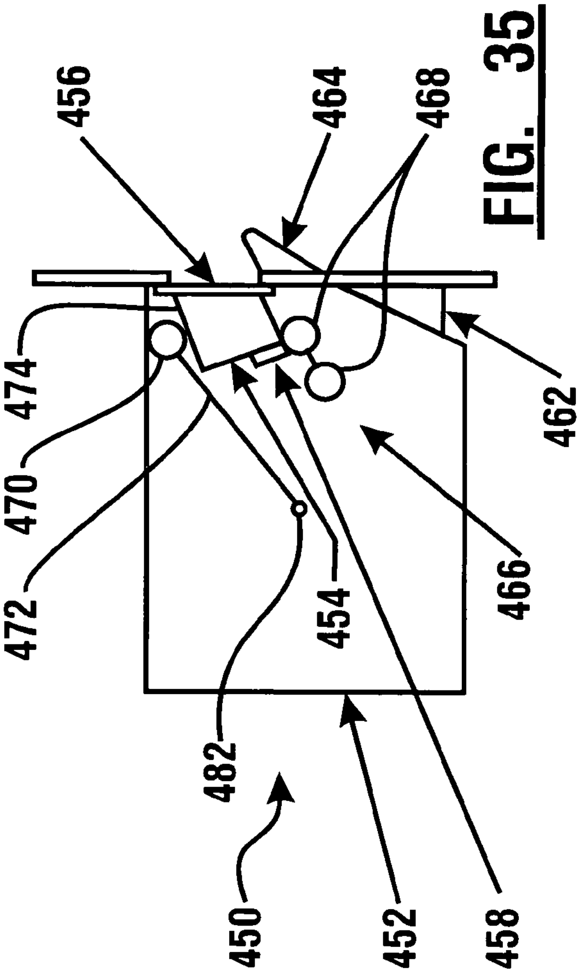
FIG. 35 shows an alternative stack transport device.
Figure 37:
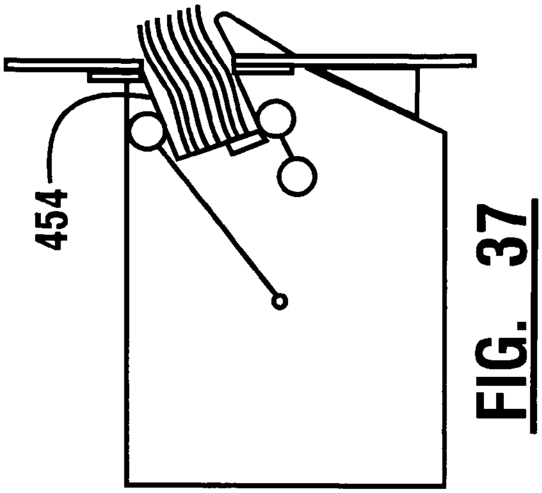
FIG. 37 shows a stack holder holding a sheet stack adjacent the fascia.
Figure 36:
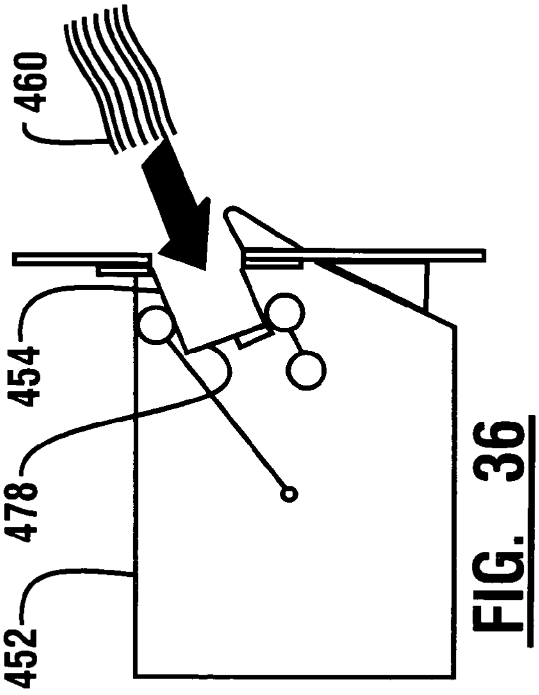
FIG. 36 shows a stack holder positioned adjacent the fascia.
Figure 39:
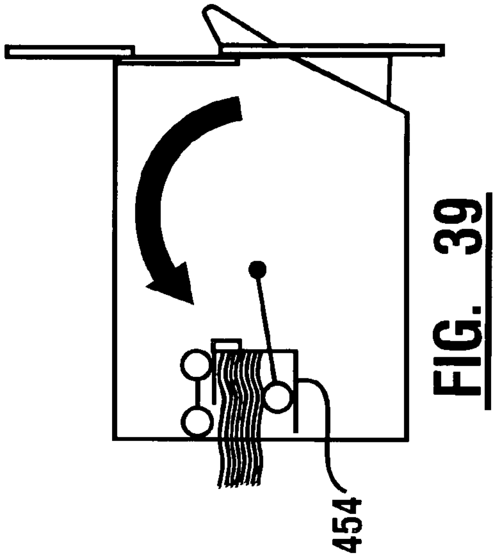
FIG. 39 shows the stack in a flipped orientation.
Figure 41:
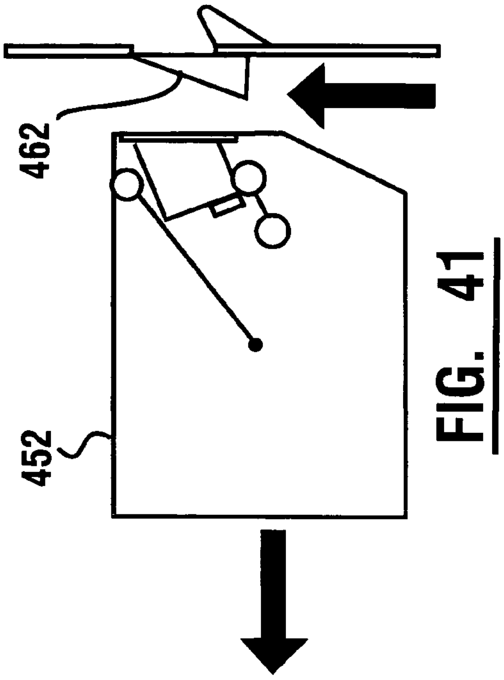
FIG. 41 shows the alternative portable carrier spaced from the machine fascia.
Figure 38:
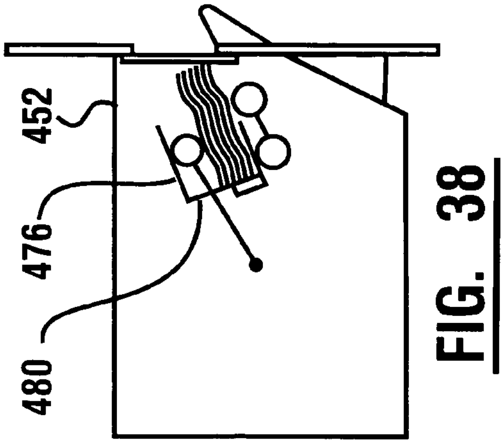
FIG. 38 shows the stack moved interior of the fascia.
Figure 40:
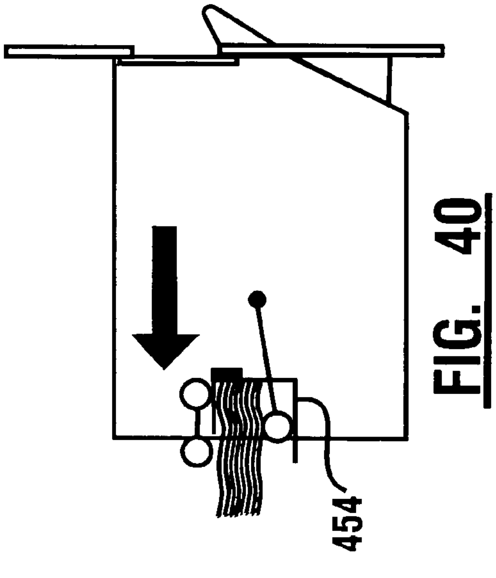
FIG. 40 shows the stack presented for removal from the stack holder.

FIG. 35 shows an alternative exemplary embodiment of a stack transport device 450. Operational positions of transport device 450 components adjacent to an automated banking machine housing are shown in FIGS. 36–41. The transport device 450 includes some similar components that were previously described with regard to the transport device 400 of FIGS. 28–34. For brevity, the specific description of these similar components will not be repeated.

The transport device 450 comprises a portable carrier 452 supporting a stack holder 454 and a split gate 456 (FIG. 35). A stack holder 454 is sized to hold (e.g., support) a stack 460 of sheets. The stack holder 454 includes at least one sensor 458. The stack holder 454 can be functionally and structurally similar to the previously discussed stack holder 404. A machine's safety gate 462 and a fascia's stack support ledge 464 are also shown in FIG. 35.

The portable transport device 450 also includes a drive arrangement 466 comprising a plurality of drive rollers 468. The drive rollers 468 are operative to move the stack holder 454 radially relative thereto. The drive rollers 468 can engage an exterior portion (side wall or a track) of the stack holder 454. Of course other suitable drive arrangements (e.g., pushing, pulling, or sliding) can be used to cause the stack holder 454 to be driven during extending and retracting operations. The drive rollers 468 (or holder guide) can also act to guide the stack holder 454 during movement thereof.

At least one other roller 470 is operational to compress a stack 460 positioned within the holder 454. The compress roller 470 is connected to a telescoping arm 472. The compress roller 470 is positioned for movement adjacent to the longer side 474 of the stack holder 454. The longer side 474 includes a slot 476 (FIG. 38) through which the arm 472 can pass. Likewise, the stop 478 also includes a slot 480 (FIG. 38) through which the arm 472 can pass.

The stack holder 454 can be positioned (FIG. 36) adjacent to the fascia opening and loaded (FIG. 37) with a stack 460 of sheets. The stack holder 454 is then moved to a retracted position (FIG. 38) by the drive rollers 468. The compress roller 470 is then in a position which extends beyond the end of the longer side 474. Thus, the compress roller 470 can be driven (while avoiding the longer side) to enter the stack holder 454 and compress the stack therein. With the compress roller 470 in the stack holder 454, the telescoping arm 472 can then be telescopically shortened to reposition (e.g., center) the at least one compress roller 470 to achieve efficient compaction of the stack.

The stack holder 454, drive rollers 468, compress roller 470, and telescoping arm 472 can all be supported by a rotatable support unit. In a similar manner to that already discussed with respect to stack holder 404, the stack 460 can be rotated (FIG. 39) about an axis or pivot point 482. The compress roller 470 can be held in a state of compression against the stack 460 to keep the stack compressed and the sheets therein aligned during rotation thereof. A rotated stack can then be extended (FIG. 40) for sheet removal from the stack holder 454. The portable carrier 452 can also be moved (FIG. 41) relative to the machine fascia.

The alternative stack transport device 450 enables a deposit stack of sheets to be both radially and rotationally transported within an automated banking machine (e.g., recycling ATM). Of course the transport device 450 can also be used in a stack dispense process via reverse operation thereof.

Figure 43:
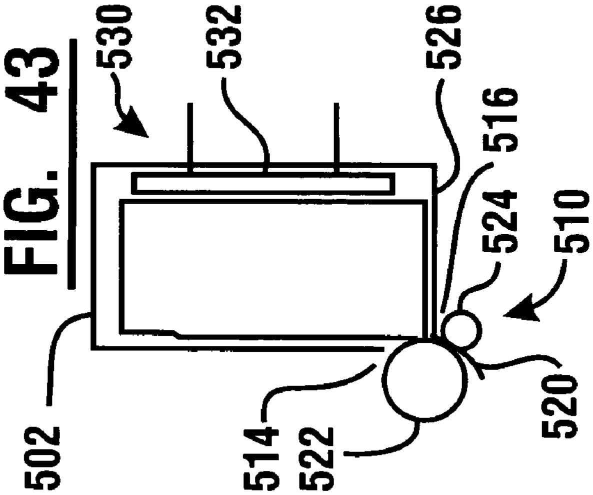
FIG. 43 shows the stack holder of FIG. 42 rotated to an inner machine position.
Figure 42:
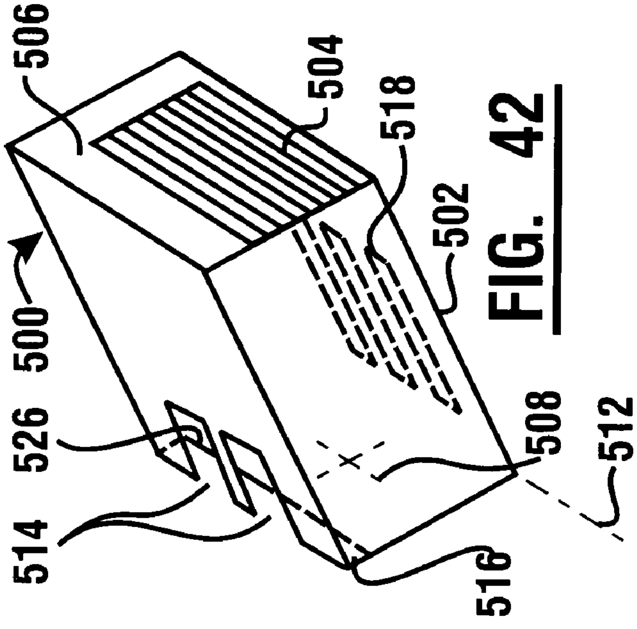
FIG. 42 shows a stack holder with slots and in a customer position.

A further exemplary embodiment of a stack transport device is shown in FIG. 42 and FIG. 43. The stack transport device 500 includes a stack holder 502. The stack holder 502 supports a stack 504 received from a customer through an open end 506 of the stack holder 502. In FIG. 42 the stack holder 502 is shown in a stack receiving position oriented adjacent a fascia opening. In FIG. 43 the stack holder 502 is shown in a stack pivoted or rotated position, with the stack 504 oriented adjacent a sheet picker mechanism 510. Thus, the stack holder 504 can be rotated from a stack accept position to a sheet pick position.

Movement of the stack holder 502 is arranged so that variable pivot axes can be used. For example, the stack holder 502 can be installed to pivot about axis 508. Alternatively, the stack holder 502 can be installed to pivot about axis 512. Different locations on a stack holder can be used as the pivot point. A stack holder can have differently positioned sets of connecters thereon, each enabling the stack holder to be fastened to a pivot drive member (e.g., rod or shaft).

Figure 44:
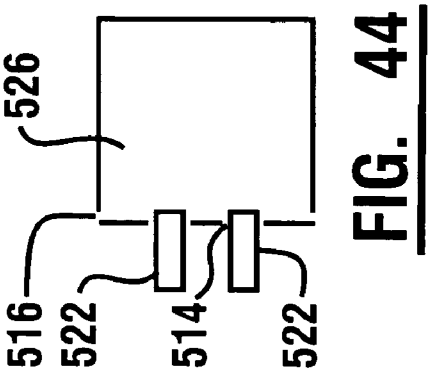
FIG. 44 shows the slotted end of the rotated stack holder in relation to picker wheels.

The stack holder 502 includes picker roller slots 514, a sheet exit slot 516, and stack push slots 518. The picker wheel or roller slots 514 respectively enable a picker roller to pass therethrough to engage or access a sheet in the stack 504. FIG. 43 shows a picked sheet 520 passing between a picker roller 522 and a stripper wheel or roller 524 of the sheet picker mechanism 510. FIG. 44 shows a cross sectional view of the lower end (or bottom face) 526 of the stack holder 502. The bottom end 526 is opposite the open (top) end 506. In the arrangement shown the lower end 526 includes the sheet exit slot 516. It should be understood that in other stack holders the exit slot may be located in a different stack holder wall.

The sheet exit slot 516 enables a sheet 520 being picked from the stack 504 to exit the stack holder 502 through the wide slot 516. As shown in FIG. 42 and FIG. 44 the exit slot 516 extends across the entire bottom of the stack holder 502. In an exemplary embodiment, when the stack is in its rotated position adjacent to the sheet picker mechanism 510, the picker roller 522 extends through both a roller slot 514 and the exit slot 516. In other sheet picking formations the sheet picker mechanism 510 can be arranged so that the picker roller 522 only extends through a roller slot 514 and not through the sheet exit slot 516.

The stack push slots 518 respectively enable components of a stack push device to pass therethrough to engage the stack 504. A stack push device 530 can comprise several stack engaging members 532, each sized to pass through a respective push slot 518 to engage a stack 504 located in the stack holder 502. The stack engaging members 532 are operative to engage a stack and push it in a direction toward the sheet exit slot 516. The stack push device can also include resilient biasing components (e.g., springs) that urge the stack toward the picker mechanism so that sheets can be individually picked from the stack.

The stack push device 530 is oriented relative to the stack holder 502 such that rotation of the stack holder 502 causes one or more stack engaging members 532 to enter the push slots 518. In the final stack rotated position of FIG. 43 a stack engaging member 532 has passed through its respective slot 518 to biasingly engage the stack 504.

Figure 45:
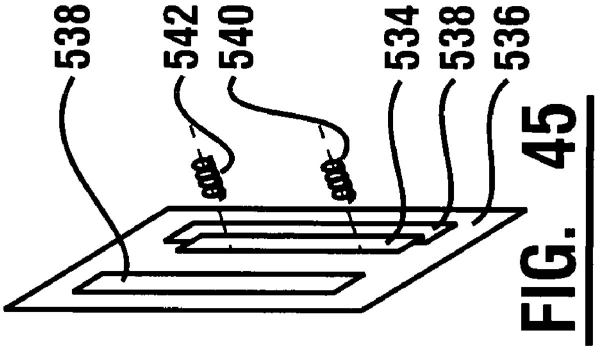
FIG. 45 shows a stack engaging member comprising a push plate.

Stack pushing members can comprise many different shapes and dimensions. For example, the stack engaging member 532 shown in FIG. 43 can be of the type shown in FIG. 45. The stack engaging member 534 comprises a push plate. FIG. 45 shows a side of a stack holder 536 with picker slots 538 therein. The push plate 534 is fastened to push rods 540 which can be guided along their axial direction. The rods 540 can each support one or more spring loaded coils 542. The length of the rods 540 and the spring loading is predetermined to enable the last sheet in a stack to be picked.

Figure 46:
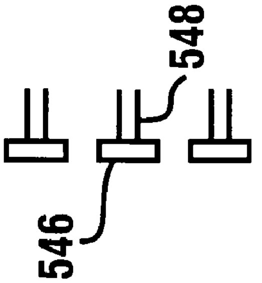
FIG. 46 shows an alternative stack pushing member.
Figure 47:
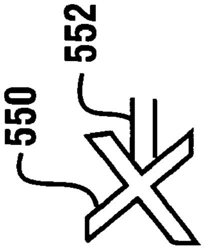
FIG. 47 shows another alternative stack pushing member.
Figure 48:
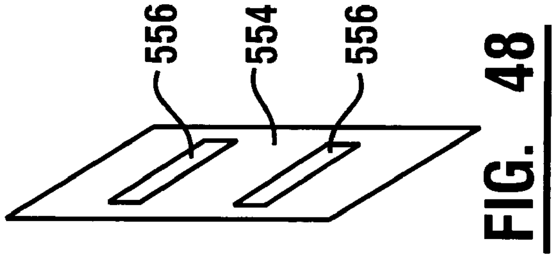
FIG. 48 shows an alterative picker slot arrangement for a stack holder.

Alternative forms of stack engaging members are shown in FIG. 46 and FIG. 47. FIG. 46 shows separated plural push pieces 546, each connected to a push bar 548. FIG. 47 shows a cross-shaped push member 550 removably attached to a push shaft 552. FIG. 48 shows a side of an alterative stack holder 554 which has picker slots 556 therein. Relative to each other, the slots 538 of FIG. 45 are vertical slots whereas the slots 556 of FIG. 48 are horizontal slots. It should be understood that the shown stack engaging members and corresponding picker slots are exemplary and that other shapes, sizes, and constructions can also be used.

Figure 49:
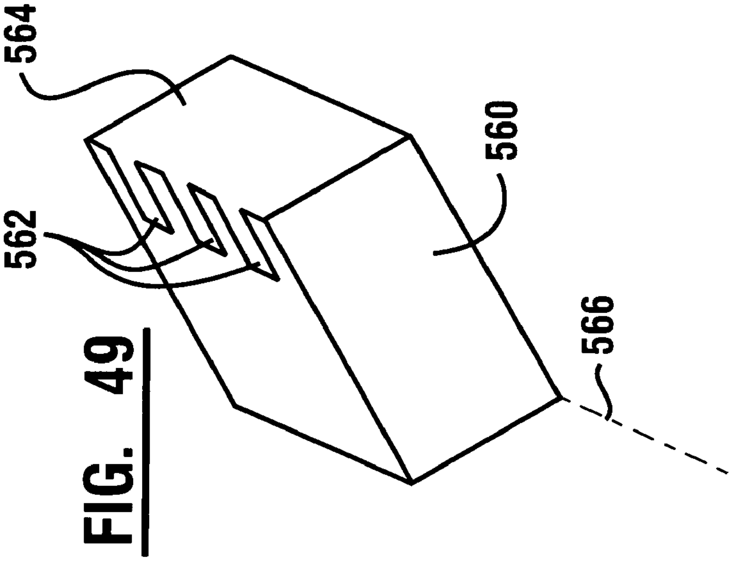
FIG. 49 shows another slotted stack holder.

FIG. 49 shows another exemplary embodiment of a stack holder 560 for a stack transport device. The stack holder 560 includes picker slots 562. The picker slots 562 are adjacent an open end 564 of the stack holder 560. An exemplary pivot axis 566 is also shown in FIG. 49, although another pivot axis may be used.

Figure 50:
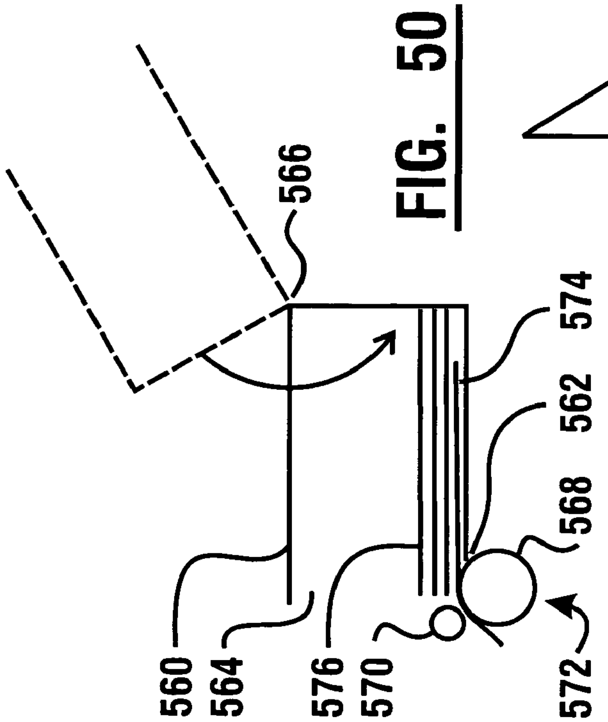
FIG. 50 shows the stack holder of FIG. 49 in a sheet picking orientation.

FIG. 50 shows a side view of the stack holder 560 in a non rotated stack receiving position (in broken lines) relative to a rotated stack dispensing position (in solid lines). The stack holder 560 is pivotable about the axis 566 in the direction of the arrow. A pick roller 568 and strip roller 570 of a picker mechanism 572 are also shown removing a stack sheet 574 (e.g., currency note) from the stack holder 560 through the open end 564. The pick roller 568 can extend into a picker slot 562 to engage the (lowermost) end sheet 574 of the stack 576. It should also be understood that a picker device similar to the picker mechanism 572 could be used to engage a stack that was extended outwardly for picker presentation, such as the presented stacks shown in the embodiments of FIG. 33 and FIG. 40.

Thus the automated banking machine and system of the exemplary embodiments may achieve one or more of the above stated objectives, eliminate difficulties encountered in the use of prior devices and systems, solve problems and attain the desirable results described herein.

In the foregoing description certain terms have been used for brevity, clarity and understanding, however no unnecessary limitations are to be implied therefrom because such terms are for descriptive purposes and are intended to be broadly construed. Moreover, the descriptions and illustrations herein are by way of examples and the invention is not limited to the details shown and described.

In the following claims any feature described as a means for performing a function shall be construed as encompassing any means capable of performing the recited function, and shall not be deemed limited to the particular means shown in the foregoing description or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

We claim:

1. Apparatus comprising:

an automated banking machine bulk note transport device, wherein the transport device includes an axis, wherein the transport device includes a stack holder, wherein the stack holder includes an interior storage area, wherein the interior storage area is adapted to hold a stack of currency notes therein, wherein the stack holder is radially movable with the stack relative to the axis, wherein the stack holder is rotatable with the stack about the axis.

2. The apparatus according to claim 1 wherein the transport device includes a holder housing, wherein the stack holder is radially movable relative to the holder housing.

3. The apparatus according to claim 2 wherein the stack holder is movable inside the holder housing.

4. The apparatus according to claim 3 wherein the transport device includes a support structure, wherein the support structure supports the stack holder and the holder housing, wherein the holder housing is rotatable about the axis.

5. The apparatus according to claim 4 wherein the holder housing is pivotable about the axis.

6. The apparatus according to claim 4 and further comprising an automated banking machine, wherein the machine includes the transport device, wherein the machine includes a fascia comprising a fascia opening sized to enable a stack of currency notes to pass therethrough, wherein the stack holder is positionable to receive the stack of currency notes passed through the fascia opening.

7. The apparatus according to claim 6 wherein the fascia includes a support member located below the fascia opening, wherein the support member is adapted to provide support to a stack portion extending outside of the fascia opening.

8. The apparatus according to claim 6 wherein the transport device includes a gate, wherein the support structure supports the gate, wherein the gate is movable between an open position and a closed position, wherein the gate in the open position enables the stack holder to receive a stack of currency notes from a machine user, wherein the gate in the closed position blocks the fascia opening.

9. The apparatus according to claim 8 wherein the support structure comprises a portable transport frame, wherein the portable transport frame is removable as a unit from the automated banking machine.

10. The apparatus according to claim 9 wherein the machine includes a safety gate, wherein the safety gate is operative to block the fascia opening only when the transport frame is removed from the machine.

11. The apparatus according to claim 3 wherein the holder housing includes at least one sensor operative to detect a position of the stack holder relative to the holder housing.

12. The apparatus according to claim 1 wherein the transport device is operative to flip the stack during rotation of the stack holder.

13. Apparatus including:

a transport device, wherein the transport device includes a stack holder, wherein the holder is adapted to receive and hold a stack of currency notes, wherein the holder is rotatable about an axis, wherein the holder is radially movable relative to the axis, wherein the holder is telescopically movable between an extended position and a retracted position, wherein the transport device includes a holder guide, wherein the holder is radially movable relative to the holder guide, wherein the holder guide is rotatable with the holder about the axis.

14. The apparatus according to claim 13 wherein the holder guide comprises a holder housing, wherein the holder is telescopingly movable in the holder housing during radial movement, and wherein the holder is radially movable to move a stack into the holder housing.

15. The apparatus according to claim 14 wherein the holder housing is pivotable about the axis, wherein the holder is rotatable between a stack receiving position and a stack disposing position, wherein the maximum degree of holder housing rotation about the axis is less than 180 degrees.

16. The apparatus according to claim 14 and further comprising an automated banking machine, wherein the machine is operative to perform currency recycling operations including receiving currency notes and dispensing received currency notes, wherein the machine includes a machine housing comprising a fascia opening sized to enable a stack of currency notes to pass therethrough as a stack, wherein the holder includes a holder opening, wherein the holder opening is positionable adjacent the fascia opening to receive the stack through the fascia opening.

17. The apparatus according to claim 16 wherein alignment of the holder opening relative to the fascia opening is angularly offset when the holder opening is positioned to receive the stack through the fascia opening.

18. The apparatus according to claim 13 wherein the holder includes a first side extending a first radial length, wherein the holder includes a second side extending a second radial length, wherein the first side is generally parallel to the second side, and wherein the first radial length is greater than the second radial length.

19. The apparatus according to claim 13 wherein the holder guide comprises a roller arrangement comprising drive rollers and at least one stack compressing roller, wherein the drive rollers are operative to drive the holder relative to the drive rollers to enable the at least one stack compressing roller to compress a stack held by the holder.

20. Apparatus comprising:

an automated banking machine bulk deposit transporter, wherein the transporter includes a stack holder, wherein the stack holder in a first holder position is adapted to receive a plurality of currency notes from an automated banking machine user, wherein the stack holder is adapted to hold received currency notes in a stack at the first holder position, wherein the stack holder while holding the stack is operative to radially move toward an axis from the first holder position to a second holder position, wherein the stack holder while holding the stack is operative to pivotally move about the axis from the second holder position to a third holder position, wherein the third holder position is located a greater distance from the first holder position than the second holder position is located from the first holder position.

* * * * *